US008029361B2

(12) United States Patent
Hardy et al.

(10) Patent No.: US 8,029,361 B2
(45) Date of Patent: Oct. 4, 2011

(54) METHOD AND APPARATUS FOR PROVIDING PLAYER INCENTIVES

(75) Inventors: Dow K. Hardy, Marlborough, MA (US); Mark E. Herrmann, Wellesley, MA (US); John E. Taylor, Vero Beach, FL (US); John F. Acres, Corvallis, OR (US); Steven N. Kane, Brookline, MA (US)

(73) Assignee: GameLogic Inc., Waltham, MA (US)

( * ) Notice: Subject to any disclaimer, the term of this patent is extended or adjusted under 35 U.S.C. 154(b) by 0 days.

(21) Appl. No.: 11/840,541

(22) Filed: Aug. 17, 2007

(65) Prior Publication Data

US 2008/0146322 A1 Jun. 19, 2008

Related U.S. Application Data

(63) Continuation-in-part of application No. 11/704,144, filed on Feb. 8, 2007, now Pat. No. 8,016,668, which is a continuation of application No. 11/780,882, filed on Jul. 20, 2007, which is a continuation-in-part of application No. 11/001,775, filed on Nov. 30, 2004.

(60) Provisional application No. 60/569,030, filed on May 7, 2004, provisional application No. 60/771,505, filed on Feb. 8, 2006, provisional application No. 60/928,855, filed on May 11, 2007, provisional application No. 60/838,234, filed on Aug. 17, 2006.

(51) Int. Cl.
*A63F 9/24* (2006.01)
*A63F 13/00* (2006.01)

(52) U.S. Cl. ........... 463/29; 463/16; 463/21; 273/138.1; 379/93.13

(58) Field of Classification Search .............. 463/10–13, 463/17–19, 21–22, 29, 16, 23; 273/138.1, 273/139, 142 B, 142 A, 142 J, 269, 304; 379/93.13; *A63F 9/24, 13/00; G06F 17/00, G06F 19/00*
See application file for complete search history.

(56) References Cited

U.S. PATENT DOCUMENTS

| | | | |
|---|---|---|---|
| 2,544,961 | A | 3/1951 | Kemp |
| 4,215,864 | A | 8/1980 | Nichols |
| 4,494,197 | A | 1/1985 | Troy et al. |
| 4,582,324 | A | 4/1986 | Koza et al. |
| 4,679,789 | A | 7/1987 | Okada |

(Continued)

FOREIGN PATENT DOCUMENTS

CA 2338080 9/2001

(Continued)

OTHER PUBLICATIONS

Rules of Pai Gow Poker. Casino City. Dec. 3, 2000. Online: http://web.archive.org/web/20001203170300/http://www.casinocity.com/rule/paigow.htm.

(Continued)

*Primary Examiner* — Arthur O. Hall
(74) *Attorney, Agent, or Firm* — Dority & Manning, P.A.

(57) ABSTRACT

A system and method is provided for incentivizing players to visit a gambling location. In one aspect, a qualified person is invited to play an electronic game which has a plurality of outcomes, at least one of which is a winning outcome. In one embodiment, the qualified person may be required to redeem the outcome at the gambling location. In another embodiment, the person may be required to redeem the outcome at a redemption location.

41 Claims, 20 Drawing Sheets

U.S. PATENT DOCUMENTS 4,689,742 A 8/1987 Troy et al.
4,725,079 A 2/1988 Koza et al.
4,764,666 A 8/1988 Bergeron
4,856,787 A 8/1989 Itkis
4,882,473 A 11/1989 Bergeron et al.
4,922,522 A 5/1990 Scanlon
5,158,293 A 10/1992 Mullins
5,297,802 A 3/1994 Pocock
5,324,035 A 6/1994 Morris et al.
5,333,868 A 8/1994 Goldfarb
5,351,970 A 10/1994 Fioretti
5,373,440 A 12/1994 Cohen
5,377,975 A 1/1995 Clapper, Jr.
5,398,932 A 3/1995 Eberhardt et al.
5,429,361 A * 7/1995 Raven et al. .................... 463/25
5,445,391 A 8/1995 Gleason, Jr.
5,518,253 A 5/1996 Pocock et al.
5,569,082 A 10/1996 Kaye
5,586,937 A 12/1996 Menashe
5,611,729 A 3/1997 Schumacher
5,628,684 A 5/1997 Bouedec
5,639,088 A * 6/1997 Schneider et al. ......... 273/138.2
5,645,485 A 7/1997 Clapper, Jr.
5,653,635 A 8/1997 Breeding
5,679,077 A 10/1997 Pocock
5,687,971 A 11/1997 Khaladkar
5,709,603 A 1/1998 Kaye
5,722,891 A 3/1998 Inoue
5,749,784 A 5/1998 Clapper, Jr.
5,768,382 A 6/1998 Schneier et al.
5,772,511 A 6/1998 Smeltzer
5,775,993 A 7/1998 Fentz
5,779,549 A 7/1998 Walker et al.
5,782,470 A 7/1998 Langan
5,788,573 A 8/1998 Baerlocher et al.
5,791,990 A 8/1998 Schroeder et al.
5,791,991 A 8/1998 Small
5,797,795 A 8/1998 Takemoto
5,810,664 A 9/1998 Clapper, Jr.
5,816,918 A 10/1998 Kelly et al.
5,823,873 A 10/1998 Moody
5,823,874 A 10/1998 Adams
5,830,069 A 11/1998 Soltesz et al.
5,848,932 A 12/1998 Adams
5,857,911 A 1/1999 Fioretti
5,860,653 A 1/1999 Jacobs
5,871,398 A 2/1999 Schneier et al.
5,882,258 A 3/1999 Kelly et al.
5,887,906 A 3/1999 Sultan
5,928,082 A 7/1999 Clapper, Jr. et al.
5,935,002 A 8/1999 Falciglia
5,944,606 A 8/1999 Gerow
5,954,582 A 9/1999 Zach et al.
5,980,385 A 11/1999 Clapper
5,996,997 A 12/1999 Kamille
6,007,426 A 12/1999 Kelly et al.
6,012,983 A 1/2000 Walker et al.
6,015,344 A 1/2000 Kelly et al.
6,024,640 A * 2/2000 Walker et al. ................... 463/17
6,028,920 A 2/2000 Carson
6,044,135 A 3/2000 Katz
6,048,269 A 4/2000 Burns et al.
6,056,289 A 5/2000 Clapper
6,059,289 A 5/2000 Vancura
6,061,660 A * 5/2000 Eggleston et al. ......... 705/14.12
6,077,163 A 6/2000 Walker et al.
6,106,393 A 8/2000 Sunaga et al.
6,113,495 A * 9/2000 Walker et al. ................... 463/42
6,146,272 A 11/2000 Walker et al.
6,152,823 A 11/2000 Lacoste et al.
6,159,097 A 12/2000 Gura
6,162,121 A 12/2000 Morro et al.
6,168,521 B1 * 1/2001 Luciano et al. ................. 463/18
6,173,267 B1 1/2001 Cairns
6,179,711 B1 1/2001 Yoseloff
6,186,892 B1 2/2001 Frank et al.
6,193,608 B1 2/2001 Walker
6,203,011 B1 3/2001 Nulph et al.
6,203,427 B1 3/2001 Walker et al.
6,222,486 B1 4/2001 Flacke
6,236,900 B1 5/2001 Geiger
6,241,606 B1 6/2001 Riendeau et al.
6,244,958 B1 6/2001 Acres et al.
6,251,017 B1 6/2001 Leason et al.
6,270,406 B1 8/2001 Sultan
6,273,817 B1 8/2001 Sultan
6,279,911 B1 8/2001 Cherry
6,280,325 B1 8/2001 Fisk
RE37,371 E 9/2001 Gerow
6,283,855 B1 9/2001 Bingham
6,287,197 B1 9/2001 Dickinson
6,302,793 B1 * 10/2001 Fertitta et al. ................... 463/25
6,309,298 B1 10/2001 Gerow
6,311,976 B1 11/2001 Yoseloff et al.
6,312,334 B1 11/2001 Yoseloff
6,358,151 B1 3/2002 Enzminger et al.
6,364,765 B1 4/2002 Walker et al.
6,364,766 B1 4/2002 Anderson
6,368,214 B1 4/2002 Luciano
6,368,218 B2 4/2002 Angell, Jr.
6,371,852 B1 * 4/2002 Acres .............................. 463/25
6,375,567 B1 4/2002 Acres
6,390,921 B1 5/2002 Busch et al.
6,394,902 B1 5/2002 Glavich et al.
6,402,614 B1 6/2002 Schneier et al.
6,439,995 B1 8/2002 Hughs-Baird et al.
6,471,208 B2 10/2002 Yoseloff et al.
6,488,280 B1 12/2002 Katz et al.
6,514,144 B2 2/2003 Riendeau et al.
6,523,829 B1 2/2003 Walker et al.
6,527,175 B1 3/2003 Dietz et al.
6,532,448 B1 * 3/2003 Higginson et al. ......... 705/14.14
6,540,230 B1 4/2003 Walker et al.
6,565,084 B1 5/2003 Katz et al.
6,572,106 B2 6/2003 Alexoff et al.
6,572,107 B1 6/2003 Walker et al.
6,575,832 B1 6/2003 Manfredi et al.
6,582,307 B2 6/2003 Webb
6,582,310 B1 6/2003 Walker et al.
6,585,590 B2 7/2003 Malone
6,588,747 B1 7/2003 Seelig
6,595,854 B2 7/2003 Hughs-Baird
6,599,187 B2 7/2003 Gerow
6,599,192 B1 7/2003 Baerlocher et al.
6,607,439 B2 8/2003 Schneier et al.
6,612,501 B1 9/2003 Woll et al.
6,612,574 B1 9/2003 Cole et al.
6,619,660 B2 9/2003 Schaefer et al.
6,620,046 B2 * 9/2003 Rowe .............................. 463/25
6,625,578 B2 9/2003 Spaur et al.
6,645,074 B2 11/2003 Thomas et al.
6,645,075 B1 11/2003 Gatto
6,656,042 B2 12/2003 Reiss et al.
6,663,105 B1 12/2003 Sullivan et al.
6,676,126 B1 1/2004 Walker et al.
6,679,497 B2 1/2004 Walker et al.
6,681,995 B2 1/2004 Sukeda et al.
6,682,419 B2 1/2004 Webb et al.
D486,869 S 2/2004 Webb et al.
6,685,561 B2 2/2004 Anderson et al.
6,692,353 B2 2/2004 Walker et al.
6,705,944 B2 3/2004 Luciano
6,716,103 B1 4/2004 Eck et al.
6,719,631 B1 4/2004 Tulley et al.
6,729,956 B2 5/2004 Wolf et al.
6,733,385 B1 5/2004 Enzminger et al.
6,736,324 B2 5/2004 Behm
6,749,198 B2 6/2004 Katz et al.
6,761,633 B2 7/2004 Riendeau et al.
6,780,108 B1 8/2004 Luciano
6,786,824 B2 9/2004 Cannon
6,811,484 B2 11/2004 Katz et al.
6,824,467 B2 11/2004 Schlottmann et al.
6,843,724 B2 1/2005 Walker et al.
6,852,031 B1 2/2005 Rowe et al.
6,855,052 B2 2/2005 Weiss et al.
6,866,584 B2 3/2005 Michaelson 6,896,619 B2 5/2005 Baltz
6,899,622 B2 5/2005 Lind et al.
6,910,968 B2 * 6/2005 Nassef ........................... 463/42
6,913,534 B2 7/2005 DeFrees-Parrott
6,918,589 B2 7/2005 Thibault
6,929,544 B2 * 8/2005 Osterer ........................... 463/17
6,934,846 B2 8/2005 Szrek
6,942,570 B2 9/2005 Schneier et al.
6,960,135 B2 * 11/2005 Gaidarev et al. ................ 463/25
6,969,319 B2 11/2005 Rowe et al.
7,008,317 B2 3/2006 Cote et al.
7,008,318 B2 3/2006 Schneier et al.
7,024,375 B2 4/2006 Chau
7,052,394 B2 5/2006 Walker et al.
7,073,720 B2 7/2006 Behm
7,094,149 B2 8/2006 Walker
7,112,135 B2 9/2006 Anderson
7,118,478 B2 10/2006 Fayter et al.
7,163,459 B2 1/2007 Tanskanen et al.
7,172,506 B2 2/2007 Baerlocher et al.
7,179,168 B1 2/2007 Tulley et al.
7,186,180 B2 3/2007 Lathrop
7,213,811 B2 5/2007 Bozeman
7,241,219 B2 * 7/2007 Walker et al. ................... 463/20
7,275,990 B2 10/2007 Walker et al.
7,285,045 B2 10/2007 Schneier et al.
7,294,058 B1 11/2007 Slomiany et al.
7,303,468 B2 12/2007 Schneier et al.
7,303,470 B2 12/2007 George et al.
7,311,599 B2 12/2007 Knapp
7,311,600 B2 * 12/2007 Sundstrom ...................... 463/17
7,357,393 B2 4/2008 Finocchio
7,416,484 B1 8/2008 Nelson
7,467,999 B2 * 12/2008 Walker et al. ................... 463/20
7,490,830 B2 2/2009 Mirandette
2001/0034635 A1 10/2001 Winters
2001/0046891 A1 * 11/2001 Acres .............................. 463/18
2001/0049305 A1 12/2001 Riendeau et al.
2002/0010015 A1 * 1/2002 Acres .............................. 463/18
2002/0013167 A1 1/2002 Spaur et al.
2002/0039923 A1 4/2002 Cannon et al.
2002/0042300 A2 4/2002 Acres et al.
2002/0052229 A1 5/2002 Halliburton et al.
2002/0061778 A1 5/2002 Acres
2002/0077173 A1 6/2002 Luciano et al.
2002/0090986 A1 7/2002 Cote et al.
2002/0090987 A1 7/2002 Walker et al.
2002/0093190 A1 7/2002 Katz
2002/0094860 A1 7/2002 Itkis
2002/0098882 A1 7/2002 Lind et al.
2002/0107072 A1 8/2002 Giobbi et al.
2002/0111207 A1 8/2002 Lind
2002/0116266 A1 * 8/2002 Marshall ......................... 705/14
2002/0147040 A1 10/2002 Walker et al.
2002/0152120 A1 10/2002 Howington et al.
2002/0155885 A1 10/2002 Shvili
2002/0169018 A1 11/2002 Schneier et al.
2002/0187827 A1 12/2002 Blankstein
2002/0193158 A1 12/2002 Weiss et al.
2002/0198038 A1 12/2002 Adams
2003/0013531 A1 1/2003 Rowe et al.
2003/0027628 A1 2/2003 Luciano
2003/0032473 A1 2/2003 Rowe et al.
2003/0032476 A1 2/2003 Walker et al.
2003/0045340 A1 3/2003 Roberts
2003/0047869 A1 3/2003 Walker et al.
2003/0060257 A1 3/2003 Katz et al.
2003/0060261 A1 3/2003 Katz et al.
2003/0069068 A1 4/2003 Kaminkow
2003/0080508 A1 5/2003 Thibault
2003/0102625 A1 6/2003 Katz et al.
2003/0114217 A1 6/2003 Walker et al.
2003/0119581 A1 6/2003 Cannon et al.
2003/0139214 A1 7/2003 Wolf et al.
2003/0155715 A1 8/2003 Walker et al.
2003/0157977 A1 8/2003 Thomas et al.
2003/0171986 A1 9/2003 Itkis
2003/0176210 A1 9/2003 Vancura et al.
2003/0176212 A1 9/2003 Schlottmann et al.
2003/0184012 A1 10/2003 Green
2003/0186739 A1 10/2003 Paulsen et al.
2003/0195841 A1 10/2003 Ginsberg et al.
2003/0199318 A1 10/2003 Nassef et al.
2003/0218303 A1 11/2003 Walker et al.
2003/0220138 A1 11/2003 Walker et al.
2004/0025190 A1 2/2004 McCalla et al.
2004/0036212 A1 2/2004 Walker et al.
2004/0038723 A1 2/2004 Schneier et al.
2004/0051240 A1 3/2004 Adams
2004/0053683 A1 3/2004 Hartl et al.
2004/0056416 A1 3/2004 Bennett
2004/0059445 A1 3/2004 Moore
2004/0063484 A1 4/2004 Dreaper et al.
2004/0092307 A1 5/2004 George et al.
2004/0102238 A1 5/2004 Taylor
2004/0102239 A1 5/2004 Samila
2004/0127279 A1 7/2004 Gatto et al.
2004/0133472 A1 7/2004 Leason et al.
2004/0142741 A1 7/2004 Walker et al.
2004/0147308 A1 7/2004 Walker et al.
2004/0152504 A1 8/2004 Herrmann et al.
2004/0152510 A1 8/2004 Herrmann
2004/0180722 A1 9/2004 Giobbi et al.
2004/0185930 A1 9/2004 Thomas et al.
2004/0204222 A1 10/2004 Roberts
2004/0214628 A1 10/2004 Boyd et al.
2004/0229671 A1 11/2004 Stronach et al.
2004/0229677 A1 11/2004 Gray
2004/0259629 A1 12/2004 Michaelson et al.
2004/0259631 A1 12/2004 Katz et al.
2005/0037841 A1 2/2005 de Waal
2005/0049042 A1 3/2005 Walker et al.
2005/0075158 A1 4/2005 Walker et al.
2005/0090314 A1 4/2005 Nassef, Jr. et al.
2005/0092839 A1 5/2005 Oram
2005/0124407 A1 6/2005 Rowe et al.
2005/0164779 A1 7/2005 Okuniewicz
2005/0170881 A1 8/2005 Muskin
2005/0187005 A1 8/2005 Rose et al.
2005/0258596 A1 11/2005 Such
2005/0282619 A1 12/2005 Vancura et al.
2005/0282626 A1 12/2005 Manfredi et al.
2005/0288088 A1 12/2005 Englman et al.
2006/0025219 A1 2/2006 Nassef, Jr. et al.
2006/0035696 A1 2/2006 Walker et al.
2006/0036450 A1 2/2006 Nassef, Jr. et al.
2006/0041586 A1 2/2006 Nassef, Jr. et al.
2006/0068893 A1 3/2006 Jaffe et al.
2006/0069619 A1 * 3/2006 Walker et al. ................... 705/14
2006/0073884 A1 4/2006 Walker et al.
2006/0089194 A1 4/2006 Joshi et al.
2006/0148562 A1 7/2006 Walker et al.
2006/0194631 A1 8/2006 Rowe et al.
2006/0205511 A1 9/2006 Thomas et al.
2006/0247035 A1 11/2006 Rowe et al.
2006/0287046 A1 * 12/2006 Walker et al. ................... 463/16
2007/0054729 A1 3/2007 Hornik et al.
2007/0060261 A1 3/2007 Gomez et al.
2007/0060274 A1 * 3/2007 Rowe et al. ..................... 463/16
2007/0060317 A1 3/2007 Martin et al.
2007/0060329 A1 3/2007 Martin et al.
2007/0060330 A1 3/2007 Martin et al.
2007/0060331 A1 3/2007 Martin et al.
2007/0060369 A1 3/2007 Martin et al.
2007/0087834 A1 4/2007 Moser et al.
2007/0167216 A1 7/2007 Walker et al.
2007/0173322 A1 7/2007 Swamy et al.
2007/0265062 A1 11/2007 Thomas et al.
2008/0032763 A1 2/2008 Giobbi et al.
2008/0039171 A1 2/2008 Slomiany et al.
2008/0039173 A1 2/2008 Walther et al.
2008/0287176 A1 11/2008 Bennett

FOREIGN PATENT DOCUMENTS

EP 1746550 A2 1/2007
EP 1762990 A2 3/2007
EP 1833014 A1 9/2007
WO WO 91/06931 5/1991

| | | |
|---|---|---|
| WO | WO 97/37737 | 10/1997 |
| WO | WO 99/10057 | 3/1999 |
| WO | WO 99/16519 | 4/1999 |
| WO | WO 00/43087 | 7/2000 |
| WO | WO 00/69535 | 11/2000 |
| WO | WO 01/14029 | 3/2001 |
| WO | WO 03/004118 | 1/2003 |
| WO | WO 03/061795 | 7/2003 |
| WO | WO 03/084625 | 10/2003 |
| WO | WO 03/089077 | 10/2003 |
| WO | WO 03/089082 | 10/2003 |
| WO | WO 2004/013820 | 2/2004 |
| WO | 2004/105902 | 9/2004 |
| WO | WO 2004/114073 | 12/2004 |
| WO | WO 2005/029279 | 3/2005 |
| WO | WO 2005/031666 | 4/2005 |
| WO | WO 2005/079242 | 9/2005 |
| WO | WO 2006/028820 | 3/2006 |
| WO | WO 2006/052469 | 5/2006 |
| WO | WO 2007/035618 | 3/2007 |
| WO | WO 2007/040707 | 4/2007 |
| WO | WO 2007/076321 | 7/2007 |
| WO | WO 2007/145999 | 12/2007 |
| WO | WO 2008/014334 | 1/2008 |
| WO | WO 2008/022083 | 2/2008 |
| WO | WO 2008/022084 | 2/2008 |

OTHER PUBLICATIONS

H.X. Mel and Doris Baker, Cryptography Decrypted, 2001 Addison Wesly, chapters 9 to 12.

Virginia Lottery games, downloaded from www.archive.org, Apr. 29, 2007.

Pop Cap Games, Bejeweled, Feb. 3, 2005, http://web.archive.org/web/20050203202244/http://www.go2share.net/game/bejeweled/index.htm.

John Scarne, Scarne's Complete Guide to Gambling, 1961, Simon & Schuster, New York, chapter 4 on lotteries, pp. 125-126.

Wikipedia, "Wheel of Fortune (US Game Show)" Wikipedia, Nov. 13, 2007 <http://en.wikipedia.org/wiki/Wheel_of_Fortune_%28US_game_show%29>.

New Jersey, State of, "Wheel of Fortune" New Jersey Lottery, Nov. 13, 2007 <http://www.state.nj.us/lottery/instant/ig409.htm>.

New Jersey, State of, "Lots O' Spots Bingo" New Jersey Lottery, Dec. 6, 2007 <http://www.state.nj.us/lottery/instant/ig340.htm>.

http://www.powerball.com/powerball/pb_howtoplay.asp, accessed Sep. 14, 2008, All.

Written opinion of the international searching authority (international application No. PCT/US07/76224).

Examiner's first report on patent application No. 2003298941.

Bejeweled Deluxe, Version 1.87, Developed and published by PopCap Games, Inc., www.popcap.com, http://www.popcap.com/faq/bejeweled/1033/pc/readme.html (1of 8) Feb. 25, 2010 9:14:22 AM.

David, Matthew, Online Games Development in Flash—A Brief History, Apr. 28, 2003, SitePoint, http://articles.sitepoint.com/print/flash-brief-history (1 of 6) Jun. 18, 2010 8:28:50 AM.

* cited by examiner

METHOD AND APPARATUS FOR PROVIDING PLAYER INCENTIVES

RELATED APPLICATIONS

This application is a continuation-in-part of, and claims priority under 35 U.S.C. §120 to, U.S. patent application Ser. No. 11/001,775 entitled "METHOD AND APPARATUS FOR CONDUCTING A GAME OF CHANCE," filed on Nov. 30, 2004; which claims priority under 35 U.S.C. §119(e) to U.S. Provisional Application Ser. No. 60/569,030, entitled "METHOD AND APPARATUS FOR CONDUCTING A GAME OF CHANCE," filed on May 7, 2004, both of which are herein incorporated by reference in their entirety. Furthermore, this application is a continuation-in-part of, and claims priority under 35 U.S.C. §120 to U.S. patent application Ser. No. 11/704,144, entitled "METHOD AND SYSTEM FOR REMOTE ENTRY IN FREQUENT PLAYER PROGRAMS," filed on Feb. 8, 2007 which claims priority under 35 U.S.C. 119(e) to U.S. Provisional Application Ser. No. 60/771,505, entitled "METHOD AND SYSTEM FOR REMOTE ENTRY IN FREQUENT PLAYER PROGRAMS," filed on Feb. 8, 2006, and to U.S. Provision Application Ser. No. 60/838,234, entitled "METHOD AND APPARATUS FOR CONDUCTING A GAME OF CHANCE," filed Aug. 17, 2006, which applications are herein incorporated by reference in their entirety. This application is also a continuation of U.S. patent application Ser. No. 11/780,882 entitled "METHOD AND APPARATUS FOR PROVIDING PLAYER INCENTIVES," filed on Jul. 20, 2007, which is incorporated by reference herein. The 11/780,882 application is a continuation-in-part of, and claims priority under 35 U.S.C. §120 to, U.S. patent application Ser. No. 11/001,775 entitled "METHOD AND APPARATUS FOR CONDUCTING A GAME OF CHANCE," filed on Nov. 30, 2004, which claims priority under 35 U.S.C. §119(e) to U.S. Provisional Application Ser. No. 60/569,030, entitled "METHOD AND APPARATUS FOR CONDUCTING A GAME OF CHANCE," filed on May 7, 2004. The 11/780,882 application is also a continuation-in-part of, and claims priority under 35 U.S.C. §120 to, U.S. patent application Ser. No. 11/704,144, entitled "METHOD AND SYSTEM FOR REMOTE ENTRY IN FREQUENT PLAYER PROGRAMS," filed on Feb. 8, 2007 which claims priority under 35 U.S.C. 119(e) to U.S. Provisional Application Ser. No. 60/771,505, entitled "METHOD AND SYSTEM FOR REMOTE ENTRY IN FREQUENT PLAYER PROGRAMS," filed on Feb. 8, 2006, and to U.S. Provision Application Ser. No. 60/838,234, entitled "METHOD AND APPARATUS FOR CONDUCTING A GAME OF CHANCE," filed Aug. 17, 2006. The 11/780,882 application also claims priority under 35 U.S.C. 119(e) to U.S. Provisional Application Ser. No. 60/928,855, entitled "METHOD AND APPARATUS FOR PROVIDING PLAYER INCENTIVES," filed May 11, 2007, and to U.S. Provisional Application Ser. No. 60/838,234, entitled "METHOD AND APPARATUS FOR CONDUCTING A GAME OF CHANCE," filed Aug. 17, 2006. This application also claims priority under 35 U.S.C. 119(e) to U.S. Provisional Application Ser. No. 60/928,855, entitled "METHOD AND APPARATUS FOR PROVIDING PLAYER INCENTIVES," filed May 11, 2007, and to U.S. Provisional Application Ser. No. 60/838,234, entitled "METHOD AND APPARATUS FOR CONDUCTING A GAME OF CHANCE," filed Aug. 17, 2006, both of which applications are incorporated herein by reference in their entirety.

FIELD OF THE INVENTION

The field of the invention relates generally to gaming, and more particularly to providing incentives to players.

RELATED ART

People enjoy playing games and often regard a prize won by playing a game to be more valuable than that of the prize itself. Just the chance to win a prize provides considerable entertainment. Games are often used to induce persons to visit a location in order to obtain a game entry, check game outcomes and/or redeem prizes won. The well-known McDonalds restaurant, for example, provides scratch-off game cards with prizes of cash and other awards as prizes. Such scratch-off tickets are provided free of charge without a purchase requirement. To obtain a free game card, people need only to visit a local McDonalds location.

The well-known Publisher's Clearing House sweepstakes offers the chance to win large sums of money just by returning a form which is entered into a future sweepstakes drawing for the cash prizes. People receiving the offer could return the sweepstakes entry alone, or may include an order for magazine subscriptions (requiring payment) along with the sweepstakes entry.

Games which require a purchase are also well-known. For example, to play slot machines or gaming tables in Las Vegas, people are required to make a wager. Casinos sometimes issue free or reduced price wagers to entice people to visit a casino location. For example, an enticement of $20 in free play might be included in a direct mail piece. A person that receives such a mailer can simply bring the mailer to a designated casino location within defined time limits and receive that amount in coins, free credits on a gaming machine or promotional chips for play on table games. While such offers are enticing, they often are not strong enough to overcome the effort of returning to the casino and often times, people simply forget about the offer and do not return within the allotted time to collect their incentive.

Some casinos offer promotional games on the casino floor, wherein players redeem their free credit entitlement in the form of a game which can randomly award one of several amounts of free credits for casino game play, which are redeemable immediately or at a later time to encourage return visits. In some cases, the person must return at a later time just to learn the award value. People are sometimes reluctant to revisit the casino to learn of a prize value or to collect a prize due to the passage of time, disengagement from the game process or simple forgetfulness.

Player tracking systems, such as International Game Technology's Advantage system and Bally Technology's Slot Management System and Table Management System are also well known. Player tracking systems are useful for automating some or all of the tasks required to provide additional incentives for frequent or loyal play. For example, points may be awarded for every unit of wagers made and those points may be redeemed for prizes.

Player tracking systems utilize magnetic striped cards to hold a unique identifier which is associated with a specific person's account. Each gambling machine and/or table game position is equipped with a compatible card reader. A person wishing to allow their gambling activities to be monitored inserts their card into the compatible card reader. Other identification techniques are also useful with player tracking systems and include but are not limited to biometric identification, smart cards and Hollerith cards. In some cases, additional identity authentication is required such as entering a PIN or password on a keypad or touchscreen.

Most player tracking systems, include a display which provides acknowledgment that the card was accurately read and associated with an account. Typically, for so long as the person's card remains inserted in the reader, all gambling activity that occurs on the associated gambling game is recorded on the identified account.

All card readers and displays associated with the player tracking systems are connected via a network to one or more central servers where account records are kept. Player tracking systems are well-known in the gambling industry. Example player tracking system architectures are found in U.S. Pat. No. 5,429,361 entitled "Gaming machine information, communication and display system" and U.S. Pat. No. 5,655,961 entitled "Method for operating networked gaming devices," both of which are herein incorporated by reference.

Player tracking systems are also used to automatically provide awards to players as described in U.S. Pat. No. 6,712,697 entitled "Method for crediting a player of an electronic gaming device" which is also incorporated by reference herein.

Although gambling is a popular activity, a great percentage of the worldwide populations do not gamble. This is true even after excluding underage persons, those with insufficient disposable income and those with a religious or other belief that prevents them from gambling as recreation. It is expensive for the casino to market to the general population because so many people are unqualified for gambling because of age restrictions or the biases of personal belief. And the burden of making a first-ever visit to the casino are comparatively high in terms of comfort and convenience, so incentives must be disproportionately large. As a result of these factors, most gambling venues, such as casinos, find it prohibitively expensive to recruit new players to the extent desired.

There are many different types of games that can be provided for entertainment separate from the casino environment. For instance, lottery tickets are sold through retailers using machines referred to as point of sale (POS) terminals to permit players to play such games. These tickets are generally printed at the POS terminal, and are usually issued for some lottery drawing to be performed at a later time. Examples of these types of lottery games of chance include traditional state lottery drawings and multi-state lottery drawings (e.g., PowerBall). Another well-known drawing-based game includes the game of Keno. Further, there are many online games that can be played using a computer system coupled to a communication network (e.g., the Internet). These games may include traditional games of chance, games of skill, and casino-type games, among others, some of which may involve online gambling.

Numerous organizations and companies have incentive programs for customers. For example, airlines have frequent flyer programs that allow a member passenger to take free trips or provide other perks after the member has taken a minimum number of flights or has flown a minimum number of miles. Numerous other types of establishments, including hotel chains, chain stores, and movie rental companies, have similar programs used to incentivize a customer.

Casinos also often have similar frequent player programs that provide incentives for continued customer patronage. For instance, the Foxwoods Casino (Mashantucket, Conn.) offers a program referred to as Wampum Rewards. A player participating in the program receives a card which the player uses whenever he/she comes to the casino. In one example implementation, the player swipes the card at special kiosks located within the casino which permit that player to have a chance to win prizes. A Wampum Rewards member may also swipe his or her card whenever betting or spending money within the casino and in the associated hotel, resort, or shops. As the player bets or spends more money, the player becomes eligible for free or reduced cost perks. Other examples of frequent player programs used in the casino environment include the well-known Harrah's Total Rewards, Wynn Casino's Red Card, and Trump Casinos' Trump Card programs.

As with frequent flyer programs and other types of incentive programs, typical goals of the casino frequent player program include increasing player loyalty, providing incentives to a player to visit the associated casinos as often as possible, and encouraging the player to spend as much money in the associated establishments as possible. To further improve the effectiveness of player loyalty programs, there is a present and recurring need for new methods to provide incentives to frequent player program members.

SUMMARY OF THE INVENTION

New and more interesting game formats are needed for lottery and casino type games that keep players' interest and therefore result in continued and/or return players. According to one aspect of the present invention, a method is disclosed for providing additional incentives for a player to visit a gambling location (e.g., a land-based casino or other gaming establishment).

According to one aspect of the present invention, it is appreciated that it may be desirable to create games that provide prizes that provide people the opportunity to play games for free, a specific fee or at a discounted fee at locations away from the casino in order to win incentives that will encourage them to visit a casino or other gambling location. It is also desirable to invite qualified persons to either return to or initially visit a gambling location based upon their projected interest in gambling and their projected worth as a gambling customer. It is further desirable to automate some or all of the monitoring and fulfillment process using computer networks such as those found within the Internet infrastructure and the gambling location's player tracking infrastructure.

In one example game format consistent with principles of the present invention, a player participating in a frequent player program is provided a prize to encourage the player to return to the casino or other establishment. The prize may be in the form of, for example, a non-cashable credit for playing additional games, a complimentary offer, and/or promotional prizes. In this way, the casino or other establishment generally can increase revenue as the number of return players increases. In one example game format, the player is presented the non-cashable credit, complimentary offer, and/or promotional prize in an interface of a computer system. For instance, the player may be revealed the awarded prize(s) in a computer system coupled to the Internet that communicates with a website of an operator.

The player may be incentivized to visit the gambling location of the operator by receiving a coupon to redeem on the operator's property. The coupon may be associated with a frequent player program identifier (e.g., an account number, name, etc.) that is assigned to the player. In one embodiment, the player may be permitted to reveal the prize associated with the coupon in the interface of the computer system. In one form, the prize may be revealed during play of an online computer-based game.

As discussed, the prize may be redeemed on the operator's property, thereby encouraging the player to return to the gambling location. In another example, the prize is awarded after the player's experience on the operator's property, increasing the likelihood that the player will return to the operator's property to redeem the prize. The prize, in one embodiment, may include a non-cashable credit for playing additional games, and thus, the play of additional games may increase revenue for the gaming operator. Other prizes (e.g., complimentary offers, promotional prizes, etc.) separate from the casino may be provided which enhance the player's experience and encourage return.

In another aspect of the present invention, a player's participation in the frequent player program coupled with continued play by the player may increase the player's chances of winning a prize, thereby encouraging continued play. In one embodiment, the prize may be an entry in a sweepstakes, and increased play of the player on the operator property may increase the chances of the player to win the sweepstakes. Players may be awarded increased chances for particular types of behavior, such as, for example, length of play on a particular device, amount of money spent within a period of time, or other parameter associated with types of game play that the operator wishes to encourage.

According to another aspect of the present invention, a player is incentivized to return to a casino or other gambling location through the play of an online game. According to another aspect of the present invention, the game may be an online game that provides one or more revealed outcomes to a player during play of the online game (referred hereinafter as a "reveal-based game"). To this end, various aspects of the present invention may be facilitated using a reveal-based game conducted over a communication network such as, for example, the Internet. According to one aspect of the present invention, a player may be awarded a prize during play of the reveal-based game, wherein the player may be required to return to the casino or other gambling location to redeem the award. In this way, the online game is used to incentivize players to return to the gambling location, increasing the opportunity to increase revenues.

According to yet another embodiment of the present invention, it is appreciated there is a great deal of effort and expense to introduce additional games, especially in the casino area. In particular, as each game is introduced, its features are scrutinized by regulators prior to introduction. It therefore would be beneficial to be able to reduce the regulatory effort in introducing new games that are exciting to players to play. To this end, according to one aspect of the present invention, a system is provided having two games, one of which is already approved by regulators whose outcomes are used to drive outcomes of another game. Because the outcome determination and odds of winning the other game are driven by a previously-approved game, the regulatory hurdles associated with releasing the other game are reduced.

In one aspect of the present invention, the player is permitted to play a computer-based game (referred to hereinafter as a "primary" game) during which the game playing system reveals results of another game (referred to hereinafter as a "secondary" game) such as a reveal-based game in an online game experience as discussed above. Also as discussed, the primary game may be used to reveal one or more awards to the player. Such awards may be predetermined based on selection criteria of an award to the player (e.g., based on action(s) of the player, information about the player, or any other player-related criteria). However, in some cases, the player may be entered in a sweepstakes or drawing which may be determined at a later time as a result of a secondary game.

This secondary game may be a casino or lottery-based game and, according to one embodiment, this secondary game is already approved by regulators. One such game is the well-known game of Keno. However, it should be appreciated that the secondary game may be any other type of game (e.g., a lottery game). The primary game may be any type of computer-based game, including games of skill and/or chance, such as card games, casino games, video games or any other type of game through which a result from another game may be revealed. In one aspect of the present invention, the play of the primary game that the player plays does not affect the outcome of the secondary game. In another aspect of the present invention, the secondary game result does not affect the outcome of the primary game played by the player.

In one example, the primary game involves some level of influence by the player on the outcome of the primary game. For instance, the primary game may be a game of skill. However, it should be appreciated that the primary game be a game based on chance, or combination of skill and chance, and that any type of game can be used to reveal an award to the player. In one example, the primary game may be similar to the well-known game of COLLAPSE (COLLAPSE is a trademark of GameHouse, Inc., Seattle Wash.) and its variations. As is known, COLLAPSE is a game of skill that allows the player to earn points by removing elements from a game grid. COLLAPSE and similar games involve a window having a grid having colored elements where new lines of the grid are fed into the bottom of the grid periodically. A player removes groups of three or more similarly-colored elements by selecting them within the grid. The player may be permitted to play the game of COLLAPSE (or similar game), during which the result of the primary game is revealed over one or more instances of the COLLAPSE-type game. However, it should be appreciated that the result (or any other indication) may be revealed to the player during, before, or after play of any instance of an online game.

According to one aspect of the present invention, the COLLAPSE-type game is combined with a second level game. Play of the second level game may proceed after some achievement level in the COLLAPSE-type game. For instance, points may be awarded in the COLLAPSE-type game, and in one embodiment, the second level may proceed after the player achieves a particular point total as further discussed below. Alternatively, the player may play the COLLAPSE-type game until completion, and at the end of the COLLAPSE-type game, the player begins playing the second level game.

According to one aspect of the present invention, the result of the primary game is stored on a server coupled to a computer system upon which the game is played. In one example, the result is downloaded to the computer system prior to game play. The result may be in the form of intermediate results of each game instance that are displayed to the player at various points during game play. For instance, intermediate results may be displayed to a user during an instance of a COLLAPSE-type game.

In one embodiment of the present invention, the traditional game of COLLAPSE or similar game is coupled with a second level game. Further, during the play of the COLLAPSE-type game, one or more items are awarded to the player for use in the second level game. For instance, items are awarded when particular one(s) of the elements are removed from the grid. In the example of the COLLAPSE-type game, there may be an indication that one or more of the elements of the grid contains an item (e.g., one that may be used with a second level game). This indication may be, for example, a graphical, textual, or other symbolic indication that the element contains an item. In one example, this indication may be the same or similar element used to indicate that there is a hidden item associated with the element. The type of hidden item may not, according to one embodiment, be known by the user until the hidden item is revealed during game play. In one example, when the element having the hidden item is selected (or removed from the grid), the game program displays the item to the player.

In another example, the grid may contain more than one hidden item, and these items may be collected by the player as hidden items are revealed. When the game has ended, the player may use the one or more collected items in the second level game. In one example game, the items revealed during the game of COLLAPSE are used to open hidden items in a second level game. For instance, the second level game includes a series of safes (or other element type) which are opened (and their hidden items revealed) with items collected during the play of the COLLAPSE-type game. In one example, the items are representations of sticks of dynamite that are used by the user to open the safe. However, it should be appreciated that the items may be any type of item that can be used in a second level game.

Hidden items revealed during the second level of play may be, for example, a cash prize awarded for a particular game. It should be appreciated, however, that other prizes may be awarded (e.g., merchandise, credit, free play, etc.) and that the invention is not limited to any particular prize type.

According to one aspect of the present invention, prizes revealed during the second level game may be stored in a database of the server and downloaded to the client prior to play. In this example, the player may be allowed, when a invitation is received (e.g., when a ticket is purchased at a POS, the player receives an e-mail invitation, etc.), the ability to play a number of instances of the game. Prizes may be awarded, for example, at each instance of the second level of the online game. To this end, the result of each prize may be stored in the database of the server, and may be indexed by an identifier of the invitation (e.g., a ticket identifier). For example, the identifier may be a serial number or other identifying information.

According to one aspect of the present invention, prizes are only awarded in the second level game. In another example, after a prize is revealed (or not) in the second level game, the player is permitted to play any remaining instances of the primary game (e.g., a slot-machine type game or COLLAPSE-type game). According to another embodiment, the player may not be permitted to replay game instances after they have been played. To this end, a game-playing system may maintain a status of the game instances played by the player. The game-playing system may maintain other information, such as game play information, how prizes are revealed to the player, and other information that may be useful for assessing or auditing game play and playing experiences of the player.

Each instance of the game may include an associated prize (or not), and these prizes may be combined for an overall prize associated with the ticket. In one example, the prize associated with the first instance of the COLLAPSE-type game and its second level is $10.

Each instance of the game may include an associated prize (or not), and these prizes may be combined for an overall prize associated with the ticket. In one example, the prize associated with the first instance of the COLLAPSE-type game and its second level is $10. A prize associated with a second instance of the COLLAPSE-type game and its second level is $15. The prizes associated with each instance of the COLLAPSE-type game and its second level may be stored as an entry in the database of the server.

Alternatively, the result of each prize for each instance of the game may be determined dynamically by the client computer. For example, if the overall prize (e.g., $25) for the ticket is known, the client can determine (e.g., randomly) a distribution of winnings of the overall prize among game instances. In the example above, a play of the ticket on one computer could award a $25 prize among two game instances as follows: $5 prize for the first game instance and $20 for the second game instance. Another play of the ticket on the same or different computer may award a $25 prize differently among the two game instances (e.g., $10 for the first game instance, $15 for the second game instance, etc.). It should be appreciated, however, that the game may include any number of game instances, and the prize associated with each game instance may be stored in any storage location (e.g., at the client computer, at the server, etc.).

In another example system, prizes may be awarded in association with each item collected in the game (e.g., a stick of dynamite in a COLLAPSE-type game). Therefore, prizes may be distributed among hidden items in the game grid as well as being distributed among game instances. As discussed, prize distribution may be stored in a database of the server, may be determined by the client (e.g., randomly), or may be stored at any location or be determined by any manner by the client.

According to another aspect of the present invention, an improved game experience is provided for revealing the result of an online game. As discussed above, a player purchases a ticket or other game piece at a POS or other location. On the ticket, multiple plays of an associated online game are provided with each ticket or other game piece. The player can play those multiple plays across a set of games. For instance, the set of games may include, for example, games of skill and/or chance as discussed above. Certain games may include one or more attempts (or opportunities) for winning prizes. These opportunities for winning may be associated with one or more prizes. For example, a player playing a slot machine may be awarded a certain number of opportunities to play a game (e.g., a game instance (or game play) or other opportunity to win a prize when playing a particular game instance). In the case of a slot machine game, the player may be given a particular number of spins of the slot machine game, and, as a result of each spin, the player may be awarded (or not) a prize. In one embodiment, the result of the overall game is predetermined, and a game experience is determined for each opportunity (e.g., spin) that results in a contribution to the result of the overall game.

According to one embodiment of the present invention, the type of game that is played is immaterial to the outcome revealed to the player. More particularly, the same outcomes associated with a particular ticket may be used to drive multiple types of games. This allows, for example, the gaming operator to offer multiple types of games with a single ticket, and allows the player to select which game(s) to play to reveal the outcomes associated with the particular ticket. For instance, the player may elect to play a slot machine game for a first game instance of a ticket, and for a second instance, play a COLLAPSE-type game. Of course, it should be appreciated that any type of game and other combinations of games are possible. In this manner, the player may be provided the flexibility to play particular games in which the player is interested, thereby increasing his/her interest and participation in the game. Further, the game operator is provided additional flexibility as new games may be introduced/substituted that are associated with the same ticket or other game piece.

According to one embodiment of the present invention, the outcome of the game is predetermined at the time of ticket printing, issuance, or purchase or shortly thereafter. That is, the game outcome associated with a particular ticket is available prior to, at the same time, or shortly thereafter the ticket is provided to the player, after which time the player is permitted to play any games to reveal the predetermined outcome. In another embodiment, outcomes associated with tickets issued to the player are determined some time after the ticket issuance (i.e., outcomes are "post-determined"). Such is the case with Keno or other drawing-based games wherein game outcomes are determined after ticket issuance. In such a game, players are permitted to obtain the outcome at a predetermined time, usually after the player has purchased the ticket. In one aspect of the invention, it may be beneficial to have a later activation of tickets, especially in the case of a ticket-based game where tickets are issued in some other gaming environment (e.g., a casino). It may be desirable to only permit the player to play such a game outside the gaming environment so as not to compete with other games. Additionally, it may be desirable to require the player to revisit the gaming environment to redeem the ticket and increase the chances that the player will purchase additional tickets or play other types of games offered in the gaming environment.

Also, according to another aspect of the present invention, a first game may be used to reveal the result of a second game. As discussed above, this second game may be one which is already approved by regulators. Such a system may be, for example, a game whose results are driven by a random number generator (or RNG as referred to in the art). One such game is the well-known game of Keno. Another game that may be used is the well-known game of bingo. Other games may be used to drive the result of an online game.

In one example, a Keno game and its associated system are used to generate reveal results which are revealed to a player during play of an online game. To this end, a Keno-based system may be used in conjunction with an online gaming system to present new and interesting online games whose outcomes are driven by results provided by the Keno system. In one particular example, a Keno system provides a correlation of a ticket identifier to a Keno game which is held at some predetermined time. As the Keno numbers are drawn, an outcome is produced associated with the particular ticket identifier and provided to an online gaming system. The online gaming system uses the produced outcome to render a new and interesting gaming experience within an online gaming environment. As discussed, such an environment may include online play of one or more online games of skill, chance, or combination thereof.

According to one embodiment of the present invention, wins are optimized across game instances associated with a ticket. For instance, a ticket may have a predetermined outcome (for example, awarding a prize of $50), that may be allocated across the game instances associated with that ticket. For example, in the case of winning $50 on a 5-play (5 game instances) ticket, it may be desired to allocate the wins across game instances to provide a particular game experience. For instance, the game experience of winning $50 may be distributed across five game instances (e.g., five separate games, respectively winning $5, $0, $0, $5, $40) to provide the player an early indication of winning. Also, the remaining game play of the game instances may be scripted to build the drama of the game experience while still retaining player interest. Such a scripted outcome is more interesting, according to one embodiment, as the player is presented an outcome in a way such that retains interest in the game. This is beneficial, as an overall result includes extending scratch-type games or other type of game experience beyond the point of sale, and beyond the instant (but fleeting) gratification associated with scratch-type or other instant ticket game experiences.

According to one embodiment, a player is permitted to wager and redeem bets at authorized locations (e.g., legal jurisdictions such as lottery retail establishments, casinos, and the like) while the online portion of the game may be played in any locale or jurisdiction. In such a case, the casino or lottery experience is extended to locations where otherwise lottery and/or casino games are not available. Thereafter, players return to the lottery or casino establishment to redeem their tickets thereby providing yet another opportunity to entertain the player. According to one embodiment, the player is required to return to the lottery or casino location to redeem their award.

According to yet another aspect of the present invention, winning results may be split across opportunities to win. One embodiment of the present invention relates generally to how wins are shown to the player across win opportunities. In one specific example, one embodiment relates to a method for revealing wins to a player across a play of multiple game instances that build excitement for the player and which holds the interest of the player in continuing to play the game. It is appreciated that the game experience may be made more compelling if wins are distributed among win opportunities in an interesting way.

Another method for maintaining the interest of players includes awarding additional opportunities to win with each ticket. For instance, one of the prizes awarded with a particular opportunity to win (e.g., during the play of the game instance) may be one or more additional opportunities to win. For instance, in a slot machine game, an issued ticket may be associated with five (5) spins. One of the prizes awarded with the ticket may include additional spins. At the time of initial ticket activation, it may be predetermined that the ticket is associated with these additional opportunities to win, and these additional opportunities may be associated with the issued ticket. The player, when playing the game, will obtain additional satisfaction in playing because the number of game instances to be played by the player are increased, and therefore, their opportunity to win is also increased. This may be beneficial to create a more realistic gaming experience (such as in casino slots) where additional spins may be awarded during casino play. However, unlike casino play wherein slot play can be continued from an online account or by placing additional bets to create a more continuous game experience, the additional spins are awarded to a single ticket.

In the case where an online game system is a Keno-based or other drawing-based systems wherein results are not predetermined, additional opportunities to win may be associated with the ticket in the form of additional numbers selected by a computer system and associated with the ticket at the time of a drawing. This may be performed, for example, by assigning one or more additional drawing entries as a prize itself in the pay table associated with the Keno or other drawing-based game. More particularly, the drawing entries may be awarded as prizes, which themselves are indexes into other entries in the same pay table. Such additional entries may correspond to one or more prizes. For example, when the drawing occurs, the additional plays are awarded to the drawing numbers associated with the ticket. These drawing numbers may be associated with a particular game instance, of which there may be many associated with one ticket. At the point when the ticket is activated by the result of the drawing and play of the online game is permitted, the player, upon the beginning of play of the ticket or a particular game instance, the player is awarded the additional plays (and therefore, any prizes) associated with these additional plays. The additional plays may be played as additional game instances, which themselves have additional reveal opportunities. Alternatively, additional reveal opportunities may be added to one or more other game instances to make game play more exciting.

According to another aspect of the present invention, a method is presented for providing players an enhanced gaming experience. According to one embodiment, it is appreciated that it is beneficial to enhance players' interest in playing games, particularly losing ones. In one embodiment, an illusion is presented to players to provide the illusion of being very close to winning a particular game. For instance, in the case of a slot machine, the slot machine result may indicate, in a three-wheel slot machine, that the player received a winning combination of two of the first wheels, and only with the revealing of the last wheel does the player realize that he/she has lost the game. According to one aspect, it is realized that the losing game experience should compel the player to continue playing the game.

In another example system, prizes may be awarded in association with each item collected in the game (e.g., number of points in a slot machine type game). Therefore, prizes may be distributed among elements or levels during play as well as being distributed among game instances. As discussed, prize distribution may be stored in a database of the server, may be determined by the client (e.g., randomly), or may be stored at any location or be determined by any manner by the client.

According to another aspect of the invention, it is appreciated that conventional methods for playing online games of chance are not secure. In particular, because the result or outcome of the game or predetermined sequence of game states may be encoded on a ticket, the lottery game may be compromised if the winning codes are deciphered. Such a deciphering could occur, for example, by hacking a computer system associated with the online lottery and obtaining a list of winning tickets, or reverse engineering software (e.g., on a PC) where the winning codes or sequence of game states may be stored. Further, it is realized that in such conventional systems, the lottery ticket or the online game software and its data are single points of security failures in the system.

One aspect of the present invention relates to a method for conducting a game of chance. According to one embodiment, a more secure method is provided by which an online game may be played. Instead of placing a game seed that determines a sequence of game states on a ticket (e.g., an instant scratch or lottery ticket), the game states or outcomes may not be placed on the ticket. Rather, the outcomes may be stored in an online database. To this end, a code may be stored on the ticket, the code being used as a decryption key used to find the outcome stored in the database. In particular, there may be a mapping between an outcome code and a corresponding decryption key that is printed on the ticket.

Because the decryption key is placed on the ticket, unauthorized access to the online game is not permitted without the physical ticket. In another embodiment, a portion of the decryption key is placed on the ticket, and another portion is stored in a database associated with the online game. In this manner, security cannot be breached without having both portions of the key (either having the issued ticket portion or the online portion). Thus, a hacker may not compromise a lottery ticket database without the ticket, and, by virtue of having a winning ticket, other winning ticket numbers may not be determined. Access to the online portion of the key may be obtained, for example, by providing some other information (e.g., a serial number printed on the ticket). However, it should be appreciated that the information used to gain access to the online portion of the key need not be printed on the ticket—the information may be provided on some other medium or by another method.

The ticket may be, for example, a scratch-type lottery or "instant" ticket, pull-tab, or type of pre-printed ticket type. Alternatively, the ticket may be a printed lottery ticket as is known in the art, which is a ticket printed at a Point of Sale (POS), usually in the form of a lottery drawing ticket (e.g., PowerBall or other type lottery drawing game). Also, the ticket may be an electronic ticket issued by a computer system. It should be appreciated that the ticket may be any type of ticket issued in any form, and the invention is not limited to any particular ticket type method of issuing a ticket.

According to one aspect of the present invention, a method to provide incentive for a person to take an action in at least one gambling location is provided. The method comprises acts of a) inviting a qualified person to play an electronic game not located at the gambling location; b) permitting, within a specified time period, the qualified person to complete electronic game play which has a plurality of outcomes, at least one of which is a winning outcome; and c) permitting the qualified person to redeem an outcome, wherein the qualified person must take an action in at least one redemption location within a specified time period.

According to one embodiment of the present invention, the at least one redemption location includes the gambling location. According to another embodiment, the method further comprises an act of qualifying the person to play the electronic game.

According to another embodiment, the method further comprises an act of determining whether to perform the act of inviting responsive to the act of qualifying of the person. According to another embodiment, the method further comprises an act of identifying the person. According to another embodiment, the act of inviting is responsive to an act of performing an action by the person in the gambling location.

According to another embodiment, the act of inviting is responsive to an act of performing an action by the person at a location outside the gambling location. According to another embodiment, the act of inviting is responsive to an act of an event occurring within the gambling location. According to another embodiment, the act of qualifying the person includes acts of obtaining demographical information related to the person, and determining a status of the person based on the demographical information. According to another embodiment, the act of qualifying the person further comprises an act of determining a status of the player based at least in part on previous play by the player. According to another embodiment, the act of qualifying the person further comprises an act of determining a status of the player based at least in part on current game play by the player.

According to another aspect of the present invention, a method to provide incentive for a person to take an action in at least one gambling location is provided, the method comprising acts of a) inviting a qualified person to play an electronic game not located at the gambling location; b) permitting the qualified person to play the electronic game, the game having a plurality of outcomes, at least one of which is a winning outcome; and c) permitting the qualified person to redeem an outcome in at least one redemption location. According to one embodiment, the at least one redemption location includes the gambling location. According to another embodiment, the method further comprises an act of qualifying the person to play the electronic game.

According to another embodiment, the method further comprises an act of determining whether to perform the act of inviting responsive to the act of qualifying of the person.

According to another embodiment, the method further comprises an act of identifying the person. According to another embodiment, the act of inviting is responsive to an act of performing an action by the person in the gambling location. According to another embodiment, the act of inviting is responsive to an act of performing an action by the person at a location outside the gambling location. According to another embodiment, the act of inviting is responsive to an act of an event occurring within the gambling location.

According to another embodiment, the act of qualifying the person includes acts of obtaining demographical information related to the person, and determining a status of the person based on the demographical information. According to another embodiment, the act of qualifying the person further comprises an act of determining a status of the player based at least in part on previous play by the player. According to another embodiment, the act of qualifying the person further comprises an act of determining a status of the player based at least in part on current game play by the player.

According to another aspect of the present invention, a method to provide incentive for a person to take an action in at least one gambling location is provided, the method comprising acts of: a) inviting a qualified person to play an electronic game not located at the gambling location; b) permitting the qualified person to play the electronic game; c) revealing an outcome to the player during play of the electronic game; and c) permitting the qualified person to redeem an outcome in at least one gambling location. According to one embodiment, the at least one redemption location includes the gambling location.

According to another embodiment, the method further comprises an act of qualifying the person to play the electronic game. According to another embodiment, the method further comprises an act of determining whether to perform the act of inviting responsive to the act of qualifying of the person. According to another embodiment, the method further comprises an act of identifying the person. According to another embodiment, the act of inviting is responsive to an act of performing an action by the person in the gambling location.

According to another embodiment, the act of inviting is responsive to an act of performing an action by the person at a location outside the gambling location. According to another embodiment, the act of inviting is responsive to an act of an event occurring within the gambling location. According to another embodiment, the act of qualifying the person includes acts of obtaining demographical information related to the person, and determining a status of the person based on the demographical information. According to another embodiment, the act of qualifying the person further comprises an act of determining a status of the player based at least in part on previous play by the player. According to another embodiment, the act of qualifying the person further comprises an act of determining a status of the player based at least in part on current game play by the player.

According to another aspect of the present invention, a method to provide incentive for a person to take an action in at least one gambling location is provided, the method comprising acts of: a) inviting a qualified person to play an electronic game not located at the gambling location; b) permitting the qualified person to play the electronic game, the game having a plurality of outcomes, at least one of which is a winning outcome; and c) accumulating a plurality of winning outcomes including the at least one winning outcome, the plurality of winning outcomes being capable of being redeemed. According to one embodiment, the method further comprises an act of permitting the qualified person to redeem the plurality of winning outcomes in at least one redemption location.

According to another embodiment, the at least one redemption location includes the gambling location. According to another embodiment, the method further comprises an act of correlating the plurality of winning outcomes with at least one non-cashable credit that can be used by the qualified person at the gambling location. According to another embodiment, the method further comprises an act of qualifying the person to play the electronic game. According to another embodiment, the method further comprises an act of determining whether to perform the act of inviting responsive to the act of qualifying of the person.

According to another embodiment, the method further comprises an act of identifying the person. According to another embodiment, the act of inviting is responsive to an act of performing an action by the person in the gambling location. According to another embodiment, the act of inviting is responsive to an act of performing an action by the person at a location outside the gambling location. According to another embodiment, the act of inviting is responsive to an act of an event occurring within the gambling location.

According to another embodiment, the act of qualifying the person includes acts of obtaining demographical information related to the person, and determining a status of the person based on the demographical information. According to another embodiment, the act of qualifying the person further comprises an act of determining a status of the player based at least in part on previous play by the player. According to another embodiment, the act of qualifying the person further comprises an act of determining a status of the player based at least in part on current game play by the player.

According to another aspect of the present invention, a method is provided for conducting a game. The method comprises acts of inviting a person to play an electronic game not located at the redemption location, the game having a plurality of outcomes, at least one of which being a winning outcome; permitting the person to play the game to obtain at least one of the plurality of outcomes; and if the at least one of the plurality of outcomes is a winning outcome, requiring the person to redeem the at least one outcome at the redemption location. According to one embodiment, the person is required to play the game to obtain the at least one of the plurality of outcomes within a specified time period.

According to another embodiment, the method further comprises an act of qualifying the person to play the computer-based game. According to another embodiment, the act of qualifying the person includes acts of obtaining demographical information related to the person, and determining a status of the person based on the demographical information. According to another embodiment, the act of qualifying the person further comprises an act of determining a status of the player based at least in part on previous play by the player. According to another embodiment, the act of qualifying the person further comprises an act of determining a status of the player based at least in part on current game play by the player.

According to another embodiment, the act of qualifying the person further comprises an act of determining a type of gambler the person may be. According to another embodiment, the plurality of outcomes is based at least in part on the qualification. According to another embodiment, the method further comprises an act of determining whether to perform the act of inviting based on a qualification of the person.

According to another embodiment, the method further comprises an act of determining a set of possible outcomes based on the qualification. According to another embodiment, the redemption location includes a gambling location. According to another embodiment, the method further comprises an act of redeeming the at least one outcome in response to an action performed by the person at the redemption location. According to another embodiment, the electronic game is played by the person on an electronic system separate from gambling systems associated with the gambling location.

According to another embodiment, the method further comprises an act of identifying the person. According to another embodiment, the method further comprises an act of collecting personal information from the person. According to another embodiment, the method further comprises an act of obtaining information related to the person from at least one database using at least a portion of the collected personal information. According to another embodiment, the method further comprises an act of requiring the person to redeem the at least one outcome within a specified time period.

According to another embodiment, permitting the person to play the game to obtain at least one of the plurality of outcomes includes an act of purchasing an entry to play the electronic game. According to another embodiment, the each of the plurality of outcomes is a winning outcome, and wherein an amount of value provided by each of the winning outcomes is greater than a cost to purchase the entry to play the electronic game. According to another embodiment, the act of inviting is responsive to an act of performing an action by the person in the gambling location. According to another embodiment, the act of inviting is responsive to an act of performing an action by the person at a location outside the gambling location.

According to another embodiment, the act of inviting is responsive to an act of an event occurring within the gambling location. According to another embodiment, the method further comprises an act of identifying the person. According to another embodiment, the method further comprises an act of identifying the person using an identifier of a frequent player program.

According to another aspect of the present invention, a method for conducting a game is provided. The method comprises acts of inviting a person outside of a gambling location to play an electronic game, the game having a plurality of outcomes, at least one of which being a winning outcome, permitting the person to play the game to obtain at least one of the plurality of outcomes, and if the at least one of the plurality of outcomes is a winning outcome, requiring the person to redeem the at least one outcome in the gambling location. According to one embodiment, the method further comprises an act of inviting the person to play another electronic game. According to another embodiment, the act of inviting the person to play another electronic game is responsive to the act of redeeming. According to another embodiment, the act of inviting the person to play another electronic game is responsive to the person performing an act at the gambling location.

According to one embodiment of the present invention, the at least one outcome is redeemed for non-cashable credits that may be used by the person at the gambling location. According to another embodiment of the invention, the method further comprises an act of redeeming the at least one outcome. According to another embodiment of the invention, the method further comprises an act of crediting the player using a player tracking system. According to another embodiment of the invention, the method further comprises, an act of identifying the person using a frequent player identifier. According to another embodiment of the invention, the method further comprises an act of qualifying the person to play the electronic game. According to another embodiment of the invention, the method further comprises an act of determining whether to perform the act of inviting responsive to the act of qualifying of the person.

According to one embodiment of the present invention, the method further comprises an act of identifying the person. According to another embodiment of the invention, the act of inviting is responsive to an act of performing an action by the person in the gambling location. According to another embodiment of the invention, the act of inviting is responsive to an act of performing an action by the person at a location outside the gambling location. According to another embodiment of the invention, the act of inviting is responsive to an act of an event occurring within the gambling location. According to another embodiment of the invention, the act of qualifying the person includes acts of obtaining demographical information related to the person, and determining a status of the person based on the demographical information. According to another embodiment of the invention, the act of qualifying the person further comprises an act of determining a status of the player based at least in part on previous play by the player. According to another embodiment of the invention, the act of qualifying the person further comprises an act of determining a status of the player based at least in part on current game play by the player. According to another embodiment of the invention, the method further comprises an act of revealing the at least one of a plurality of outcomes to the player during play of the electronic game. According to another embodiment of the invention, the method further comprises an act of permitting the player to play the electronic game, the electronic game communicating to a game play server through a communication network. According to another embodiment of the invention, the communication network includes the Internet.

According to one aspect of the present invention, a method for conducting a game is provided. The method comprises acts of permitting a person to take one or more actions within a gambling location, in response to the person taking the one or more actions, inviting the person to play an electronic game separate from games offered in a gambling environment at the gambling location, the game having a plurality of outcomes, at least one of which being a winning outcome, permitting the person to play the game to obtain at least one outcome, and if the at least one of the plurality of outcomes is a winning outcome, requiring the person to redeem the at least one outcome at the gambling location. According to one embodiment, the method further comprises an act of inviting the person to play another electronic game. According to another embodiment, the act of inviting the person to play another electronic game is responsive to the act of redeeming. According to another embodiment, the act of inviting the person to play another electronic game is responsive to the person performing an act at the gambling location.

According to another embodiment of the invention, the one or more actions includes an act of purchasing an entry to play the electronic game. According to another embodiment of the invention, the each of the plurality of outcomes is a winning outcome, and wherein an amount of value provided by each of the winning outcomes is greater than a cost to purchase the entry to play the electronic game. According to another embodiment of the invention, the at least one outcome is redeemed for non-cashable credits that may be used by the person at the gambling location. According to another embodiment of the invention, the method further comprises an act of redeeming the at least one outcome. According to another embodiment of the invention, the method further comprises an act of crediting the player using a player tracking system. According to another embodiment of the invention, the method further comprises an act of identifying the person using a frequent player identifier. According to another embodiment of the invention, the method further comprises an act of qualifying the person to play the electronic game. According to another embodiment of the invention, the method further comprises an act of determining whether to perform the act of inviting responsive to the act of qualifying of the person.

According to one embodiment of the present invention, the method further comprises an act of identifying the person. According to another embodiment of the invention, the act of inviting is responsive to an act of an event occurring within the gambling location. According to another embodiment of the invention, the act of qualifying the person includes acts of obtaining demographical information related to the person, and determining a status of the person based on the demographical information. According to another embodiment of the invention, the act of qualifying the person further comprises an act of determining a status of the player based at least in part on previous play by the player. According to another embodiment of the invention, the act of qualifying the person further comprises an act of determining a status of the player based at least in part on current game play by the player. According to another embodiment of the invention, the method further comprises an act of revealing the at least one outcome to the player during play of the electronic game. According to another embodiment of the invention, the method further comprises an act of permitting the player to play the electronic game, the electronic game communicating to a game play server through a communication network. According to another embodiment of the invention, the communication network includes the Internet.

According to another aspect of the present invention, a method for conducting a game is provided. The method comprises acts of permitting a person to take one or more actions within a gambling location, in response to the person taking the one or more actions, inviting the person to play an electronic game separate from games offered in a gambling environment at the gambling location, the game having a plurality of outcomes, at least one of which being a winning outcome, permitting the person to play the game to obtain at least one outcome, and if the at least one of the plurality of outcomes is a winning outcome, requiring the person to redeem the at least one outcome at a redemption location. According to one embodiment of the present invention, the redemption location includes the gambling location in which the one or more actions were taken. According to one embodiment, the method further comprises an act of inviting the person to play another electronic game. According to another embodiment, the act of inviting the person to play another electronic game is responsive to the act of redeeming. According to another embodiment, the act of inviting the person to play another electronic game is responsive to the person performing an act at the gambling location.

According to another embodiment of the invention, the one or more actions includes an act of purchasing an entry to play the electronic game. According to another embodiment of the invention, the each of the plurality of outcomes is a winning outcome, and wherein an amount of value provided by each of the winning outcomes is greater than a cost to purchase the entry to play the electronic game. According to another embodiment of the invention, the at least one outcome is redeemed for non-cashable credits that may be used by the person at the gambling location. According to another embodiment of the invention, the method further comprises an act of redeeming the at least one outcome. According to another embodiment of the invention, the method further comprises an act of crediting the player using a player tracking system. According to another embodiment of the invention, the method further comprises an act of identifying the person using a frequent player identifier. According to another embodiment of the invention, the method further comprises an act of qualifying the person to play the electronic game.

According to one embodiment of the present invention, the method further comprises an act of determining whether to perform the act of inviting responsive to the act of qualifying of the person. According to another embodiment of the invention, the method further comprises an act of identifying the person. According to another embodiment of the invention, the act of inviting is responsive to an act of an event occurring within the gambling location. According to another embodiment of the invention, the act of qualifying the person includes acts of obtaining demographical information related to the person, and determining a status of the person based on the demographical information. According to another embodiment of the invention, the act of qualifying the person further comprises an act of determining a status of the player based at least in part on previous play by the player. According to another embodiment of the invention, the act of qualifying the person further comprises an act of determining a status of the player based at least in part on current game play by the player. According to another embodiment of the invention, the method further comprises an act of revealing the at least one outcome to the player during play of the electronic game. According to another embodiment of the invention, the method further comprises an act of permitting the player to play the electronic game, the electronic game communicating to a game play server through a communication network. According to another embodiment of the invention, the communication network includes the Internet.

According to another aspect of the present invention, a method for conducting a game is provided. The method comprises acts of permitting a person to take one or more actions, in response to the person taking the one or more actions, inviting the person to play an electronic game separate from games offered in a gambling environment at the gambling location, the game having a plurality of outcomes, at least one of which being a winning outcome, permitting the person to play the game to obtain at least one of the plurality of outcomes, and if the at least one of the plurality of outcomes is a winning outcome, requiring the person to redeem the at least one outcome in at least one gambling location. According to one embodiment, the method further comprises an act of inviting the person to play another electronic game. According to another embodiment, the act of inviting the person to play another electronic game is responsive to the act of redeeming. According to another embodiment, the act of inviting the person to play another electronic game is responsive to the person performing an act at the gambling location.

According to one embodiment, the one or more actions are taken by the person in the gambling location. According to one embodiment of the present invention, the gambling location and the at least one gambling location are the same location. According to another embodiment of the invention, the one or more actions includes an act of purchasing an entry to play the electronic game.

According to another embodiment of the invention, the each of the plurality of outcomes is a winning outcome, and wherein an amount of value provided by each of the winning outcomes is greater than a cost to purchase the entry to play the electronic game. According to another embodiment of the invention, the at least one outcome is redeemed for noncashable credits that may be used by the person at the gambling location. According to another embodiment of the invention, the method further comprises an act of redeeming the at least one outcome. According to another embodiment of the invention, the method further comprises an act of crediting the player using a player tracking system. According to another embodiment of the invention, the method further comprises an act of identifying the person using a frequent player identifier. According to another embodiment of the invention, the method further comprises an act of qualifying the person to play the electronic game.

According to one embodiment of the present invention, the method further comprises an act of determining whether to perform the act of inviting responsive to the act of qualifying of the person. According to another embodiment of the invention, the method further comprises an act of identifying the person. According to another embodiment of the invention, the act of inviting is responsive to an act of an event occurring within the gambling location. According to another embodiment of the invention, the act of qualifying the person includes acts of obtaining demographical information related to the person, and determining a status of the person based on the demographical information. According to another embodiment of the invention, the act of qualifying the person further comprises an act of determining a status of the player based at least in part on previous play by the player. According to another embodiment of the invention, the act of qualifying the person further comprises an act of determining a status of the player based at least in part on current game play by the player. According to another embodiment of the invention, the method further comprises an act of revealing the at least one outcome to the player during play of the electronic game. According to another embodiment of the invention, the method further comprises an act of permitting the player to play the electronic game, the electronic game communicating to a game play server through a communication network. According to another embodiment of the invention, the communication network includes the Internet.

According to one aspect of the present invention, a method for conducting a game is provided. The method comprises acts of qualifying a person to play an electronic game, in response to the person playing the electronic game, inviting the person to play another electronic game separate from games offered in a gambling environment at the gambling location, the game having a plurality of outcomes, at least one of which being a winning outcome, and requiring the person to redeem the at least one outcome at the gambling location. According to one embodiment of the present invention, the act of qualifying the person includes acts of obtaining demographical information related to the person, and determining a status of the person based on the demographical information. According to another embodiment of the invention, the act of qualifying the person further comprises an act of determining a status of the player based at least in part on previous play by the player. According to another embodiment of the invention, the act of qualifying the person further comprises an act of determining a status of the player based at least in part on current game play by the player.

According to another embodiment of the invention, the act of qualifying further comprises an act of qualifying the person in response to actions performed by the person at a website. According to another embodiment of the invention, the act of qualifying further comprises an act of qualifying the person based, at least in part, on an income of the person. According to another embodiment of the invention, the act of qualifying further comprises an act of qualifying the person based, at least in part, on one or more of the group comprising an occupation of the person, an age of the person, a gender of the person, an employment history of the player, and personal information of the player.

According to one embodiment of the present invention, the method further comprises an act of determining, based on the act of qualifying, a qualification level of the person. According to another embodiment of the invention, the method further comprises an act of determining the at least one outcome based, at least in part, on the qualification level of the person. According to another embodiment of the invention, the method further comprises acts of storing information relating to the person in a memory of a computer system, and determining, based at least in part on the stored information, a qualification of the player. According to another embodiment of the invention, the method further comprises an act of collecting current information associated with the person, and wherein the method further comprises an act of determining the qualification based at least in part on the stored information and the collected information. According to another embodiment of the invention, the act of qualifying further comprises an act of qualifying the person responsive to the occurrence of an event at the gambling location. According to another embodiment of the invention, the act of qualifying further comprises an act of qualifying the person based, at least in part, on a relation of the person to another person. According to another embodiment of the invention, the relation of the person includes at least one of a familial relation or an acquaintance relation. According to another embodiment of the invention, the act of qualifying is responsive to an act of receiving a referral from an acquaintance of the person.

According to another aspect of the present invention, a method for providing an incentive to a person to visit a gambling location is provided. The method comprises acts of qualifying a person, and in response to the act of qualifying the person, performing acts of providing an award to the qualified person, and inviting the person to visit a gambling location to redeem the award. According to one embodiment of the present invention, the act of qualifying the person includes acts of obtaining demographical information related to the person, and determining a status of the person based on the demographical information. According to another embodiment of the invention, the act of qualifying the person further comprises an act of determining a status of the player based at least in part on previous play of at least one game by the player. According to another embodiment of the invention, the act of qualifying the person further comprises an act of determining a status of the player based at least in part on current game play by the player. According to another embodiment of the invention, the act of qualifying further comprises an act of qualifying the person in response to actions performed by the person at a website. According to another embodiment of the invention, the act of qualifying further comprises an act of qualifying the person based, at least in part, on an income of the person. According to another embodiment of the invention, the act of qualifying further comprises an act of qualifying the person based, at least in part, on one or more of the group comprising an occupation of the person, an age of the person, a gender of the person, an employment history of the player, and personal information of the player.

According to one embodiment of the present invention, the method further comprises an act of determining, based on the act of qualifying, a qualification level of the person. According to another embodiment of the invention, the method further comprises an act of determining the at least one outcome based, at least in part, on the qualification level of the person. According to another embodiment of the invention, the method further comprises acts of storing information relating to the person in a memory of a computer system, and determining, based at least in part on the stored information, a qualification of the player. According to another embodiment of the invention, the method further comprises an act of collecting current information associated with the person, and wherein the method further comprises an act of determining the qualification based at least in part on the stored information and the collected information. According to another embodiment of the invention, the act of qualifying further comprises an act of qualifying the person responsive to the occurrence of an event at the gambling location. According to another embodiment of the invention, the act of qualifying further comprises an act of qualifying the person based, at least in part, on a relation of the person to another person. According to another embodiment of the invention, the relation of the person includes at least one of a familial relation or an acquaintance relation. According to another embodiment of the invention, the act of qualifying is responsive to an act of receiving a referral from an acquaintance of the person.

According to another aspect of the present invention, a method for providing an incentive to a person to visit a gambling location is provided. The method comprises acts of determining a status of the person comprising evaluating one or more parameters that are indicative of a value of the person as a player in a gambling environment, determining an award to the person based at least in part on the determined status, and providing the award to the person. According to one embodiment of the present invention, the method further comprises an act of requiring the person to redeem the award at the gambling location. According to another embodiment of the invention, the act of determining a status further comprises an act of evaluating a plurality of parameters related to the person. According to another embodiment of the invention, the plurality of parameters includes at least on of the group comprising past play performance of the person, personal attributes, and current play performance. According to another embodiment of the invention, the method further comprises an act of comparing the plurality of parameters related to the person with a plurality of parameters with another person known to gamble at a particular volume. According to another embodiment of the invention, the method further comprise an act of identifying the person as a particular type of gambler based at least in part on a result of the act of comparing.

According to another aspect of the present invention, a method for conducting a game played by a player is provided. The method comprises acts of notifying the player of an opportunity to win a prize, accessing of the operator's website by the player, notifying the player of any prize won by the player, providing for the player to play a game(s) on the operator's website, and providing a computer-based game to be played by the player which reveals the prize won by the player. According to one embodiment of the present invention, the method further comprises an act of storing, on a server, the prize won by the player. According to another embodiment of the invention, a coupon is provided with the notification of an opportunity to win the prize. According to another embodiment of the invention, the coupon includes an access code, and the method comprises an act of permitting the player to enter the access code into a website of the operator to gain access. According to another embodiment of the invention, the notification occurs in response to a player performing at least one of the group comprising entering frequent player information, and swiping a frequent player card at a kiosk. According to another embodiment of the invention, the notification occurs by at least one of the group comprising mail, an e-mail, a telephone, and a fax. According to another embodiment of the invention, the prize won by the player in each game is predetermined. According to another embodiment of the invention, the total prize won by the player in all games played with the game credits is predetermined.

According to one embodiment of the present invention, the game credits provided to a player is predetermined. According to another embodiment of the invention, the sequence of reveals is predetermined. According to another embodiment of the invention, the reveals are randomly determined by the client. According to another embodiment of the invention, the sequence of reveals is stored in a database of a server. According to another embodiment of the invention, the method further comprises an act of providing a player an opportunity to enter a sweepstake. According to another embodiment of the invention, the method further comprises an act of entering the sweepstake by the player. According to another embodiment of the invention, the player is immediately notified of winning or losing the sweepstake. According to another embodiment of the invention, the player is entered into at least one of a next drawing, one or more future drawings, and a limited number of future drawings. According to another embodiment of the invention, the prize includes a non-cashable credit. According to another embodiment of the invention, the prize includes a complimentary offer. According to another embodiment of the invention, the prize includes a promotional prize. According to another embodiment of the invention, the non-cashable credit is used by the player at a gambling location of the operator. According to another embodiment of the invention, the non-cashable credit is used to obtain a free play of a game located at a gambling location of the operator.

According to one embodiment of the present invention, the non-cashable credit can be used only at the gambling location of the operator. According to another embodiment, the complimentary offer is redeemed only at the gambling location of the operator. According to another embodiment of the invention, the promotional prize is redeemed only at the gambling location of the operator. According to another embodiment of the invention, the act of notifying the player is performed using information associated with a frequent player membership. According to another embodiment of the invention, an amount of the prize awarded to the player is limited by a predetermined range. According to another embodiment of the invention, the amount of the prize is randomly selected by a computer system, the randomly selected amount being limited by the predetermined range. According to another embodiment, the method further comprises acts of acts of determining, by the website, the prize won by the player, and notifying the operator of the determined prize. According to another embodiment, the method further comprises acts of acts of determining, by the operator, the prize won by the player, and notifying the website of the determined prize. According to another embodiment, the method further comprises an act of providing to the player periodically a plurality of opportunities to win one or more prizes. According to another embodiment, the method further comprises notifying the player of any prize won by the player.

According to one aspect of the invention, a method for conducting an incentive program is provided. The method comprises acts of permitting at least one frequent player program member of the incentive program to submit identification information associated with the at least one frequent player program member, and providing at least one special incentive to the at least one frequent player program member in response to the remote entry of the identification information associated with the at least one frequent player program member. According to one embodiment of the invention, the act of permitting further comprises an act of permitting the user to remotely swipe a membership card identifying the at least one frequent player program member. According to another embodiment, the act of remotely swiping a membership card is performed by the member entering a unique identifier. According to another embodiment, the act of remotely swiping a membership card is performed by the member additionally entering at least one of a password and a passcode.

According to one embodiment of the invention, the at least one special incentive includes at least one of a prize and an award. According to another embodiment, the at least one of a prize and an award is won by a frequent player program member through a sweepstake. According to another embodiment, the member is not informed of a win until the player visits the gambling location. According to another embodiment, the member must go to the gambling location to receive the at least one of the prize and the award. According to another embodiment, the member must go to the gambling location to receive the at least one of the prize and the award within a specified time period. According to another embodiment, the method further comprises an act of providing to the member a unique identifier.

According to one embodiment of the invention, the method further comprises an act of providing to the member at least one of a password and a passcode. According to another embodiment, the act of remotely swiping the membership card is performed by at least one of a video-enable, audio-enabled, and card reader-containing device. According to another embodiment, the device includes at least one of a kiosk, a personal computer, a handheld device, a telephone, and a wireless telephone. According to another embodiment, the at least one of the prize and the award includes at least one of money, a credit, merchandise, and loyalty points. According to another embodiment, the at least one of the prize and the award includes money, and wherein the method further comprises an act of paying out money including an act of providing at least one of cash, a check, a debit card, and an account credit. According to another embodiment, the at least one of the prize and the award includes loyalty points, and the method further comprises an act of paying out loyalty points including providing at least one of a loyalty program credit and an account credit.

According to another aspect of the present invention, a method is provided for conducting a game comprising acts of providing an incentive to a player to return to a gaming establishment, and displaying an indication of the incentive to the player in an interface of a remote computer system. According to one embodiment, the remote computer system is located outside of the gaming establishment. According to another embodiment, the computer system is not part of the gaming establishment.

According to another embodiment, the method further comprises an act of associating the incentive with an identification of the player. According to another embodiment, the identification of the player includes frequent player identification. According to another embodiment, the act of displaying includes an act of displaying the incentive to the player during play of an online game.

According to another embodiment, the act of providing an incentive is performed periodically. According to another embodiment, the method further comprises an act of determining an incentive periodically and displaying an active incentive to the player in the interface of a remote computer system. According to another embodiment, the act of determining an incentive periodically further comprises determining a time period for the active incentive such that the player is motivated to periodically view the interface.

According to one embodiment, the interface includes a browser-based interface. According to another embodiment, the remote computer system is coupled to the gaming establishment via a communication network. According to another embodiment, the communication network includes the Internet. According to another embodiment, the method further comprises an act of requiring the player to return to the gaming establishment to redeem the incentive. According to another embodiment, the method further comprises an act of requiring the player to redeem the incentive within a predetermined time period.

According to one embodiment, the gaming establishment includes a gambling location. In another embodiment, the association is performed by a computer system of the gaming establishment. According to another embodiment, the method further comprises an act of tracking a winning of the incentive by the player according to the identification of the player. According to another embodiment, the act of tracking includes tracking the winning of the incentive using the frequent player identification. According to another embodiment, the computer system of the gaming establishment includes at least one of a player tracking system, a gaming machine, a kiosk, and a casino management system.

According to one aspect of the invention, a method for conducting an incentive program is provided. The method comprises acts of permitting at least one frequent player program member of the incentive program to submit identification information associated with the at least one frequent player program member, and providing at least one special incentive to the at least one frequent player program member in response to the remote entry of the identification information associated with the at least one frequent player program member. According to one embodiment of the invention, the act of permitting further comprises an act of permitting the user to remotely swipe a membership card identifying the at least one frequent player program member. According to another embodiment, the act of remotely swiping a membership card is performed by the member entering a unique identifier. According to another embodiment, the act of remotely swiping a membership card is performed by the member additionally entering at least one of a password and a passcode.

According to one embodiment of the invention, the at least one special incentive includes at least one of a prize and an award. According to another embodiment, the at least one of a prize and an award is won by a frequent player program member through a sweepstake. According to another embodiment, the member is not informed of a win until the player visits the gambling location. According to another embodiment, the member must go to the gambling location to receive the at least one of the prize and the award. According to another embodiment, the member must go to the gambling location to receive the at least one of the prize and the award within a specified time period. According to another embodiment, the method further comprises an act of providing to the member a unique identifier.

According to one embodiment of the invention, the method further comprises an act of providing to the member at least one of a password and a passcode. According to another embodiment, the act of remotely swiping the membership card is performed by at least one of a video-enable, audio-enabled, and card reader-containing device. According to another embodiment, the device includes at least one of a kiosk, a personal computer, a handheld device, a telephone, and a wireless telephone. According to another embodiment, the at least one of the prize and the award includes at least one of money, a credit, merchandise, and loyalty points. According to another embodiment, the at least one of the prize and the award includes money, and wherein the method further comprises an act of paying out money including an act of providing at least one of cash, a check, a debit card, and an account credit. According to another embodiment, the at least one of the prize and the award includes loyalty points, and the method further comprises an act of paying out loyalty points including providing at least one of a loyalty program credit and an account credit.

According to another aspect of the present invention, a method is provided for conducting a game comprising acts of providing an incentive to a player to return to a gaming establishment, and displaying an indication of the incentive to the player in an interface of a remote computer system. According to one embodiment, the remote computer system is located outside of the gaming establishment. According to another embodiment, the computer system is not part of the gaming establishment.

According to another embodiment, the method further comprises an act of associating the incentive with an identification of the player. According to another embodiment, the identification of the player includes frequent player identification. According to another embodiment, the act of displaying includes an act of displaying the incentive to the player during play of an online game.

According to another embodiment, the act of providing an incentive is performed periodically. According to another embodiment, the method further comprises an act of determining an incentive periodically and displaying an active incentive to the player in the interface of a remote computer system. According to another embodiment, the act of determining an incentive periodically further comprises determining a time period for the active incentive such that the player is motivated to periodically view the interface.

According to one embodiment, the interface includes a browser-based interface. According to another embodiment, the remote computer system is coupled to the gaming establishment via a communication network. According to another embodiment, the communication network includes the Internet. According to another embodiment, the method further comprises an act of requiring the player to return to the gaming establishment to redeem the incentive. According to another embodiment, the method further comprises an act of requiring the player to redeem the incentive within a predetermined time period.

According to one embodiment, the gaming establishment includes a gambling location. In another embodiment, the association is performed by a computer system of the gaming establishment. According to another embodiment, the method further comprises an act of tracking a winning of the incentive by the player according to the identification of the player. According to another embodiment, the act of tracking includes tracking the winning of the incentive using the frequent player identification. According to another embodiment, the computer system of the gaming establishment includes at least one of a player tracking system, a gaming machine, a kiosk, and a casino management system.

The function and advantage of these and other embodiments of the present invention will be more fully understood from the examples described below. The following examples are intended to illustrate the benefits of the present invention, but do not exemplify the full scope of the invention.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is shown in various figures is represented by a like numeral. For the purpose of clarity, not every component may be labeled in every drawing. In the drawings.

DETAILED DESCRIPTION

Figure 1:
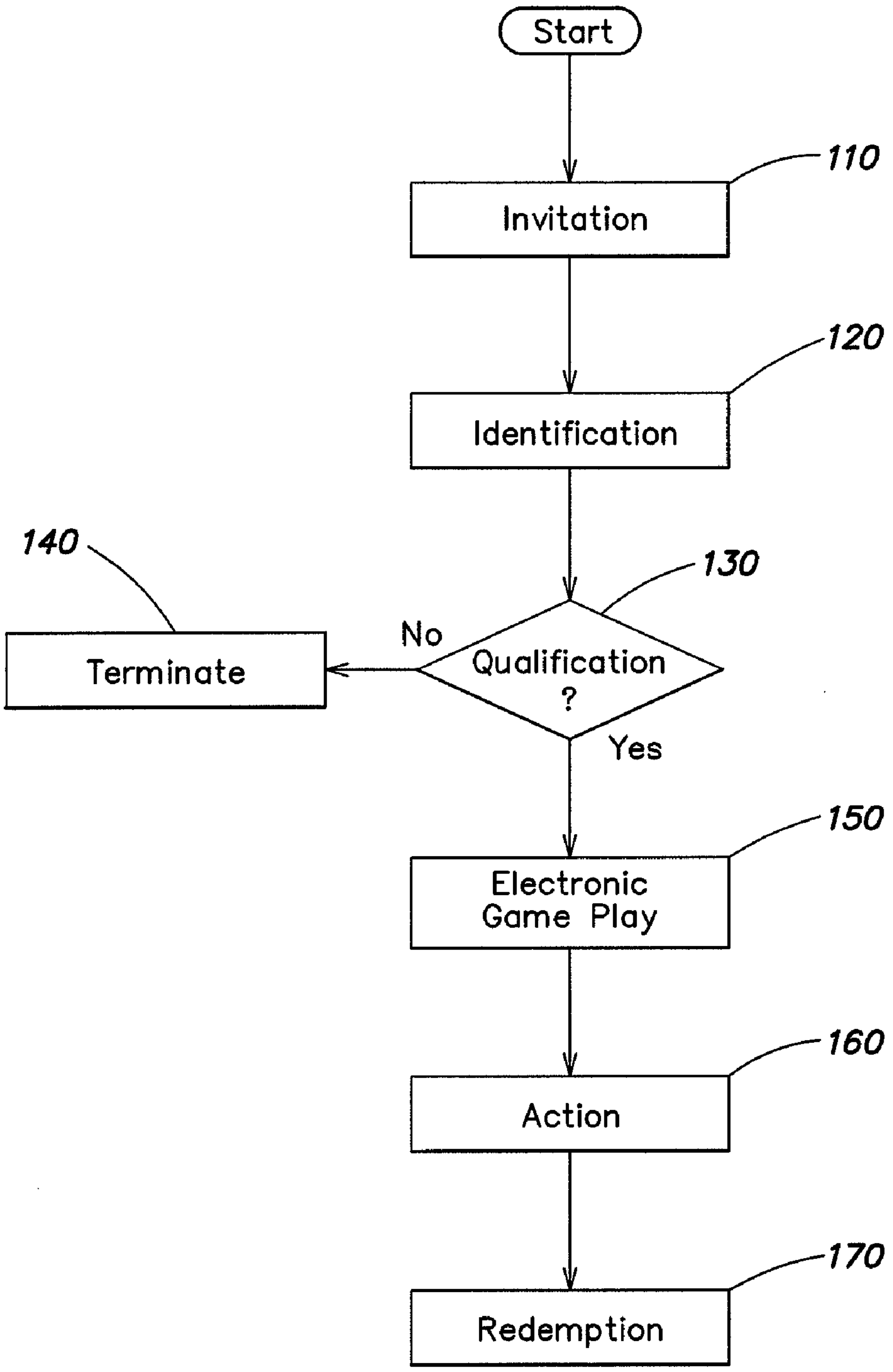
FIG. 1 shows a process for providing player incentive according to one embodiment of the present invention.

One aspect of the present invention relates generally to inviting qualified people to play an electronic game which has a plurality of outcomes, at least one of which is a winning outcome. Outcomes or winnings are redeemed by an entity, usually a person (referred to as a player) that takes an action in at least one specified gambling location or affiliated location. Time limits may constrain when the game can be played, when winnings are redeemable and when the specified task must be completed.

According to another aspect of the present invention, the electronic game may be an online game that is offered over the Internet, for example. In one instance, the game may be an online game that provides one or more revealed outcomes to a player during play of the online game. To this end, various aspects of the present invention may be facilitated using a reveal-based online game.

Another aspect of the present invention relates to inviting a qualified person, where there is a determination of the qualification of that person. The term "qualified" as used herein indicates that a person or persons are placed, based on a variety of criteria, into specific categories and each qualified category may be eligible for a different game, or combination of games, different outcomes, different likelihoods of reaching a given outcome, different award schedules, different visit requirements for redemption and/or different task completion requirements for redemption. For example, specific time limits may be imposed based upon player categories, game types, winning outcome redemptions, award size and task completion requirements.

According to one aspect, it is appreciated that qualification may be based, for instance, upon a person's answers to questions, the person's activity at a website—length of visit, page views, games played, play strategy, etc.—the amount of money the person has available to play with or other criteria which relate to the person's instant condition. Alternatively, or in combination with instant qualification criteria, the person's record of information that was previously obtained and stored in association with the person's identification may be used to determine qualification.

Qualification is important because a relatively few people are responsible for a disproportionately large amount of play. This concept is sometimes referred to as the 5-50 rule because, in approximation, 5% of players of casino games, for example, are typically responsible for 50% of total revenues. According to one aspect of the present invention, a system and method is provided for qualifying people according to their perceived worth. For example, such qualification may be based upon criteria such as player performance history, current play levels or even projected play levels based upon the details of a potential player's occupation, income level, age, gender, background, personal preferences, location of residence, employment history and/or other such criteria, including personal information such as birthday or anniversary, either alone or in combination.

Further, qualification may be based upon taking an action, attending an event or visiting a location on a particular date. For example, a verbal invitation could be extended to each person that purchases a Cadillac. A printed invitation is given to all people over the age of 21 that attended a concert or an invitation could be extended to anyone that visits a particular website or physical location. These qualifications may be made based solely upon the individual or based in whole or in part, on criteria applied to the spouse, family member, friend or peer group.

According to another aspect of the present invention, the qualification may depend at least in part, on a player taking an action within a gambling location (e.g., in a casino), or within an online gaming environment (e.g., over the Internet). In at least one instance, the action may involve the player using an identifier of a frequent player program. In one case, for example, the player may swipe his or her frequent player program card at a casino location, which causes the player to become qualified to play the electronic game. In another example, the player may "swipe" or otherwise enter their frequent player identifier in an online environment, causing him/her to become qualified. To this end, various aspect of the invention may be facilitated using a frequent player tracking system.

In yet another example, a player may receive an invitation to play an electronic game during a new player promotion that may be conducted at the gambling location (e.g., at the casino). In one instance, a player may receive, as part of a new player promotion, an invitation to play an electronic game when the player leaves the gambling location. For example, the player may receive a brochure which includes a ticket that allows the player to access the electronic game via an access code. The access code, when entered by the player, may permit the player to play a number of plays or credits with the electronic game, and play of the game by the player may earn points, credits or other award types that can be redeemed at the gambling location, thus encouraging the return of the player to the gambling location. In this manner, a single visit by a player is converted into two-or-more visits by the player by extending one or more invitations, which in themselves may earn the player awards that are required to be redeemed at one or more gambling locations. Such invitations lead to a ping-pong effect whereby the player plays games at the gambling location, receives invitations to play one or more electronic games, and is awarded prizes that need to be redeemed at the gambling location or affiliated location.

Another action that may cause a player to receive an invitation may include a player referring a "friend" who should receive an invitation. Such a program may be beneficial in identifying potential gamblers, as a personal reference of who is likely to be receptive to an invitation may be more likely to accept the invitation rather than a mass mailing to a particular group of people. In this way, an action by a current player may cause an invitation to be extended to another player. This invitation may or may not include any additional qualifications of the new player, including a qualification based on the demographic of the new player, or play of the player in one or more online games, historical play at casinos or other gambling locations, or any other qualifications that may be performed for the new player. An existing player may refer a new player by providing, for example, information about the new player including, but not limited to his e-mail address, residence address, phone number, name or other identifying information of the new player.

According to one aspect, it is appreciated that the projection or estimation of future worth of a person is especially important to identifying valued players and all such methods of worth projection or estimation may be used herein. Persons may be valued by any number of criteria such as, for example, demographic information, historical performance of other related activities that show a propensity towards gambling or otherwise indicate persons with disposable income, among other information that may be correlated to the person's potential worth as a gambler.

According to one embodiment, persons may not be considered qualified if they are explicitly barred from gambling by government regulation, gambling location policy or self-exclusion. Governments sometimes ban a specific person or group of persons if their presence in a gambling location causes harm. Nevada, for example, maintains a "black book" listing persons which are not allowed, by law, to visit a gambling location within that state. Individual casinos sometimes ban persons caught cheating or engaging in undesirable activity. Sometimes individuals ban themselves from visiting a gambling location in order to prevent themselves from engaging in excessive gambling. There may be many reasons why and methods for barring or banishing a person or groups of persons from a gambling location and all such reasons and methods can be used as criteria for whether a person is qualified for a particular category as used herein.

The term "identifier" as used herein indicates a device, code or technique used to recognize a particular person. The identifier may simply be a number or code associated with the person, such as a magnetic stripe card or a smart card which contains electronic or other circuitry. The identifier may also be biometric, such as voice-print, handwriting recognition, fingerprint, hand shape recognition or eye-pattern recognition. It should be appreciated that there are many different ways to identify a person uniquely, or as a member of a group, and all such techniques are anticipated as being useful for implementing various aspects of the present invention.

The term "invitation" as used herein refers to a request extended to a qualifying person to participate. Examples range from a printed invitation to a website offering a place to play a game or take some other action. Invitations may be communicated by any means, including but not limited to, electronic, written and verbal means. It should be appreciated that there is a wide range of ways to invite a person uniquely, or as a member of a group, and any such way of inviting a person may be used.

The term "specified time period" as used herein indicates a period before or after a specific time and date or a period within a beginning and ending time and date. A specified time period may be unbounded as in "any" time or may be more limited. The term may, for example, include a recurring time period, such as every Wednesday, every Tuesday afternoon between the hours of 2 and 5 PM, the last Monday of each month, every Fourth of July, this coming Fourth of July, amongst others. The term may also be construed as any type of time period that can be specified by one or more parameters. It should be appreciated that there are many other permutations and combinations of one-time and recurring time restrictions that can be useful in various embodiments and representation of all such permutations and combinations is intended by the term "specified time period" and its variants.

The term "gambling location" as used herein refers to any location where free or fee-based gambling is allowed. Examples of gambling locations include, but are not limited to, casinos, racinos, dog-racing tracks, horse racing tracks, sports books, lottery point-of sale locations, clubs or pubs where gambling is conducted, amongst others Gambling locations may be at physical locations such as the Mirage casino in Las Vegas, a range of locations, such as "any MGM-owned casino in the United States, or a virtual location such as an Internet-based gambling site. It should be appreciated that there are many possible types of gambling location and all such locations are contemplated for use in various embodiments.

The term "affiliated location" as used herein refers to any location that is not a gambling location. Affiliated locations are places identified by gambling locations or their representatives at which a person may receive an invitation, qualify to receive an invitation or accomplish all or part of a redemption element, when invitation, qualification or redemption does not involve any element of gambling.

The term "general location" as used herein refers to any location that is either a gambling location or an affiliated location.

The term "redemption location" as used herein refers to the location, which may be either a gambling location or an affiliated location, where the awards gained by playing an electronic game are redeemed or acted upon.

The term "game" as used herein is meant to encompass all types of games including those of physical or mental skill, chance, or games with outcomes that are already known before play begins, such as those disclosed in U.S. patent application Ser. No. 11/001,775 filed Nov. 30, 2004, entitled "METHOD AND APPARATUS FOR CONDUCTING A GAME OF CHANCE" and includes games which require a wager of a financial value and a wager of consideration, as well as games which do not require wagers of any value to play. Games may be played against another player or players such as in a sweepstakes or tournament. Games may also be played against the "house"—i.e. the game host—and the house may be represented by a person or a device such as a computer, gaming machine or other device. It should be appreciated that there are a vast number of games and more are created with each passing day. Various aspects of the invention are contemplated for use with any type of game.

The term "electronic game" as used herein refers to any game which is at least partially implemented on an electronic device. For example, all or part of a game may be conducted on a personal computer, a computer terminal, a cell phone such as the well-known Palm Treo 700W or 700P, a music player such as the well-known Apple iPod, a personal data assistant such as a Palm Pilot or a home video game such as the well-known Nintendo Wii game console or the well-known Microsoft Xbox 360. It should be appreciated that there is a wide array of electronic devices which could be adapted for convenient game play with more being developed every day and all such devices are contemplated for use with various embodiments of the present invention.

An electronic game could also be conducted on a purpose-built electronic device such as a slot machine, a video poker machine or other electronic gaming or lottery machine, including such devices as electronic bingo minders and other devices.

Within this specification, the phrase "electronic game" is referred to herein to allow inclusion of game play elements or stages which are not electronic. For example, an electronic game is used for a portion of game play but each person is also provided a printed scratch-off ticket that provides clues or elements of information which are entered into the electronic game to further play. Conversely, results of electronic play may provide guidance as to which elements of a scratch-off ticket are to be removed for the highest likelihood of winning or to win the most valuable prize.

Other non-electronic elements that could be used, in part to conduct electronic game play, include manually tracked bingo cards, pull-tabs, game boards, card games and crossword puzzles. One of skill in the art recognizes there are many desirable ways to combine manual game elements with electronic game play and we include all such manual game elements within the scope of the meaning of "electronic game". Moreover, optical and biological computing devices are in development that perform the equivalent work of today's electronic devices. It should be appreciated that aspects of the present invention are useful with such technologies and it is our intention to include them within the definition of "electronic game".

The term "redeem" indicates the redemption of an outcome which may result in the award of prizes. Some outcomes may result in opportunity to play additional games which have at least one outcome that awards a prize or enhances the value of an initial prize. It should be appreciated that there are a wide variety of ways, both manual and automated, by which persons may be allowed to redeem outcomes and more are being created with each passing day. All such methods are contemplated for use with various embodiments of the invention.

Prizes may include, for example, cash, merchandise, points, free or reduced cost of games, non-cashable credits (credits which may be wagered in a game but not converted to cash), cashable credits (credits which may be wagered in a game or converted to cash), coupons (including physical, such as paper, and electronic), gift certificates, entry into other games, qualification for other games, entry into tournaments, qualification for tournament entry, or other such methods. It should be appreciated that there are a wide variety of prizes and more are created with each passing day. All such forms of prizes are contemplated for use with various embodiments of the invention.

Also, in one embodiment in which credits are non-cashable, credits may be limited to a specific denomination of play, may be limited to games of a specific type or in a specific location. Also in which credits are given on existing player club account, credits are given on machine readable paper coupon, credits are given in cash, credits are given in electronics credits transferred directly to a game, credits are given as table game chips, amongst others It should be appreciated that prizes (such as cashable credits) may be provided to or redeemed by the person in any manner.

Further, a person may be awarded a prize that is a multiplier and not an actual prize amount. For instance, the person could be awarded a multiplier prize which has the effect of multiplying the value of some yet unearned jackpot. For example, a player wins a 2× multiplier prize by playing an Internet-based game. If the player visits a gambling location and strikes a jackpot of at least $X (and/or at most $Y), the prize may be doubled. According to one embodiment, the gambling location visit and win must occur within a specified time and/or wager amount. It should be appreciated that any form of providing a prize which is real or relative to another prize or purchase may be used according to various aspects of the present invention.

One embodiment of the invention is implemented as a process including acts of invitation, identification, qualification, play and action, as represented in FIG. 1. Step 110 is invitation, wherein a person is invited to participate.

Step 120 is identification, where the person's identity is ascertained. Step 130 is a test of qualification, wherein the person is measured against predefined criteria to determine if they are eligible to participate. If the person is unqualified, she is excluded from play 140.

Qualified persons are presented an opportunity to play all or portions of an electronic game 150, which includes a plurality of outcomes, at least one of which is a winning outcome. When electronic game play concludes, depending on outcome, the person may be offered an opportunity to take an action 160. Awards earned by taking the action are then redeemed 170. In one embodiment of the invention, the steps of action 160 and redemption 170 may be combined into a single step.

Figure 2:
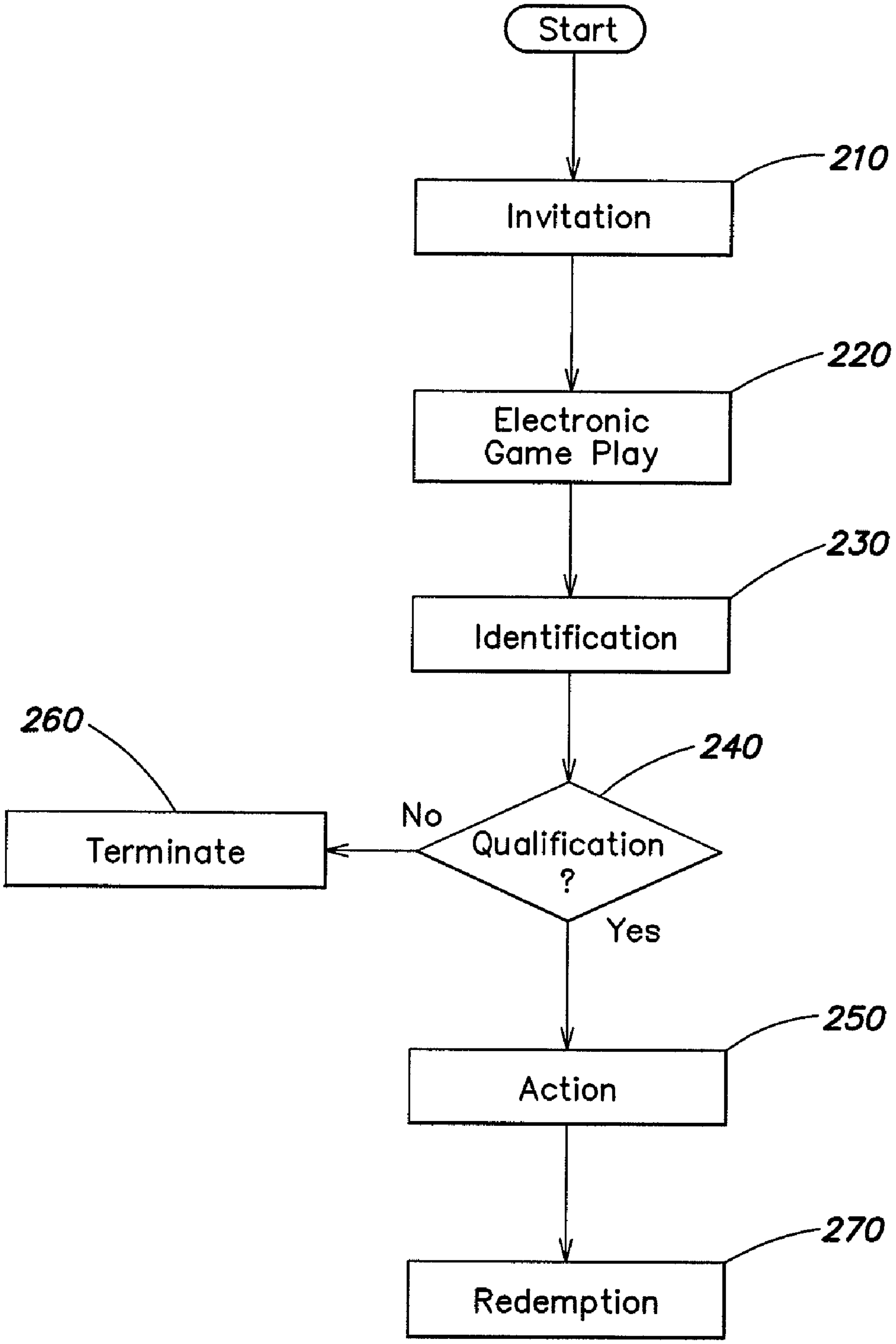
FIG. 2 shows a process for providing player incentive according to another embodiment of the present invention.

While FIG. 1 shows at least one example of the present invention which represents the steps of invitation, identification, qualification, play, action and redemption as occurring in a specific order, it should be appreciated that the order of these steps may be altered and remain within the scope and spirit of the present invention. FIG. 2 illustrates another sequence of steps in which the first step of invitation 210 is immediately followed by play of at least a portion of an electronic game or games 220. The steps of identification 230 and qualification 240 occur only if at least one outcome with award occurs during game play and is then followed by action step 250. This revised sequence is useful in cases where people may not feel motivated to perform the chores of identification just to play a game (e.g., on the Internet as an unidentified user, or where a player chooses to remain anonymous, or when the invitation is extended to a group, amongst others). In FIG. 2, people can play the game and then undergo the steps of identification and qualification only if a winning outcome occurs, which provides the person with additional motivation.

Other embodiments of the present invention may place the steps of invitation, identification, qualification, play and action in any order. In some embodiments, the person may have to complete a step multiple times. For example, a person might have to accomplish identification before being allowed to play an electronic game on the Internet and must again submit to the identification process before being allowed to take an action or redemption. In another embodiment one or more of the steps may be eliminated or combined with other steps. For example, the steps of action and redemption may be combined, redemption may be allowed without an action or an action may be required without a redemption possibility. Embodiments of the invention include all orders, permutations and combinations of the steps of invitation, identification, qualification, play and action, including the repetition of one or more of those steps and the division of one or more of the steps into partial accomplishment.

In addition, each step may include restrictions based upon one or more of the following criteria: specified time period, gambling location, affiliated location, location of games within the gambling location upon which an action is to be taken, games within the gambling location upon which an action is to be taken, perception of worth, amongst others.

Further, various aspects of the present invention as described herein may be used in association with those described in U.S. Patent Application Ser. No. 60/838,234 entitled "METHOD AND APPARATUS FOR CONDUCTING A GAME OF CHANCE" filed Aug. 17, 2006, and U.S. patent application Ser. No. 11/704,144 entitled "METHOD AND SYSTEM FOR REMOTE ENTRY IN FREQUENT PLAYER PROGRAMS" filed Feb. 8, 2007, each of which applications are incorporated by reference herein.

Example Internet Infrastructure

According to various embodiments, an Internet-based system may be provided to facilitate various aspects of the present invention. As discussed, various aspects of the invention may be implemented on an Internet-based system, generally involving a website infrastructure. As is known in the art, a basic website infrastructure logically contains web server(s), application server(s) and database server(s). All servers may be located on the same computer hardware or may be separated onto different computer hardware at various locations depending on processing or security requirements. Networking equipment is also required to connect the servers to the Internet and to interconnect servers when they are implemented on separate computer hardware.

A web server is used to handle requests and delivery of content from and to the browsers of website visitors. The web server also dispatches requests and data to the application servers.

The application server is used to control the website processes and to supply dynamic content back to the web servers. The application server performs all data dependent procedures at the website.

The database server manages the storage of all data required by the website. It responds to requests (storage and retrieval) for data from the application server. Various embodiments of the present invention may be implemented in a gaming system as described, for example, in U.S. patent application Ser. No. 11/001,775 filed Nov. 30, 2004, entitled "METHOD AND APPARATUS FOR CONDUCTING A GAME OF CHANCE" to which priority is claimed and is incorporated herein by reference. However, it should be appreciated that other gaming system infrastructures may be used. For example, the infrastructures as described below with reference to FIGS. 3 and 4 may be used, either alone or in combination with other infrastructures or elements thereof. Also, infrastructures referred to in FIGS. 5, 9, 16-19 may be used either alone or in combination to implement various aspects of the present invention.

Incentives Awarded from Website Play

According to one embodiment of the invention, parameters are established by which persons are invited to play an electronic game at a website. Parameters may include, but are not limited to, terms of invitation, qualification, game play type, quantity and outcome schedule, required actions, time periods and redemptions. All invited persons may be grouped into a single category with shared parameters or various classes of persons may be created with each category given a specific set of parameters which may be different from parameters assigned to other categories.

According to one embodiment, invited persons that visit the website during a specified time period are allowed to play electronic games where awards may be earned and then redeemed at a gaming location within a specified time period.

For example, qualified persons are selected from a general list (e.g. white pages, third party email lists, direct mail lists), targeted lists (based on demographic, geographic, or economic criteria) or from the gambling location's frequent player database and invited to play an electronic game.

Each invited person is assigned a quantity of game plays in which the outcome is predetermined, either for each individual game play or for a collective of multiple game plays, before that person is actually invited to play. Records indicating the quantity of games and their outcome are stored in a database along annotated to indicate the games are yet unplayed. Each record is linked to an identifier unique to the player to whom the games are assigned. In this example the identifier is the person's player tracking identifier. Next, the invitation is sent to the player, in this example via email or regular mail.

When the invited person visits the website, she identifies herself by entering her player tracking identifier which links the website game chosen by the person to her pre-assigned outcomes and those outcomes are revealed to the person as each game play concludes. The database record for that person is annotated to indicate each game that has been played.

The person then visits a designated gambling location and redeems associated awards. If the award is game play credit, she may redeem at a gambling machine by inserting her player tracking card into the machine's card reader, after which the award is transferred to the gambling machine's credit meter, after which the person may use the credits to gamble.

If the award can not be redeemed as game credits at the machine directly, the person may visit a player club center and present identification, after which the award is manually or otherwise given. In other redemption alternatives the person may visit a redemption kiosk, a restaurant, a gift shop, a hotel representative or other place where the award may be redeemed.

Regardless of which manner of redemption is used, the database is annotated to indicate that the redemption was fulfilled so as to prevent multiple redemptions for one award.

In another embodiment of the invention, qualified persons are separated into categories wherein each category may offer at least one parameter which is different in value from a parameter offered to persons in another category.

As an example, a universe of players is divided, based upon historical play levels of each individual persons, into five categories. The highest tier, Tier 1, contains persons with an average daily theoretical loss, also known as Average Daily Theoretical or ADT, of at least $2,000. Tier 2 includes persons with an ADT of at least $1,200, while Tier 5 contains those persons with an ADT of at least $200. Tiers are not populated equally in this example, because far more persons reach the $200 ADT level than the number that reaches an ADT of $2,000.

The electronic games for all 5 tiers have possible outcomes of $100, $50, $25 and $0 but the likelihood of winning each specific award is different for each tier. Table 1 below indicates each award amount and its likelihood of occurrence for each tier. Of course, this is but one example of such a structure. It should be appreciated that, according to one aspect of the present invention, any number of tiers, and any number of persons per tier, and assignment of any number of outcome amounts with a probability of occurrence set to any desired value from 0% to 100% to each tier may be used. Further, other parameters may be included within such a table of category parameters and in any combination.

TABLE I

| Tier # | $100 | $50 | $25 | $0 |
|---|---|---|---|---|
| 1 | 30% | 50% | 15% | 5% |
| 2 | 20% | 50% | 20% | 10% |
| 3 | 10% | 40% | 30% | 20% |
| 4 | 10% | 30% | 30% | 30% |
| 5 | 1% | 25% | 44% | 30% |

In this example, each game outcome is determined by a random number generator, as is well known to those of skill in the art, which is selected as each game is played in accordance with the probabilities specified in parameters for the player's assigned category.

The awards of $100, $50 and $25 are paid as non-cashable credits, which are amounts of credit which may be gambled in a gambling location but may not be converted directly to cash. Awards won by wagering the non-cashable credits may be converted to cash or replayed in additional wagers.

Qualified persons are then invited to play electronic games on the Internet. The invitation may be extended through mail, email, personal invitation or other method.

Figure 3:
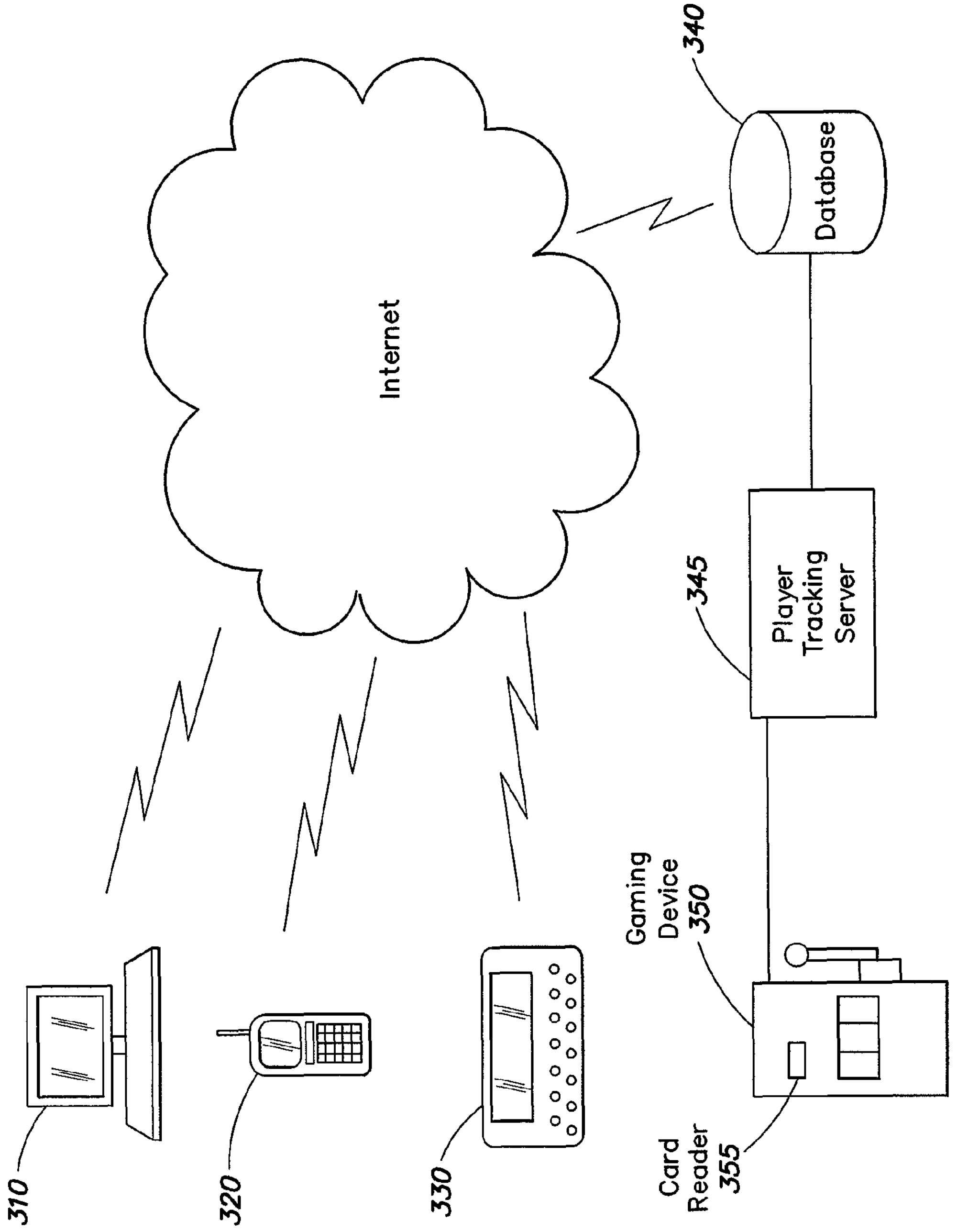
FIG. 3 shows an environment suitable for implementing various aspects of the present invention.

FIG. 3 shows an environment suitable for implementing various aspects of the present invention. As illustrated in FIG. 3, an invited person may then play electronic games at their home computer 310, Internet enabled cell phone 320 or other Internet device 330. When the invited person first arrives at the website, she identifies herself by entering her player ID number, which is also assigned to the player tracking account at the gambling location. This identifier is used to index the player database 340, where the person's electronic game parameters are stored in accordance to the category to which that person is qualified.

A small application program is downloaded to the person's computer, cellphone or other Internet enabled device. This application randomly determines each electronic game's outcome according to the database parameters for that person. Award amounts from each outcome are stored in database 340 along with annotations showing that an electronic game was completed. The person continues electronic game play until she exhausts her supply of electronic games, again according to parameters stored in database 340.

To redeem the awards won, the player visits a designated gambling location and inserts her player tracking card into the card reader 355 of any connected gambling device 350. The gambling location's player tracking server 360 reads the identity code from the inserted card and requests the identified person's award record from database 340. The player tracking server then transfers the appropriate amount of non-cashable credit to the gambling device 350, which makes said noncashable credits available for play. As each non-cashable credit is wagered, it is deducted from the award balance maintained on database 340. According to one embodiment, when all non-cashable credits are exhausted, or time period parameters are exceeded, no additional non-cashable credit play is allowed.

As discussed above, various aspects of the present invention may be implemented within various environments. For example, instead of downloading an application to the person's computer, the game could be entirely resident on a server-based network. Further, the game could be accessed by the player through an interface such as the interface of the well-known Internet Explorer browser program or the well-known Firefox browser program available from Mozilla.

Figure 4A:
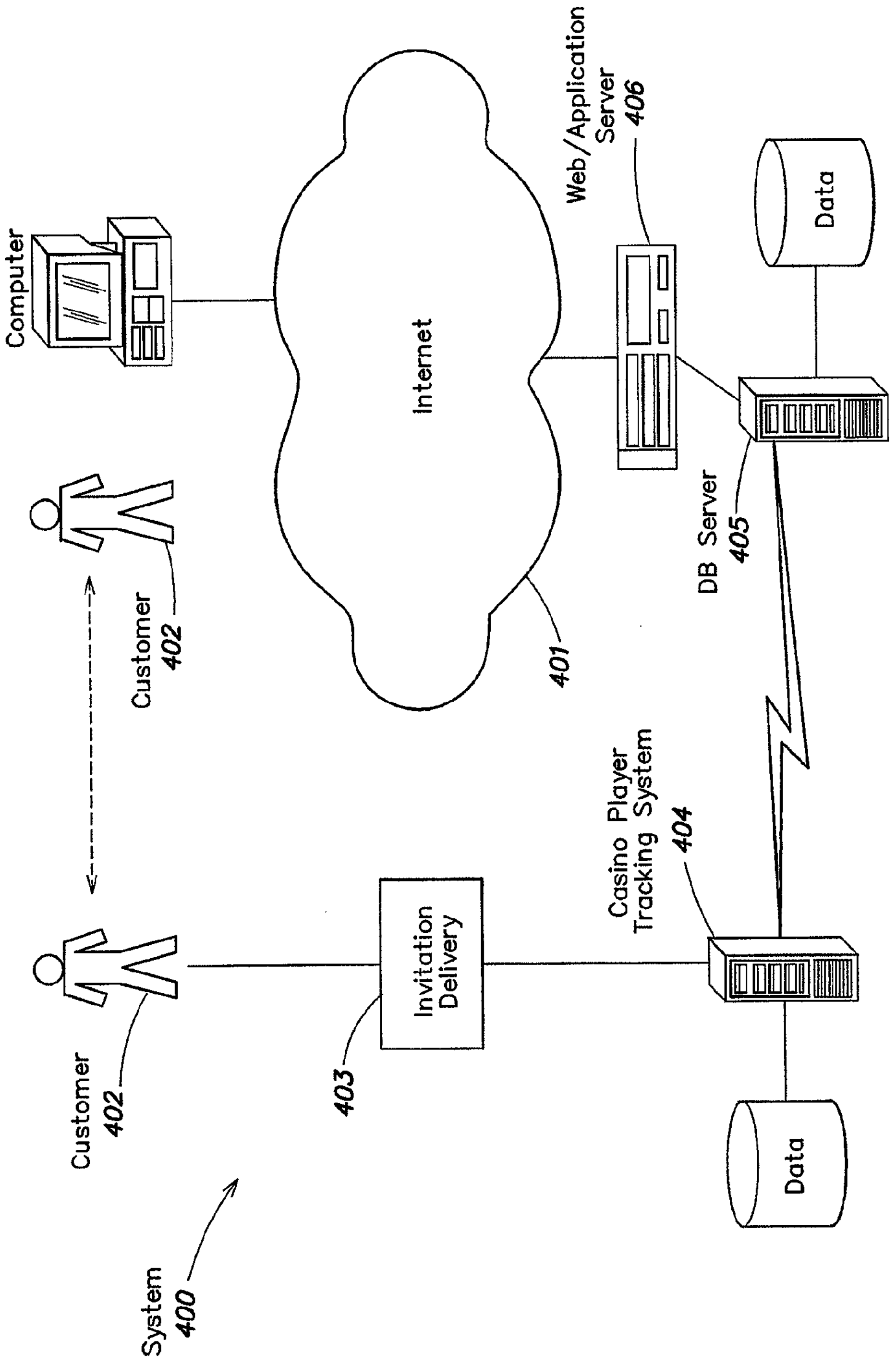
FIG. 4A shows another environment suitable for implementing various aspects of the present invention.

FIG. 4A shows another environment suitable for implementing various aspects of the present invention. In particular, FIG. 4A shows a distributed system 400 in which a user or customer (item 402) receives an invitation to play one or more electronic games. At block 403, the system may deliver an invitation to the player. The invitation may be delivered using any of the methods previously described herein.

According to one embodiment, the player may receive an invitation to play the electronic game, and may play the electronic game on a computer (e.g., a personal computer (PC)). However, it should be appreciated that the user may access the electronic game on other types of computing systems, and the invention is not limited thereto.

As discussed, the user may play a game over a distributed network such as the Internet (item 401). As discussed above with reference to FIG. 3, the game may be a web-based game that implements one or more server systems, such as web/application server 406 and/or database server 405. However, it should be appreciated that other types of Internet architectures may be used.

Further, according to one embodiment, the user that is provided the invitation may be identified in a player tracking system or another casino system. For instance, the user may be identified in a casino player tracking system 404 as shown in FIG. 4A. Although player tracking systems are implemented in casinos, it should be appreciated that various aspects of the invention may be applied to player tracking systems implemented in other environments (e.g., slot parlors, racinos, amongst others).

Figure 4B:
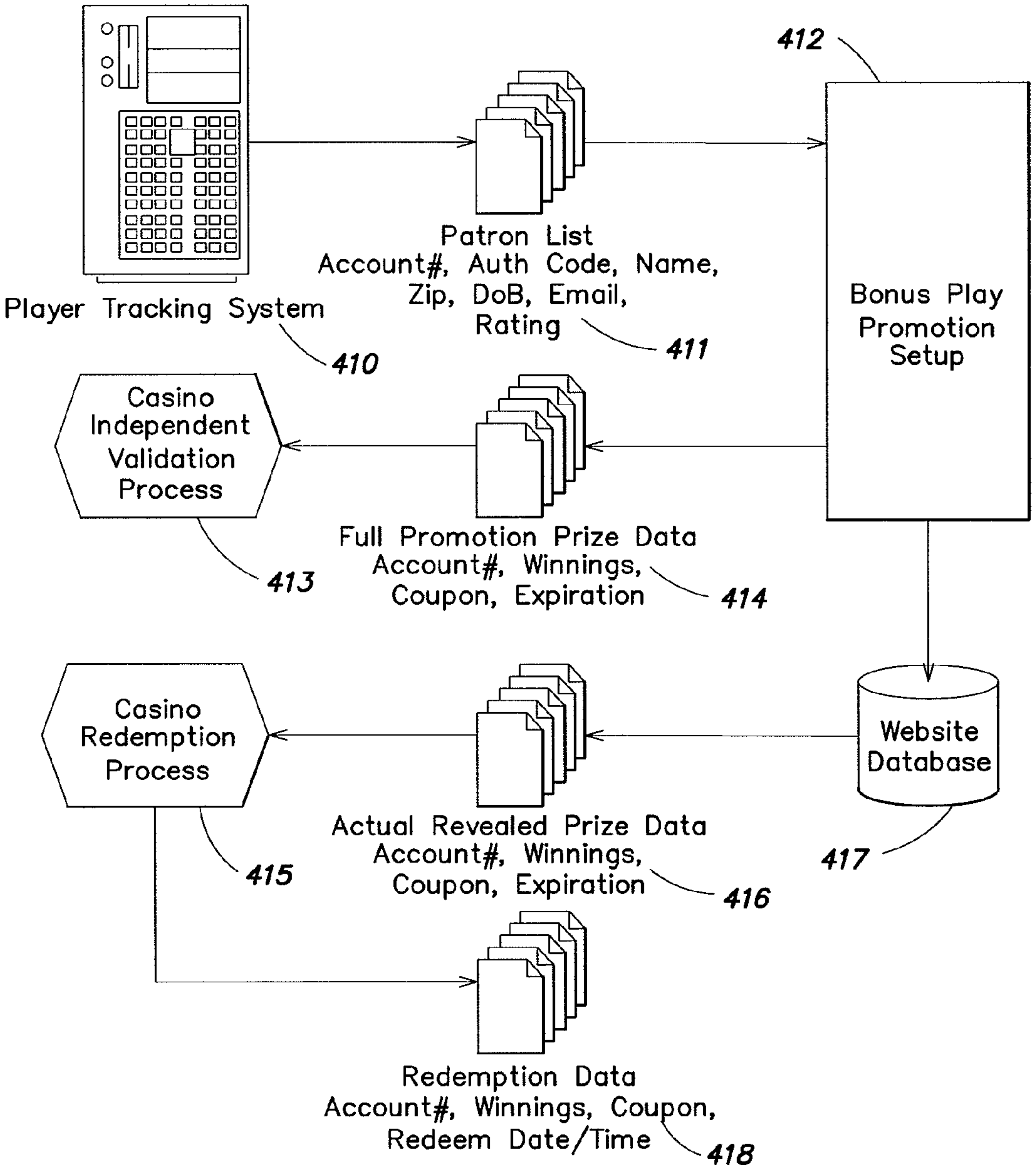
FIG. 4B shows one process for providing a player incentive according to another embodiment of the present invention.

FIG. 4B shows an example process for providing incentives according to one embodiment of the present invention. As shown, a player tracking system 410 may be used to conduct a promotion at a gambling location, such as a casino.

The promotion may be extended, for example, to players identified in a frequent player database or other list or data source. For instance, as shown in FIG. 4B, a patron list 411 may be maintained which include an account number for the player (e.g., a frequent player identifier), the name of the player, information about the player (e.g., date of birth (DoB), email address) and any other information related to the player or determined by the casino about the player (e.g., the player rating, ranking, historical performance, etc.).

Based on the information maintained in patron list 411 and/or any other information (e.g., action(s) taken by the player), a promotion (e.g., a bonus play promotion 412) may be conducted that reviews the list 411 and determines, based on the information relating to the players, a resulting promotion with associated prizes. As shown in FIG. 4B, prize data 414 may be determined which associates the determined prize with the player. This could be accomplished, for example, by associating an identifier of the player (e.g., a player ID, frequent player account number, etc.) with a determined prize (or class of prizes) to be awarded to the player.

Prize data 414 may include, for example, the account number of the player, any award or winnings associated with the promotion that are determined for the player (or class of prizes the player may win), a coupon or other code associated with the promotion, and expiration information (if any) associated with the promotion. Such data may be used to conduct a validation process by the gambling location (e.g., a casino) when such awards are redeemed by players.

Further, such prize data 414 may be provided to an online game provider in order to conduct an online gaming experience. To this end, the casino may transmit or otherwise provide data 414 to a Internet website system to be used to conduct the online experience. The website may store the data in a website database 417. Thereafter, the player proceeds to play the online game.

As discussed, the award may either be predetermined, may be determined later through a sweepstakes or drawing, may be determined when the online experience is conducted, or at any time after the invitation is extended to the player. Actual revealed prize data 416 may be maintained that tracks what prizes were awarded to which players. Such data may assist in the redemption and/or validation processes. Data 416 may include, for example, the account number of the player, any actual awards or winnings determined for the player, and any coupon and/or expiration data associated with the promotion.

During or after the online game experience, the award may be revealed to the player, and the player is them required to return to the gambling location to redeem the award. At this point, a redemption process 415 may be conducted (e.g., at the casino location). As a result of this process, redemption data 418 may be generated which tracks the players who have redeemed their awards. Such data 418 may include, for example, the player account information, the actual awards or winnings determined for the player, and any coupon data, and the redemption date and time.

As discussed above, based on an event that occurs (e.g., an action taken by the player, an occurrence with the gambling location, amongst others), an invitation may be generated and delivered to the user. As discussed further below, the invitation may be generated in response to an action.

Incentives Awarded Based on Specific Gambling Location Activity

According to another embodiment of the invention, the person must first take an action or participate in an activity at a gambling location or affiliated location in order to receive an invitation to play the electronic game. The action or activity can include, for example: wagering a proscribed amount of money, winning or losing a proscribed amount of money, activating a player club or frequent player account, reaching a bonus round on an electronic gaming machine, being awarded a mystery bonus from an electronic gaming machine, being present in the casino when another event occurs, playing specific casino games or electronic gaming machines, purchasing merchandise, attending an event, withdrawing money from a casino ATM, redeeming winnings, or any other action by a player. It should be appreciated that there is a wide range of ways that a person may take an action or participate in an activity at the gambling location or affiliated location, and such actions are contemplated for use with various embodiments.

The achievement of a qualifying action may be recorded automatically by a system such as a player tracking system, ATM machines, or gaming machines, or manually by casino personnel that observe the occurrence of the qualifying action or other method.

Invitations may be issued to qualifying persons by mail, email, personal invitation or other methods. Once a person receives an invitation, he/she may proceed to play electronic games and redeems any awards won, in the manner described above.

For example, a person wagering on a Wheel-of-Fortune slot machine may be provided an invitation when another person wagering at another Wheel-of-Fortune slot machine wins a spin of the wheel. In one example implementation, each time a wheel spin is won, all eligible Wheel-of-Fortune machines, being actively played, automatically issue an invitation for electronic game play. In this example, tickets may be printed by a ticket printer associated with the Wheel-of-Fortune gambling device, although it should be appreciated that the invitation may take other forms that may not be printed (e.g., an electronic invitation). Each printed ticket may include a code unique to that ticket. Among other parameters, the ticket code may directly or indirectly indicate the time, date, place, gambling device identifier and winning event that triggered the award.

The person holding the ticket may then visit a designated website where, after entering the invitation code, he/she is awarded a number of credits for electronic game play and presented with a list of electronic games on which she may spend the credits to play.

Each electronic game is associated with a pre-assigned category containing an award schedule and outcome probability. In one embodiment, some awards may be different for each category, and these awards may be assigned to all players of the category. Alternatively, each category could contain award values selected specifically for an individual person or a category of personal attributed. Other assignments (e.g., random) methods may be used that are alternative or used with the method discussed above. Credits are deducted for each game played and any awards won are accumulated in a record associated with the ticket or invitation identifier.

The person may be required to visit a designated gambling location and redeem the awards by presenting the same ticket or code used for electronic game play or a new ticket or code obtained after completion of electronic game play. As discussed, the player may be required to redeem the award at the casino or other gambling location, including any affiliated locations, such as, for example, a restaurant, gift shop, hotel, other gambling location or any other business affiliate of the gambling location. In one example, the coupon or code may entitle the holder to an amount of credit in one or more of the restaurants associated with the gambling location and the ticket or code is given as full or partial payment for a restaurant purchase. Other award/redemption combinations involving one or more gambling locations and affiliated locations are envisioned and are part of various aspects of the present invention.

In another embodiment of the invention, a person may initiate play at a specific website and win an outcome that may only be redeemed at a different website or a virtual world such as within Linden Lab's "Second Life" virtual world. A winning outcome there may require a person to then visit a specific place of business which may be a gambling site to redeem the outcome.

Purchase of Electronic Game Play

In another embodiment of the invention, qualified persons may purchase access to electronic games with outcomes that award prizes which may be redeemed in gambling locations, including any affiliated locations. For example, a person may pay $75 to access one or more electronic games where he can win awards of hotel stays, gambling currency, merchandise credit, or other prize. In a preferred embodiment, the player is guaranteed to win at least a minimum amount above the prize of entry. For example, by paying a $75 entry fee, a qualified person is guaranteed to win an award worth $125, though he could win even more.

Such prizes may be redeemed at a particular gambling location, affiliated location or group of gambling locations or affiliated locations. Other prizes may be redeemed at any gambling location or affiliated location. As discussed above and as used herein, the term "gambling location" should be construed generally to include any type of gambling location where wagering is permitted, including, but not limited to a land-based or other type of casino, a racetrack, racino, riverboat gambling, Internet gambling or any other environment can be placed.

The qualified person may elect to, or be required to, choose a specific gambling location, group of locations or affiliated location or groups of affiliated locations at which prizes will be redeemed before electronic game play begins. Alternately, qualified person may elect to, or be required to, choose a specific gambling location, group of locations, affiliated location or groups of affiliated locations at which prizes will be redeemed during electronic game play or after electronic game play is completed. In another embodiment of the invention, qualified persons may be allowed to begin electronic game play without cost but be required during, or after, game play to pay a fee.

One of skill in the art appreciates that collecting a fee from qualified persons makes a wider range of electronic game play economically feasible and realizes there are many possible permutations and combinations of when fees are paid, the value of prizes awarded and the locations at which prizes may be redeemed. All such permutations and combinations are useful within the scope of the invention.

Incentives Awarded in Multiple Steps

The process by which a person receives an invitation and/or redeems an outcome may include multiple interim steps of invitations and redemptions. In this case, the initial invitation process (as described in the section above describing incentives awarded from website play) may be initiated by the casino operator or as a result of an action taken at a gambling location or affiliated location (as described in the section above describing incentives awarded based on specific gambling location activity). In both these cases the process continues as described above, respectively. At the point where the electronic game is played, the outcome may include the invitation to play another electronic game or to take an action at a gambling location or affiliated location. At the point where the person is taking the action at the gambling location or affiliated location, the result may include the invitation to play another electronic game or to take another action, including an action to redeem an outcome. It should be appreciated that the processes and steps described in the selections above describing incentives awarded from website play and incentives awarded based on specific gambling location activity may be incorporated into this method, and in one example, are incorporated. It should be appreciated that the iterations could continue in a back-and-forth manner multiple times.

One aspect of the present invention relates to encouraging the person to continue to participate in the multiple, interim steps. In one example, the possible outcomes increase in value with subsequent iterations. The person may also be allowed to redeem an outcome at a certain point or to parlay that outcome for the chance to win something of higher value. Similarly, to encourage the person to continue to participate, there may be interim outcomes of value for the person to redeem that are additive to the final outcome.

Player Qualification: Data Provided or Action Taken

A player may also be qualified to receive an invitation based upon data provided or actions taken in response to a separate invitation. The player may first be invited to play games for entertainment only (no redeemable outcomes). In order to play the games, the player would be required to register and provide personal information (name, address, date of birth, etc). From that personal information, the system would qualify the player for an invitation to play an electronic game which has a plurality of outcomes that could be redeemed at the gambling location or affiliated location.

The system could do this by comparing the personal information provided with a database of similar information. The database could include a correlation of demographic information with categories of player value to the gambling location. As an example, the system could utilize a database of median income by address to determine the potential value of the player. The system could also utilize algorithms to analyze the personal information to determine categories of player value to the gambling location. As an example, using an algorithm, the system could determine the distance between the gambling location and the player's home address. Players living closer to the gambling location may have a higher likelihood to visit the gambling location.

The qualification of the player may also be based on actions taken while playing the games for entertainment only. As an example, players choosing to play specific electronic games (i.e. slot machines) may be considered more valuable to the gambling location. For those players, a different invitation with different possible outcomes may be provided. Qualifying actions could be based on games played, game strategies employed, or duration of play.

The first invitation is not limited to the play of electronic games for entertainment only. The invitation to take an action may be to sign up for a gambling location's frequent player card or any activity that solicits player personal information that could be used to estimate the player's value to the gambling location.

A qualification of the player may also be provided based upon gathered data, without the need for a player action. For instance, an invitation may be extended to the player based on player demographics without having the player play a game for pure entertainment. In one example, the player may be presented to receive an award based on information collected about the player such as location or income level.

Player Qualification Indicators Other than Past Performance in a Gambling Location Introducing players with a propensity to enjoy the activity of gambling to gambling locations is a valuable action, particularly if that person and the financial means and time to gamble in significant volume. One aspect of the invention relates generally to estimating the worth of an untested person, or group of persons, by comparing their personal attributes or historical conduct with those of persons known to gamble at a particular volume. If the comparison yields enough matching characteristics, the untested person is considered to be qualified to receive inducements to gamble, so that a relationship between that person and a gambling location can be initiated.

The offered inducement may be the chance to play a game or electronic game. Alternatively, one embodiment of the invention includes an offer of inducement that does not involve playing a game or electronic game but that simply invites the person to visit the gambling location and is particularly valuable when the gambling location has no relationship or communication with the person, outside of this invitation. Finding qualified persons, especially those with a likelihood of enjoying the activity of gambling that have not visited, phoned or contacted the gambling location is a valuable benefit and the invitation alone may be sufficient inducement, or the person or persons may be offered an appearance fee, free or reduced airfare to travel to the location, free or reduced cost gambling at the location, free or reduced cost food, beverage, room or other such inducements, whether alone or in combination. It should be appreciated that there are many such inducements that may be offered, and all such inducements are anticipated as useful within the scope of the invention.

In one example, it is determined that persons with personally managed brokerage accounts often have an affinity for gambling. A list of persons with such brokerage accounts is obtained but it is too expensive to extend an attractive inducement to all members of that list because a significant portion of them do not have an affinity for gambling. However, it is believed that persons that reside in certain zip codes tend to have a greater amount of disposable income than the average of all people with qualifying brokerage accounts. A new list is created including only of those persons with a qualifying brokerage account that also live within one of the qualifying zip code areas and only those so qualified persons are offered the inducement.

One embodiment of the invention begins with a list of people that might have an affinity for gambling and then compares the persons on that list to one or more additional lists that also contain persons that might have an affinity for gambling. If the same person appears on two, or more lists, their likelihood of enjoying a gambling relationship with a gambling location is higher than for those appearing on a single list and therefore are more worthy of a particular inducement than the general population or persons that are members of fewer lists.

In another embodiment, a list of persons that currently do not play at a particular gambling location(s) is obtained. Invitations may be extended to them as a chance to play games on the Internet for prizes, at least some of which will incite the person to visit a gambling location. In one example, the games and prizes may be scaled according to a perceived value of player.

There are many other ways and methods by which to start with a list of people believed to have, as a group, a more likely affinity for gambling than the general population. There are many other ways to further qualify members of this initial list based upon other factors, to create a new list of people that will, on average, have a higher likelihood of an affinity for gambling in sufficient volume as to make them attractive candidate customers for gambling locations, and therefore worth the cost of providing an inducement in an effort to initiate a relationship between the person or persons and the gambling location.

In one embodiment, those qualified persons are invited to play a game using the structures outlined in FIGS. 1 and 2. Qualified persons of a given category may be provided different inducements than qualified persons of other categories. They may be offered a chance to participate in unique electronic games, the outcomes of which, determines the specific inducement offered. They may also or alternatively be offered a different set of game outcomes, different outcome award structures, different redemption opportunities or other differentiated offers in relationship to their category of qualification. It should be appreciated that there are many ways in which various aspects of the invention may be used to offer inducements based upon the category of qualification of a person or persons and the invention should not be limited to just the examples described herein.

Reveal-Based Gaming System Used to Provide Incentives

As discussed above, various aspects of the present invention may be implemented using an Internet-based computer system. One such system includes a reveal-based gaming system that may be used according to various embodiments, to provide additional incentive for a player to return to a gambling location. Such a system may be used to play one or more online games, which may be then used to incentivize a player to return to a gambling location (such as a casino). The game may be initiated by a player accessing a website by a gaming operator, after which the game may be played.

As discussed, the player may be invited to play the online game. Such an invitation may come from a direct mail invitation, email, website advertisement, issued ticket, coupon or other type of invitation. The invitation may, for example, include a code that permits the player to access the online game. The invitation may include any number of identifying information, including codes that may be associated with the player to which the invitation was extended. In some cases, there may not be a hard association of the invitation to the player (e.g., when advertising to a group of people), and the player when redeeming the invitation may be required to provide additional information identifying the player.

Figure 6:
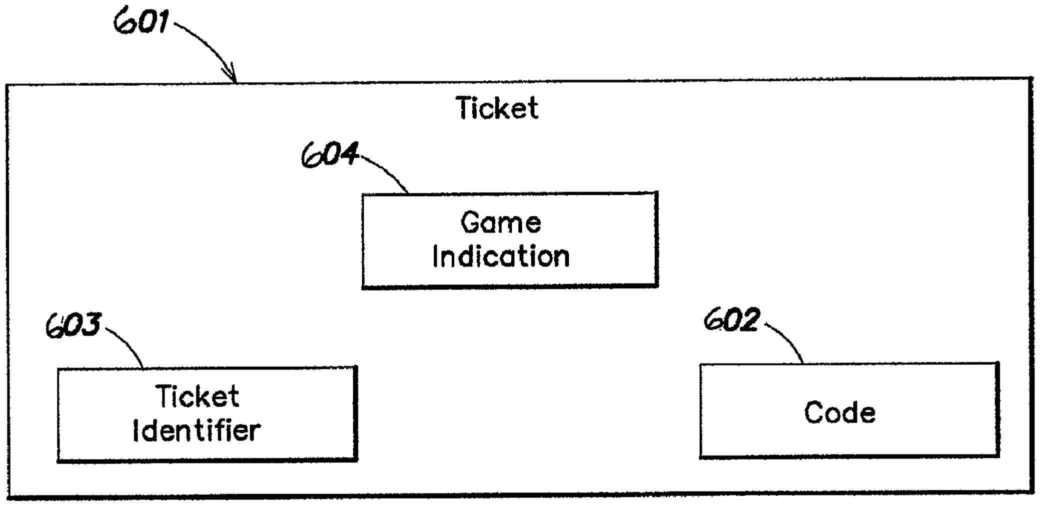
FIG. 6 is an example ticket that may be issued in association with a game according to one embodiment of the present invention.

FIG. 6 shows an example ticket 601 that may be issued to a player, although it should be appreciated that an invitation may be extended to a player in other forms, and the invitation need not come in printed form. Rather, according to one aspect of the present invention, the player may need to be correlated to a particular invitation to permit the player to redeem any winnings, if awarded. Such a correlation may be effected using one or more codes, either printed or not, gaming pieces, any out-of-band messaging (e.g., a phone call) or other methods, and the invention is not limited to any particular form of an invitation unless explicitly recited in the claims.

In the case where the player is issued a scratch-type ticket, the player may scratch a surface of the ticket to reveal one or more indications. These indications may include, for example, a serial number of the ticket, an access code, or other indication (or combination thereof) that may be used to access the online game. Alternatively, the ticket may be a pull-tab ticket or other ticket type suitable for presenting indications to a player. In other embodiments, the player may be permitted to access a website to receive an invitation, may receive an e-mail, or may receive an invitation in a non-printed form as discussed above.

In the case where the ticket is printed, the ticket may include other indications (e.g., a decryption key or portion thereof as described above that may be used to decrypt game results). Also, the ticket may indicate to a player the number of plays of a second game (e.g., as played by the player on a computer system). For instance, in the case of a slot machine game, the ticket may indicate the number of spins that a player may be awarded by the ticket. In the case of a COLLAPSE-type game, the ticket may indicate the number of game instances (or plays) of the COLLAPSE-type game that can be played by the player. Further, as discussed above, the player may be permitted to play any one of a number of offered games, and the player may select different games to play to reveal results associated with game instances. For instance, the player may be permitted to play a number of different games, including, but not limited to games of chance, games of skill and chance, games of skill, casino games, card games, or any other type of game. In one embodiment, the player may be awarded during the online experience, an award which may be redeemed at the gambling or other redemption location (e.g., a POS location).

In one embodiment of the invention where a physical ticket is printed, ticket 601 includes a code 602 printed on a surface of the ticket that provides access to outcomes (e.g., prizes) stored on the server. As discussed, code 602 may also include, as an optional feature to increase security, a key that may be used to decrypt the outcome. This outcome may be stored in a database stored on a server system. Ticket 601 may also include a ticket identifier 603 used to identify the ticket, and which may be used to identify the outcome associated with the ticket. Further, ticket 601 may include a game indication 604 that relates information relevant to a game played on a computer system. For example, there may also be stored, on the ticket, an identifier that indicates, to the player, the number of plays associated with an online game. In one example, a player is provided a ticket (e.g., for free) or otherwise purchases a ticket at a retailer or other POS location (e.g., in a casino). In the case where there is no physical ticket associated with the invitation, the invitation may itself have an identifier associated with the invitation. The invitation identifier may be unique to a particular player, or may be unique to a particular group of players to which the invitation is extended.

Figure 5:
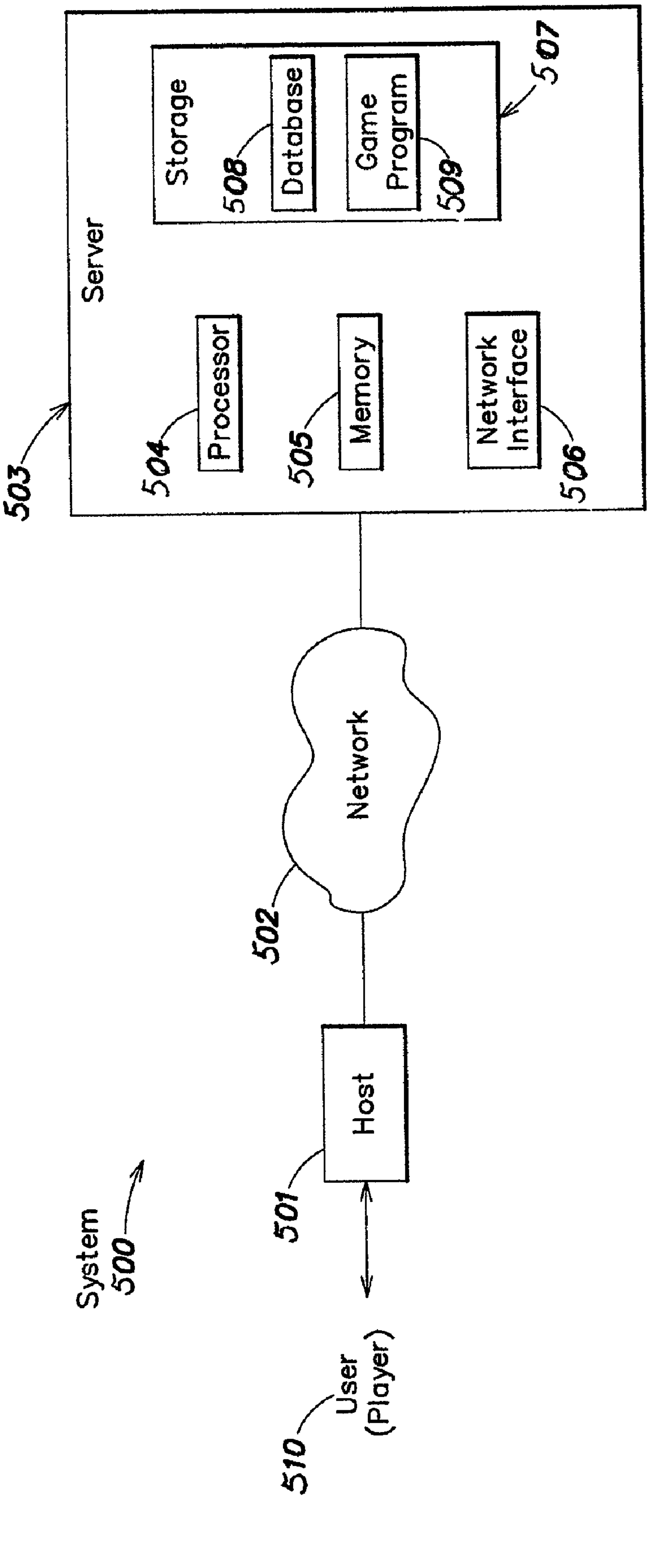
FIG. 5 is a block diagram of a system for conducting a game according to one embodiment of the present invention.

The player then proceeds to play a game on a computer system. FIG. 5 shows an example system 500 according to one embodiment of the invention upon which a game may be played. The user (a player) 510 plays a game through an interface of a host computer system (e.g. host 501). Host 501 may be any type of computer system that is capable of playing a game. The host may be, for example, a general-purpose computer system (e.g., a personal computer (PC)) that connects to a network (e.g., the Internet). Other general purpose computer system types (e.g., a PDA, a cell phone, set-top box, or other system type) may be used to play the game.

The computer system may be coupled to a server system 503 through one or more communication networks 502, including, but not limited to, the Internet. The server may provide a game program 509 that is executed by host 501 for playing the game. More particularly, game program 509, when executed, may provide an online game that can be played by a user through an interface associated with host 501. This online game may be, for example, a video slot machine, blackjack, or other online or casino-type game.

The game program may be stored, for example, in a computer-readable medium (e.g., a memory, storage, or other media) associated with server 503 that provides game programs. For instance, the game program may be stored on a web server and downloaded to a client computer over the Internet. Game program 509 may be one of a number of game programs associated with an online game experience. Different game programs may be selectively downloaded to the client, based on the type of game ticket issued, the game selected for play by the user, the type of client used, or other criteria.

Server 503 may also be a general-purpose computer system, or any other type of computer system capable of authenticating tickets, providing game programs, and performing other game-related functions. Further, it should be appreciated that various game functions may be performed by one or more server systems. Server 503 generally includes a processor 504 for executing server-based game functions. Server 503 may also include a memory 505 for storing data associated with game programs. Server 503 may also include one or more network interfaces 506 that couple server 503 to network 502, which permit server 503 to communicate with one or more hosts. Further, server 503 may include one or more storage entities 507, including disks or other media for storing data. In one embodiment, storage 507 is adapted to store one or more game programs 509 as discussed above. Server 503 may have any number or type of processor that executes an operating system and one or more application programs. In one embodiment, server 503 provides web server content to one or more clients for the purpose of accessing and playing the game.

Server 503 may also include a database 108 that is adapted to store one or more outcomes associated with a ticket or other gaming piece. As discussed, the outcome may be indexed using an identifier of the ticket.

Figure 7:
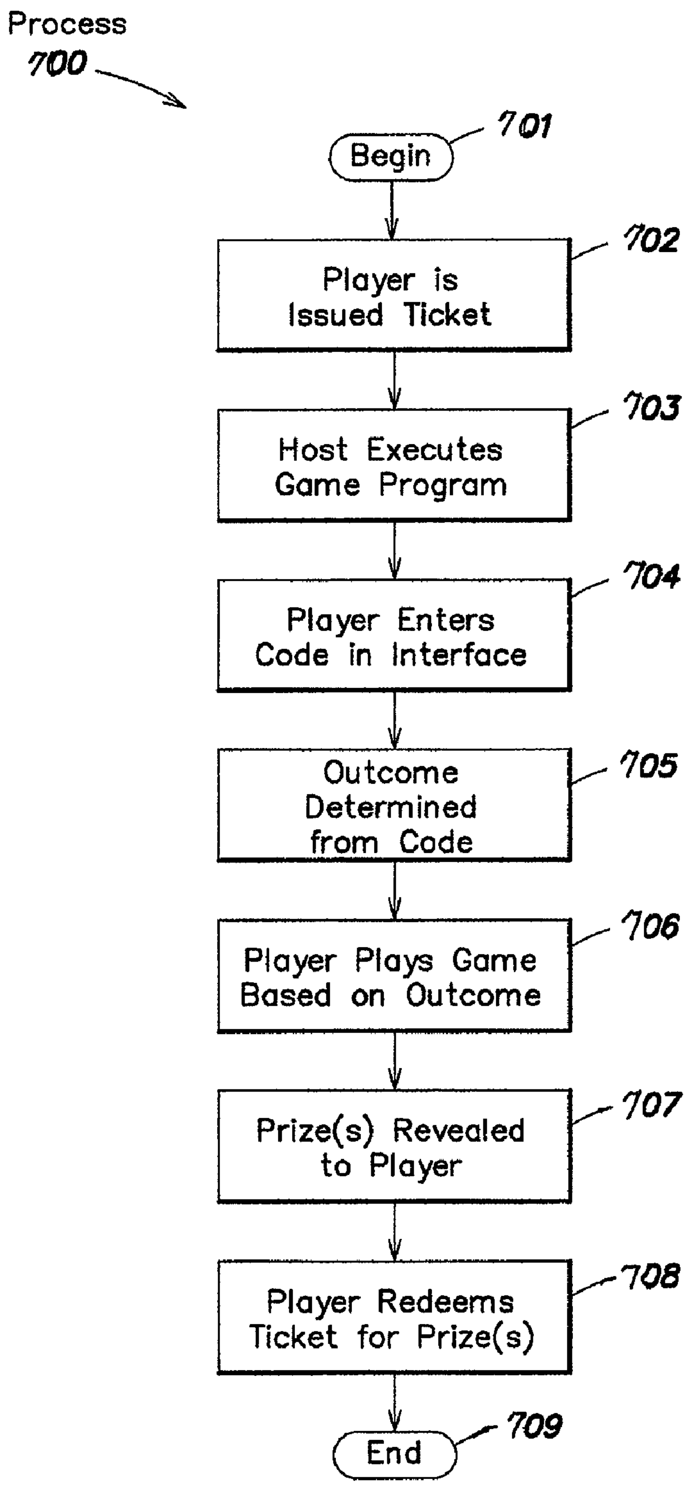
FIG. 7 is a flow chart of a process for conducting a game according to one embodiment of the present invention.

FIG. 7 shows one example process for conducting a game according to one embodiment of the present invention. At block 701, process 700 begins. At block 702, a player is issued a ticket or is otherwise provided an invitation to play an online game (e.g., using any of the invitation methods described above). In one embodiment, a player may purchase or is otherwise provided a ticket at a retailer, casino, or other POS location. In another embodiment, the invitation is provided free of charge. As discussed, the invitation may be provided based on some qualification of the player.

At some later time and/or location, the player may play an online game on one or more computer systems (e.g., a PC or other computer system capable of playing games). For instance, at block 703, a host computer system (e.g., host 501) executes a game program. The game program may be, for example, an online game that includes one or more components downloaded over a communication network (e.g., the Internet).

As discussed, the ticket may include a code which is used to access the outcome of a game. This code may be printed on a face of the ticket as discussed above with reference to FIG. 6. In one example system, the player accesses a website that includes an interface in which the player may enter the code at block 704. In the case where no physical ticket is issued, there may be other methods for associating a invitation to a particular player or group of players and an outcome of an award to be provided to the player and/or group of players.

This interface may be, for example, used to access the game, or may be any other interface (e.g., an interface used to access a download website used for downloading game software (e.g., game program 509)). The interface may be programmed in one or more computer languages (e.g., an HTML, Java, Macromedia Flash, or other type interface) and may include a text entry box in which the player can input the code. The interface may include other ways of entering a code or other parameter (e.g., a glyph printed on a ticket) that allows the user to gain access to the game. It should be appreciated that the invention is not limited to any particular method for entering the code, or any format of the code, and that any type of code or method of entry may be used.

The player enters the code, and an outcome is determined at block 705 based on the code. More particularly, there may be a mapping between the code printed on the ticket and an outcome stored on the server. This code may be stored, for example, in a database structure stored in database 508 of the server. Database 508 may be, for example, a relational database, object database, flat file database, or other organizational entities used to store and maintain data. Further a listing of winning codes may be furnished to an organization that provides the game (such as, for example, a state-run lottery commission, casino operator, etc.). The code may, as discussed above, include an optional decryption key that decrypts an entry stored on the server. This entry may indicate one or more outcomes of game instances.

The outcome of the game is then used by the online game to determine play of the game by the player at block 706. For instance, if the stored outcome is "Win $50," the online game may present an outcome to the player that indicates that the player won a $50 prize. This presentation may be in the form of one or more reveals presented to the player while playing the online game at block 707. The presentation may be progressive, in that the ultimate outcome (e.g., "Win $50") is achieved through a set of reveals or progressions through the online game. For example, in the case where a COLLAPSE-type game is played wherein items are collected for playing in a second level game, such reveal outcomes of each instance of the COLLAPSE-type game may be stored on the server.

As discussed, prizes may be distributed over game instances and/or items (or more generally, win opportunities) to maximize game interest and to entice the player to play each game instance associated with a particular ticket. For example, one approach may include providing to the player an early (relative in the series of game instances) indication of winning to keep the player interested. As the player plays more game instances, the magnitude of the prizes may be adjusted such that a level of game "drama" is increased. That is, prize values are adjusted among later game instances to provide relatively higher prize values in later games. Other approaches/distributions may be provided for increasing or maintaining game interest.

Once played, the player may redeem the ticket at the point of sale or other redemption location (e.g., a gambling location such as a casino) at block 708. Alternatively, the player may be permitted to redeem the ticket without playing the game. Redemption may be permitted, for example, after a predetermined time. For instance, the player may be permitted to redeem a ticket after a set time (e.g., 10 PM), a particular time period after ticket purchase (e.g., 24 hours) or other absolute or relative time. This may be the case for a Keno or lottery-based system, where a Keno or lottery result is made available at a set time after the ticket or other type of invitation was provided to the player. Alternatively, tickets may be redeemed immediately after they are provided to the player to entice the player to remain at the gambling location. According to one embodiment, the player may be permitted to redeem the ticket (and winning result) any time after accessing the game. At block 709, process 700 ends.

Payouts may be determined by a pay table associated with the game. The number of tickets may be determined a priori, and a pay table that determines payouts may be allocated to the tickets. This allocation may be determined, for example, by shuffling the pay table and allocating results to tickets. The following is an example of a pay table that may be used with a game according to one embodiment of the invention:

TABLE II

Example Payout Table

| Number of Tickets | Payout |
|---|---|
| 1 | $100 |
| 700 | $10 |
| 500 | $5 |
| 100 | $1 |
| 600 | $0 |

Number of Tickets Issued: 2000
Ticket Price: $5
Game Operator Return: $300 (3%) - expenses As shown in the example above, a certain number of tickets may be allocated as winning tickets having a particular payout (e.g., an outcome). Some tickets may have no payout associated with them, and some may only have a nominal payout (e.g., a small award amount, free ticket, etc.). A small number of tickets may include a large payout as compared to the magnitude of other payouts. It should be appreciated, however, that payouts are not limited to money, but other types of prizes may be awarded including merchandise, credit, loyalty points or any other representation of value. As discussed above, it is appreciated that it would be beneficial to provide a great enough reward to encourage the player to return to the gaming location. Thus, according to one embodiment, the player may be provided an appropriate award that properly incentivizes the player to redeem their award (and return to the gambling location).

The odds of winning may be the type of odds experienced in actual (rather than computer-based) games. Alternatively, the odds of winning may not necessarily be "natural" odds of winning any particular type of game, but rather, the odds may be adjusted to obtain the outcome desired (e.g., by the gaming operator). The odds of winning, number of winning tickets, amount of payout per ticket, or other payout parameter may be any amount or number, and the invention is not limited to any particular odds of winning, number of winning tickets, payout amount or type of payout. However, according to one embodiment, the overall odds of winning, amount and type of payout, etc. may be similar to a game previously approved by regulators (e.g., scratch ticket games, Keno, bingo, etc.) so that the use of an additional game to display an outcome associated with the previously-approved game is scrutinized much less by regulators, and as a result, the approval of the additional game is less burdensome. To this end, a system associated with the previously-approved game may provide ticket and outcome information to a system conducting an online game (e.g. server 503).

The code stored on the server (e.g., server 503) may be used to determine game play as played on the computer system. For instance, the game outcome may be "Win $50." In the case of a slot machine-type game, the ticket may indicate that the player receives 10 spins of the slot machine. The outcome of each spin may be predetermined, and the game may retrieve information from the server indicating a predetermined sequence of game play as discussed above. In the case of a slot machine-type game, the predetermined sequence may indicate the winnings associated with each of the spins. In the case of a COLLAPSE-type game, the outcome of each instance of the second level game may be stored on the server and retrieved prior to game play.

In another example, only the overall outcome is predetermined (e.g., the total winning associated with the ticket), and the sequence of game play may be determined when the game is played. In the example above where the player is indicated as winning $50 over 10 spins, the $50 winnings (and any intermediate losses) may be allocated to the player at any point over the 10 spins. In the case of the COLLAPSE-type game, winnings may be allocated across game instances. In a further example, winnings may be allocated across items collected while playing the COLLAPSE-type game. Because the number of items collected may vary depending on the skill of the player, the distribution of prizes among collected items may be determined during game play by the game playing system. Thus, according to one embodiment, the player's skill (or lack thereof) does not affect the overall outcome of the game.

This allocation may be determined by the server, the game software executing on the client, or a combination thereof. Further, the game play may be randomized in that a further play using the same ticket may yield a different sequence of game states leading to the same outcome. For example, in the case of a slot machine game as described above, a player may be indicated as winning $50, but the sequence by which the player attains the $50 winning outcome may be different depending on various factors. Such factors may include a randomization function that determines results of individual game plays (e.g., in the case of a series of "spins," the result of each spin), or some other function. The series of intermediate outcomes may be stored in a database associated with the server as discussed above with respect to game outcomes. Also, the outcomes may be adjusted using a formula or rule-based approach during execution of the game to increase the game drama and heighten the game playing experience.

According to another aspect of the present invention, a player may purchase a ticket at a point of purchase (e.g., a convenience store) and the indication of a win/no win condition of the ticket is revealed on a different medium. For instance, a player purchases a scratch ticket in a convenience or other type of store. The prize that the player wins is not revealed on the scratch card itself, but rather the prize is revealed through another medium (e.g., on a home computer system, PDA, cell phone, etc.).

For instance, as discussed above, the player may be presented another game (e.g., a slot machine or COLLAPSE-type game as described above) that reveals at least a portion of the prize. The underlying prizes available via the reveals may be predetermined, in that the outcome of the game may be stored in one or more systems. The scratch ticket may reveal different numbers of plays (e.g., pulls in the case of a slot-machine type game, or game instances of a COLLAPSE-type game) the player receives. As discussed, the game could be any type of game, and the type and number of plays may be any number and may be selected according to the type of online game being played.

In one aspect of the present invention wherein a physical ticket is issued, the ticket may include authentication information that is used to obtain the reveals. In one example, the scratch ticket contains a secret key which is used to decrypt the results that are revealed to the player. That is, according to one aspect, it is impossible to determine if and what a particular ticket wins without having possession of the ticket (and therefore the secret key). In another example, the scratch ticket could contain only a portion of the secret key. The other portion of the key may be stored, for example, on a server and retrieved from a database (e.g., file, relational database, etc.) based on, for example, the serial number of the card. Mappings of serial numbers of tickets to encrypted results can be provided to the lottery, casino, or other provider for additional audit control.

Figure 8:
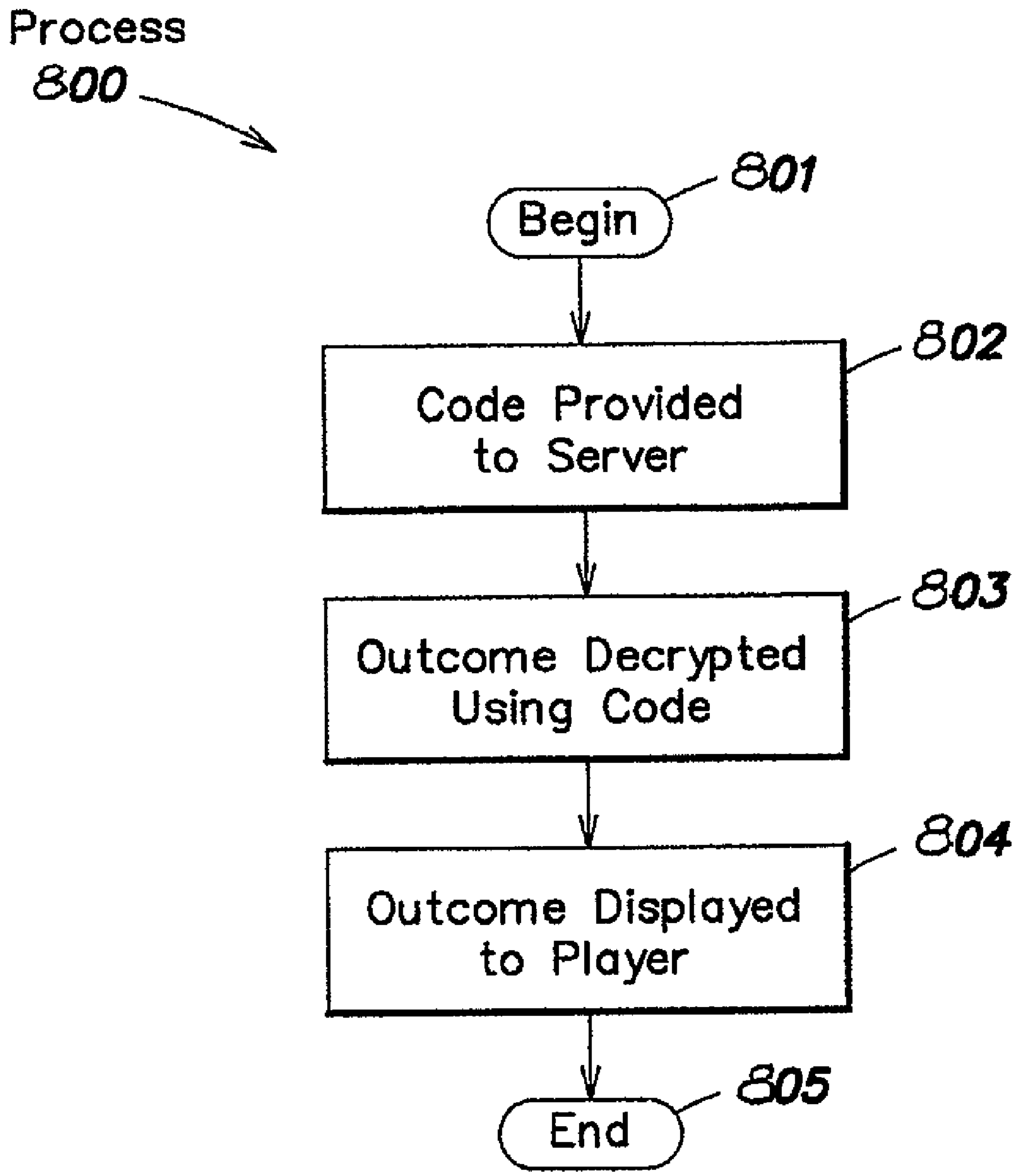
FIG. 8 is a flow chart of a process for conducting a game according to another embodiment of the present invention.

A process for performing secure access to outcomes is shown in FIG. 8. At block 801, process 800 begins. A server (e.g., server 503) may store a number of outcomes in encrypted form, each of which outcomes can be accessed by a respective code. These outcomes may be encrypted, for example, using any encryption method (e.g., symmetric, asymmetric encryption) as is known in the art. At block 802, a code is provided to the server (e.g., server 503).

This code may be, for example, a secret code (e.g., a symmetric key, a private key) printed on a ticket and provided to the server by a user through an interface of a computer system as discussed above. The received code may be transmitted between systems using a secure transmission method (e.g., SSL) as is known in the art. The received code is used at block 803 to decrypt the outcome stored on the server. This code may be any decryption key type that may be used to decode data, and may be of any format or length. The decrypted outcome may then be presented to a player at block 805. The outcome may be displayed using any method. For example, as discussed above, the outcome may be presented through one or more reveals presented to the player during play of an online game. At block 805, process 800 ends.

Another aspect of the present invention relates to a lottery-based, casino-based, or any other type of software game that can be played over a network, such as the Internet. According to one embodiment, the system includes a purchase of a scratch-based or printed ticket by a player at a point of service (POS). A POS may be, for example, a place at which lottery tickets may be sold, including convenience stores or other locations where lottery products are provided. In an alternative system provided at a casino or other gaming establishment, a ticket may be sold to a player at the casino for play at a later time. In yet another embodiment, the ticket or other invitation type need not be purchased. Also as discussed, the invitation need not be printed and according to another embodiment, may be provided to the player with or without purchase.

The player receives the ticket or other form of invitation at the POS or other location (e.g., a casino), and proceeds to play a computer-based game at another location to reveal a result (or outcome) of the game. The computer-based game may be, for example, a casino-type game (e.g. slot machine, video poker) or other type of game, including amusement games or games of chance. In the case of the scratch or printed ticket, the result is not apparent to the player until the player plays the computer-based game. This game may be, for example, a software program that is downloaded and played over the Internet. Alternatively, other ways of accessing the online portion of the game may be used (e.g., PDA, cell phone or other method).

The ticket includes a code by which a player gains access to a result stored on a server that stores ticket information and results associated with each ticket. Such information may be predetermined at the time of ticket sale, or the results may not be known until a later time, after the ticket is issued to the player (e.g., in the case of a Keno, bingo, or other drawing-based system). The result may be determined by any number of factors, including but not limited to, data regarding the player (e.g., income, residence, etc.), the player's historical play at a gambling location, the player's play performance in an online game, or any other criteria that may be used to determine an award.

According to one embodiment, the code is an access key (or a portion thereof) that is used to access the result stored on the server. Further, the result (stored in the server) may be encrypted. For example, the code may be a private key or a symmetric key. The key may be transmitted by a client computer system to the server for the purpose of decrypting the result using SSL or any other secure method.

Because the decryption key is stored on the ticket, the gaming system is safer, as a breach of security of either the tickets or the server does not provide access to result information. More particularly, access to the lottery ticket database or other database type may not be accomplished without the ticket (used to decrypt the result). Further, the tickets may not be correlated to results without the lottery ticket database (because the results are stored in the database, not on the tickets).

In another example of the system, a portion of the key used to decrypt results of the game is stored on the ticket, and another portion is stored in the database of the server. In this manner, it is assured that possession of either portion of the key may not compromise the results.

However, it should be appreciated that the system does not require SSL or any other encryption/decryption method, a decryption key on the ticket, or the stored result on the server to be encrypted. Rather, the game can be implemented with or without these features. That is, access to the outcome stored at the server may be performed using only the serial number or other ticket identifier provided on the ticket or with the invitation.

The scratch-based or printed ticket may also include a second serial number or other identifier (e.g., an access code) in addition to the serial number or other identifier which is correlated to results on the server. A ticket may include both a serial number and a ticket identifier used by the system. According to one embodiment, it is appreciated that there may be security issues with using the serial number of a printed ticket (as printed on the ticket) to correlate to win outcomes. That is, in the case of a lottery-based system, the lottery provider may not allow any entity outside of the lottery system to have the ability to correlate outcomes to serial numbers. To this end, another identifier (e.g., a separate ticket identifier or access code) may be provided on a ticket to allow the system to index into an outcome database.

In one example system that works in association with a lottery system, outcomes for a game may be predetermined to comply with lottery rules. In this case, outcomes are predetermined and stored in a database. In an alternative environment where results are not permitted to be predetermined (e.g., in a casino), but rather are determined at a later time (e.g., by a drawing or other method), a ticket issued by a system in such an environment may have an associated drawing time when a game may be played. It should be appreciated however, that the award provided to a player may either be predetermined or not, and if not predetermined, may be the result of some later determination, such as a drawing, the result of a random number generator, etc.

Also, according to one embodiment, the player may be entered into a sweepstake or any other later-determined award based on an action that is performed in the gambling location. As discussed, the player may swipe his/her frequent player program number at a gambling location (e.g., a casino) and as a result, be entered into a sweepstake or other type of later-determined result. The result may be then later-determined (e.g., when the player participates in an online gaming environment), is presented the result of the sweepstakes which includes an award that may be redeemed upon return of the player to the gambling location.

In the specific case where the online game system is driven by a Keno game result, each ticket may be associated with a set of numbers in the Keno game, and the result of the Keno game is provided as the result for the online game. In one example, a computer system automatically picks numbers associated with the ticket at the point when the ticket is issued. Thereafter, when the Keno game occurs, the result of the Keno draw is provided to an online game system, which translates the Keno result to a game experience within another game (e.g., COLLAPSE, slot machine, etc.). It should be appreciated, however, that although the game of Keno may be used to drive an online game experience, other games (e.g., bingo) may be used.

The server (e.g., server 503) may be capable of accepting, from the user, an input of the serial number and decryption key, and in response, providing the results associated with the particular ticket. The result or outcome of the game may be displayed to the player in an interface of the computer system (e.g., a client computer system such as a personal computer (PC)) used to play the computer-based game. For example, the outcome of a series of plays associated with the ticket may be stored in the server, and provided to the client, and the series of outcomes may be presented to the player during play of the computer-based game.

In another embodiment of the system, a payout of the ticket may be encoded on the ticket. For instance, if the ticket is a $5 winner, the amount of the win may be encoded on the ticket. In the case of the casino-based version of the system, the payout may not be stored on the ticket (as the payout is not predetermined), but rather the purchase price of the ticket may be stored on the ticket, or some other identifier of the ticket.

Figure 9:
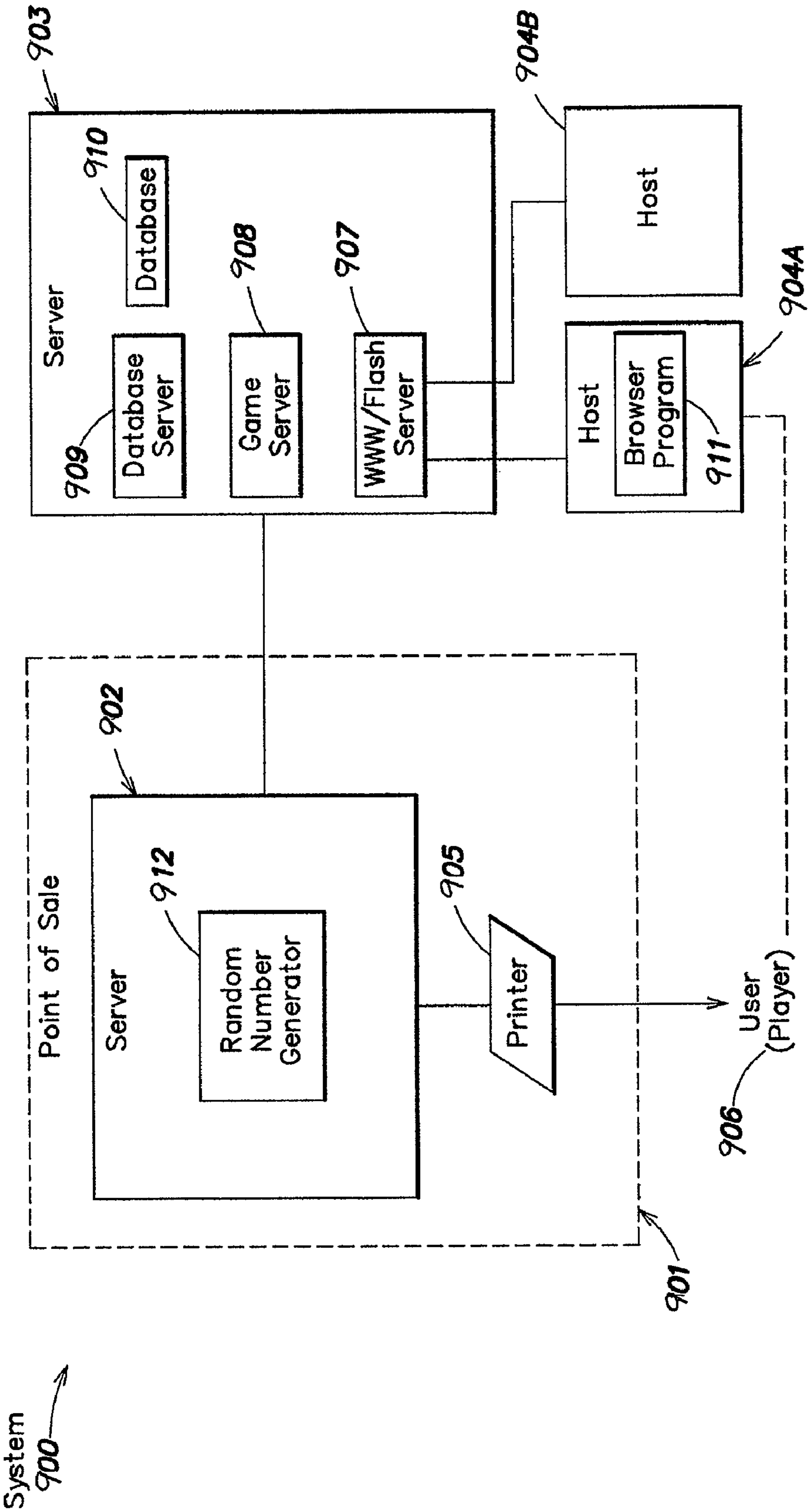
FIG. 9 is a system for conducting a game according to according to one embodiment of the present invention.

As shown in FIG. 9, a system 900 may be provided having more than one server. For instance, a server 902 provided at the point of sale 901 is primarily responsible with issuing tickets to a user/player 906. To this end, server 902 may issue preprinted tickets or may issue tickets printed from an associated printer 905. Such tickets may include one or more identifiers as discussed above with reference to FIG. 6. As discussed, another system such as a Keno or lottery-based system may be used to provide results to an online game system.

In one version of system 900, the win/loss determination of a ticket may be driven by a later-occurring drawing. For example, a Keno-based, bingo-based, or other type lottery draw system may be used wherein the outcome of a particular game is not known until a future time (e.g., when a drawing occurs). In this case, the ticket identifier stored on the ticket may be an access code generated from ticket identifiers in the Keno-based system (e.g., by an intermediate system or the Keno server itself that can translate a Keno ticket identifier into another type of identifier).

Generation of an identifier separate from the Keno ticket identifier may be necessary for security reasons relating to the Keno system. More particularly, access to the Keno ticket identifiers may not be permitted by the system (e.g., the Keno server). In one example, a Keno system translates Keno ticket identifiers into access codes and results that are stored on the game server (e.g., server 903). Thereafter, clients (e.g., hosts 904A, 904B) access results stored on the server based on their respective access codes.

As discussed above, one or more hosts 904A, 904B (e.g., general purpose computer systems) may communicate with a server 903 over a network for the purpose of conducting a game. In one example, a host 904A renders a browser window by executing a browser program (e.g., the Internet Explorer browser program available from the Microsoft Corporation). A user/player 906 enters a URL address specified by an issued ticket in a window of the browser interface, and is directed to a website associated with server 903. This website may be rendered by, for example, a WWW server process (e.g., server 907) associated with server 903.

Player 906 may be instructed to enter an access code (and/or any other required information) to access one or more games in an interface presented through the browser. As discussed, server 903 may validate the received access code, and provide any results stored in a database associated with server 910. Once validated by server 903, the user may be permitted to play one or more games. These game may be, for example, be programmed using one or more programming languages (e.g., Macromedia Flash) and may be downloaded to host 904A and executed.

Also, outcomes associated with any games may be downloaded prior to game play. As discussed, examples of games include those that may be of the lottery-type (e.g., having a predetermined outcome) and those that are casino-based (e.g., having an outcome that is not determined at the time of sale of the ticket). In the case where a later drawing affects an outcome, a player may not be permitted to play the game until the drawing occurs (and until results are available at server 903). In the case of a drawing that affects outcomes, drawing results can be communicated from server 902 to server 903. In addition, server 902 may maintain a mapping from a ticket identifier (e.g., a serial number) to an access code provided on the ticket, and provide a mapping of outcome to access code when the drawing occurs. As discussed, such outcome information may be maintained in a database 910 associated with server 903 and may be accessed through a database server process 909.

As discussed, the payout of the award may be displayed to a player in a number of ways. For instance, the payout of the ticket may be presented to the player through one or more reveals presented to a player during one or more plays of an online game.

For instance, in the case of a slot machine game, a player may be permitted, with the issue of a single scratch or printed ticket, a series of spins of the slot machine. The slot machine may, as the result of each of the spins, produce results that contribute to the overall payout to the player. For instance, after a single spin, a player may be presented an indication that he/she has won $5. The payout to the player as provided from the server database may be, for the series of spins, $50 overall, with particular outcomes for each spin. Additional spin results may provide the additional $45 that the player will receive. Additional spins may add, subtract, or have no affect on the contribution to the outcome of the game. These results of each spin of the slot machine game may be stored in the database of the server indexed by the ticket identifier, or may be randomly determined by the game program that renders the game. Further, as discussed above, the results of each spin may be "scripted" such that the game experience is more exciting to the player.

For example, in the case where the results of each spin are stored on the server, the series of results may be downloaded to the client at the beginning of the game as a series of entries, and the client may reveal each result as the player progresses through the series of spins. In the random method, results for each individual spin are not predetermined, but rather are determined by the client in a random manner. For instance, the actual outcomes of each spin may be randomly chosen among the possible combination of outcomes that may produce the required payout. In either case, the outcomes for each spin of the slot machine game is not stored on the ticket, but rather is stored at the server and downloaded just prior or during game play, or is determined randomly by the client. Alternatively, the client may determine the game experience based on a predetermined set of rules or formulas that, when an overall outcome is provided, allows the client to determine intermediate outcomes in a dynamic way. Because the game play and outcome are scripted, a player may also not play the game (and possible secondary games) to actually win. A player may purchase a ticket, wait until the ticket may be redeemed, and go to a POS to find out (and if necessary, receive) his/her winnings. A ticket may be allowed to be redeemed after a predetermined period of time after the drawing independent of whether the player has played the game. A ticket may be able to be redeemed after a predetermined period of time, from almost immediately to seconds to days or any predetermined time. For tickets with results dependent upon results of a particular Keno game or other event, the ticket may not be redeemed until after the event has passed.

In another alternative, the game results achieved by the online portion of the game may be separate from the award that is redeemed in the gambling location. For instance, the game may be a game for pure entertainment, having a result that is not correlated with the award provided to the player. However, the player may be required to play the online game to reveal the award.

Finally, after play of the online game, the player is permitted to validate the ticket or invitation at any gambling location (e.g., POS 901 (for example, a lottery agent, casino, or other gaming establishment)) to redeem his/her winnings as indicated during the online portion of the game. According to one embodiment, the player redeems an award of non-cashable credits, cash, or other type of award that can only be redeemed at the redemption location, encouraging the player to return to the redemption location.

According to one embodiment, players are permitted to redeem their winnings only after playing the online portion of the game. The player, by playing the online portion of the game, sets status information at the server (e.g., server 903). When the player attempts to redeem the ticket at the gambling location (e.g., POS 901), the status information may be checked, and the player is permitted to redeem his/her winnings. To this end, server 903 may communicate information back to server 902 relating to game play.

For instance, server 903 may collect information that indicates the sequence of game play performed at the client, and other player tracking information. In one example, tickets may be associated with a particular player, and the player may be awarded loyalty points or other credit for playing the game. Because the inventive game may award prizes such as, for example, a non-cashable credit for playing additional games, a complimentary offer, and/or promotional prizes, the inventive game may be used as a method for providing additional player incentives to return to a gambling location or other gaming establishment.

Online Reveal-Based Game Implementation

As discussed, various aspects of the present invention may be implemented in an electronic game. For instance, a player may be invited to play one or more instances of an online game (e.g., played over the Internet) in which the player may be awarded one or more prizes which may be redeemed at the gambling location. Such games may include games of chance, skill, or combination thereof. In one example, the game may include one or more instances of a COLLAPSE-type game as discussed above, however, it should be appreciated that any other game type may be used.

Taking a COLLAPSE-type game, a player is issued a ticket at a POS to play one or more instances of the COLLAPSE-type game. The ticket indicates an access code, and the player uses this access code to gain access to the system (e.g., from a host coupled to server 903 through the Internet). The player enters the access code in a user interface, and, once validated, is permitted to play the COLLAPSE-type game. As discussed, the COLLAPSE-type game is a version of the well-known game of COLLAPSE, which is a game of skill-based puzzle game. Optionally, the player is permitted to play, based on a single access code (and ticket), any one of a number of games available from server 903. Such an option may allow a player to play different games for each game instance associated with the ticket.

Figure 10:
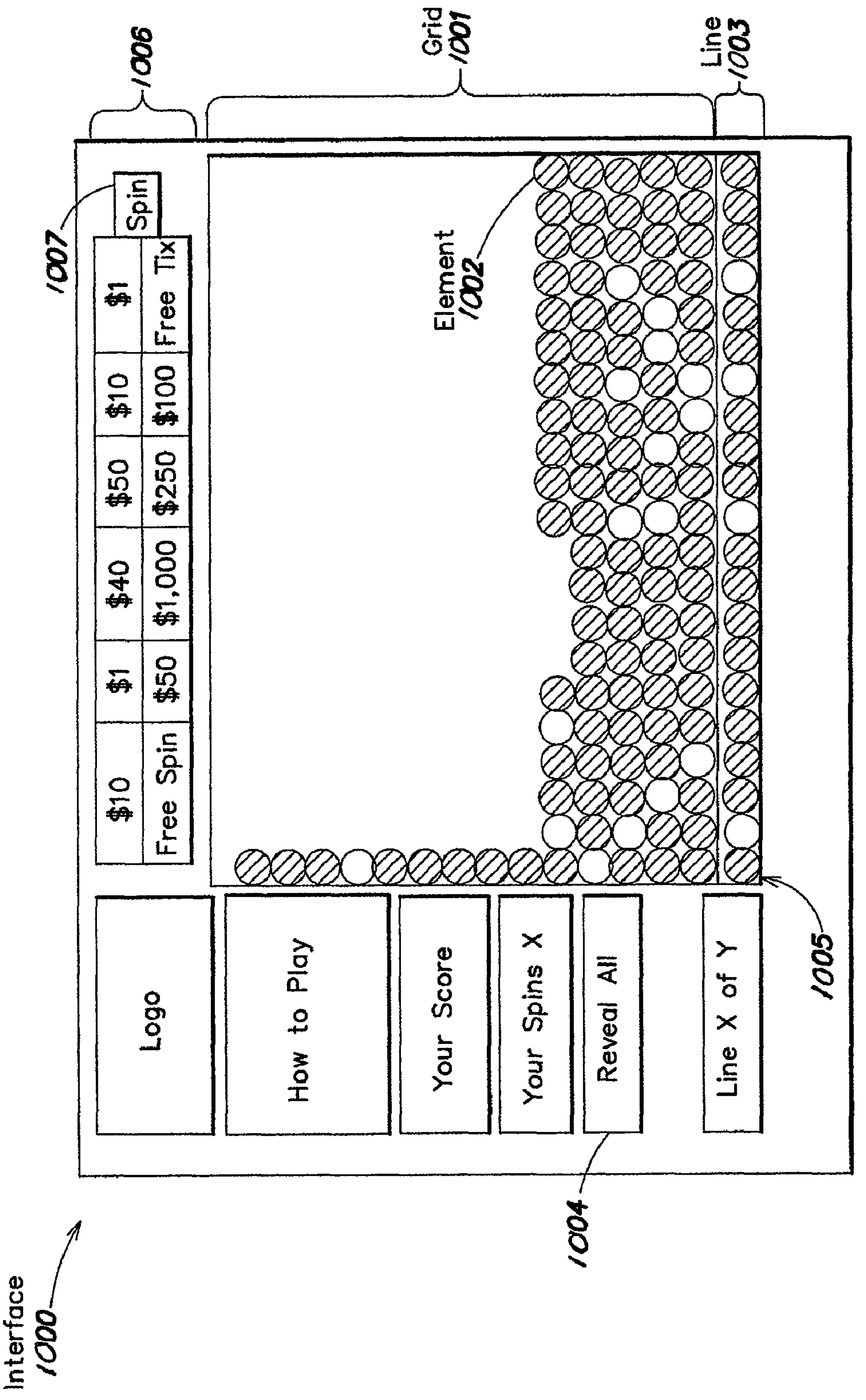
FIG. 10 is a game interface according to one embodiment of the present invention.

FIG. 10 shows an example game interface 1000 according to one embodiment of the present invention. The COLLAPSE-type game involves an interface 1000 that has a grid 1001 of elements (e.g., element 1002). Similar elements within grid 1001 may be identified by color, shape, or any other indication. One or more new lines of elements (e.g., line 1003) are fed into the bottom of the grid periodically.

A player removes groups of similar elements by selecting them within the grid, and the player is awarded points based on the number of elements removed. For example, similar elements may be indicated by color, and groups of similarly-colored elements may be removed from the grid. In one example, groups of three elements can be removed. Removal of larger groups of similarly-indicated elements may provide more points than smaller groups. It should be appreciated, however, that elements may have one or more indications that represent that they are similar, and the invention is not limited to any particular indication(s). Further, it should be appreciated that any number of elements may be removed as part of a group, and the invention is not restricted to any minimum number of element that may be removed.

Lines are moved into a preview area 1005 associated with interface 1000 that permits the player to anticipate what element types are being placed into grid 1001. Lines of elements may be moved into the grid at a predetermined rate, and the rate may be adjusted from time to time during game play. In one example, elements may be fed into the preview area from left to right, and when a line of elements is complete, the line of elements is pushed into grid 1001. The COLLAPSE-type game ends when the grid overflows with elements or a final line (e.g., of a predetermined number of lines) is fed into grid 1001. As an additional option, a player may bypass play of the COLLAPSE-type game by selecting a "Reveal All" element 1004 within interface 1000. Selection of element 1004 may cause the COLLAPSE-type game to end and may allow the player to progress to a second level game.

As discussed above, the second level of the game may be played with items collected during the COLLAPSE-type game. Also, as discussed, these items may be hidden within elements of the grid (e.g., grid 1001) and released as elements are removed. In one version of the game, items such as spins of a wheel or sticks of dynamite (a.k.a. "hotsticks") are located within elements in the grid. Items (spins, sticks, etc.) are accumulated and used in the second reveal-type game to reveal a payout or other type of prize. As shown in interface 1000, there may be a prize window 1006 in which prizes are awarded.

Window 1006 may indicate a number of available prizes, and may include an interface control (e.g., spin control 1007) that allows the player to initiate the second level of the game. Window 1006 may be a part of or separate from a window that includes grid 1001. After the player selects control 1007, window 1006 indicates what, if any, prize is won. Interface 1000 may also include an indication of the number of spins or other items remaining to be played by the player in the second level game.

In the example game discussed above having one or more elements containing hidden items (e.g., safes), sticks of dynamite or other items collected may be used to uncover the hidden prizes in the second level portion of the game. For instance, winnings (e.g., cash prizes) revealed within opened safe elements are awarded to the player. In one example, the reveal of the number of sticks awarded to a player may be randomized by the client computer, with at least one stick awarded to the player to allow the player to open at least one safe.

After play of the second level game, game play is returned to another instance of the first level game (e.g., the COLLAPSE-type game). The player may, however, choose to play a different game (e.g., a card game or other game) at the conclusion of any particular game instance. The player may be permitted to play further instances of the COLLAPSE-type game, with each level of the Collapse-type game leading to a second level wherein prizes are revealed. These intermediate prize amounts that are revealed with each instance of the COLLAPSE-type game, as discussed above, may be stored in a database of the server, and provided to the client prior to or during game play. Alternatively, intermediate prize amounts may be determined at the client in a random manner (e.g., by randomly selecting a possible combination of intermediate prize amounts that total the overall prize awarded to the player). In another example, a game may be determined dynamically by the game system or client based on one or more rules. These rules may be tailored so that the overall result is revealed by the game system in an interesting way.

For instance, the ticket may have an overall prize value of $50, and the prize awarded at each instance of the COLLAPSE-type game may accumulate to form the $50 prize. There may be a finite number of combinations based on the number of game instances to achieve a $50 prize, and the actual game experience presented to the player may be a random selection of the finite outcomes. In any case, the result of each game instance is either stored at the server or is determined randomly or dynamically by the client as discussed above.

According to one aspect of the present invention, it is realized that the time at which a ticket or other invitation type is activated (and therefore, may be played) is important. In the case of a casino-based game, where an invitation is provided at the casino (e.g., in the form of a ticket or other invitation type), it may be beneficial to include a delay between the time that the invitation is provided (e.g., purchase of a ticket at the casino) and a possible redemption of the ticket (on a return visit of the player to the casino) so that the game play associated with the ticket does not compete against other games offered by the casino (e.g., floor games). For example, in the case of a slot machine game, it may be preferable that such a game be activated after the player leaves the casino, or otherwise is not playable while in the casino so as not to compete with other types of slot machine games or other game types offered by the casino.

Further, another benefit of introducing a delay between ticket issuance and activation includes increasing the likelihood that the player plays the game at another location (e.g., at home), requiring the return of the player to the ticket redemption location to redeem his/her winnings. Because the player needs to return to the redemption location (which may be a casino), the possibility that the player will purchase additional tickets or play other types of games offered at the redemption location is increased.

According to one embodiment of the present invention, a COLLAPSE-type game is conducted that may include the following additional aspects, either alone or in combination:

- The game begins with a fixed number of lines of colored elements already positioned on the game grid (e.g., grid 1001) and available to be selected by the user (or player).
- New elements fill the bottom and/or the top of the screen, from left to right, one at a time, but are not available to be selected. When a row is complete, the line of elements is pushed onto the game grid and added to those elements in active play. Alternatively, new elements may fill the game grid from any edge, including from the right and/or left side.
- Selecting the preview area as lines are being formed causes the preview area to fill with elements and the elements to be added to the active play area.
- The user can clear elements from the active area by selecting any three or more same-colored elements that are touching.
- When a user positions a selection device (e.g., a mouse pointer) over a group of elements that are eligible to be cleared, the group of elements changes in appearance.
- When elements are cleared, the elements above fall downward and toward the center to fill any void created by removed elements.
- When the user clears an element that contains a dynamite stick (or other item) in it, that stick is placed to the right of the game board for use in the second level game (e.g., a prize round).
- When the stack of elements comes within a predetermined number (e.g., three) of rows of the top of the game area, a warning area flashes.
- If the elements reach the top of the game area, the COLLAPSE-type game ends and the user is taken to the second level game.
- If the user collects a predetermined number (e.g., six) of dynamite sticks, the COLLAPSE-type game ends, and the user is taken to the second level game.
- The user begins the game with one dynamite stick collected for him/her.
- At the second level game, the user is presented with a grid, 6 by 6, of safes.
- The user selects a button and the first dynamite stick is used.
- The stick begins at the top left most safe and moves over each safe in turn, from left to right, top to bottom, one at a time.
- The safe that the stick stops at is blown open to reveal either a cash amount or other prize type or an indication that no prize is awarded.
- If multiple sticks are available for use, each subsequent stick starts at the safe immediately after the safe that was blown open.
- The sticks skip over safes that have already been opened.
- At the conclusion of the game, the user is presented an indication that the second level game is over and an indication of any prize(s) awarded.

The overall result (e.g., payout) for purchasing a ticket may be predetermined (as in a scratch or other type of instant lottery game) or may be determined by a later event (such as a lottery, Keno, or bingo draw) that occurs after ticket issuance.

Frequent Player Tracking System Implementation

As discussed above, various aspects of the invention relate to providing incentives using a frequent player program. Frequent player programs for casinos generally involve players using frequent player program credits at the casino or affiliated establishment. Therefore, the player must visit the casino or other gambling location in order to use the rewards or incentives that the individual may obtain. However, there is no actual additional pull for getting the player to visit the gambling location.

Additionally, it is appreciated that constantly visiting a casino at a physical location may be inconvenient for a bettor, especially if the location is located far away from the bettor. However, with the advent of Internet-based betting sites and online casinos, land-based casinos and other gambling locations are at a disadvantage to obtaining bettors that can have other betting opportunities that are more readily available.

One aspect of the present invention relates to a method for providing additional incentives to a frequent player program member to visit a casino or other type of gambling location. One such method combines the ease of using the Internet or other remote communication technologies with the advantages of a frequent player program. In one embodiment of the present invention, each frequent player program member has a unique identifier (e.g., number or account name) and a password or passcode. In another embodiment of the present invention, the frequent player program member may be presented with special incentives for remotely swiping his or her frequent player program card (or by remotely entering his or her unique identifier and password) in a manner that the casino's frequent player program recognizes. A member may be able to remotely swipe their frequent player program card (or enter his or her unique identifier and password) using an audio-enabled, video-enabled, or card reader-containing device. For instance, a kiosk, telephone having a display, television, computer or handheld device may be used. This additional incentive, according to one embodiment, may require the member to return to the casino to redeem the incentive. The incentive may, for example, be in the form of a prize, credit, or other incentive that has value to the member.

The special incentive may be any program that is targeted exclusively to members that remotely swipe or otherwise use their frequent player program cards. The special incentive program may include, for example, extra prizes or rewards that are awarded to frequent player program members when they remotely swipe or otherwise use their frequent player program card. In one embodiment of the invention, the extra prizes or rewards are not provided to the member until he or she visits the gambling location. In another embodiment of the invention, the member must visit the gambling location within a specified period of time to obtain the extra prizes or rewards. For instance, the specified time period may be determined to be within a set time period of the membership card being swiped or within a set time period for the special incentive. For example, a player may be required to visit a gambling location within one week or two months of having swiped his or her membership card. In another example, the player may be required to visit the casino by a set date (e.g., Feb. 28, 2006) when the special incentive expires.

In another embodiment, the player is encouraged to swipe or otherwise use their membership card remotely as frequently as possible. In one example implementation, a system (e.g., system 300) may determine incentives periodically (e.g., daily) which are then displayed to the player. These incentives are displayed to the player as indication of a win in the display of a remote system. Because the incentives are determined in a periodic manner, continued return by the player to the remote system interface is encouraged. For instance, if the period for determining an incentive is once a day, a player will be encouraged to use the remote system to see if they have won any incentive(s). In this way, both return to the casino and the remote interface is encouraged.

Figure 12:
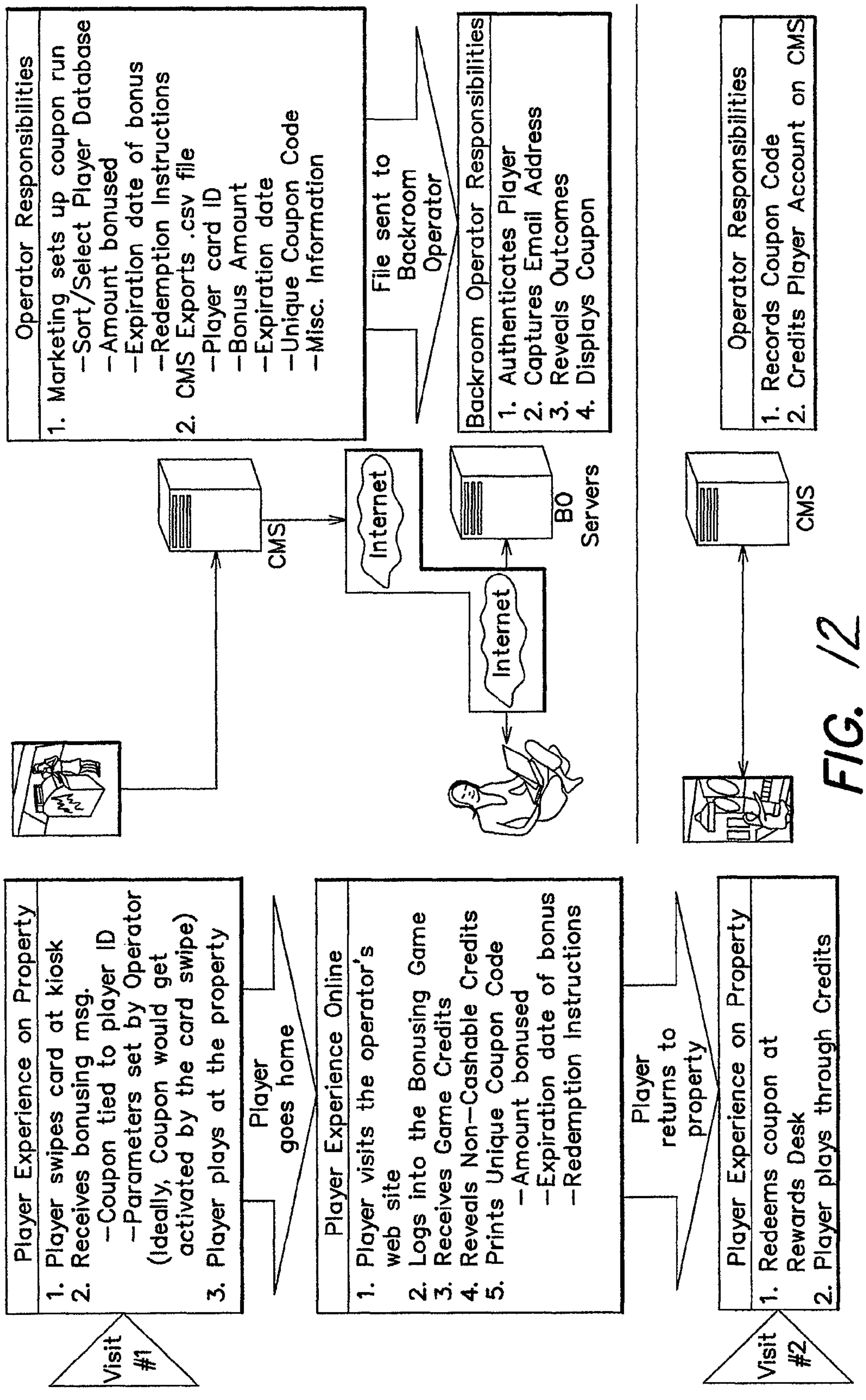
FIG. 12 is a block diagram showing an example of a system according to another embodiment of the present invention.

In one embodiment of the invention, a bonusing message may be presented to the player when the player swipes his or her frequent player card at the kiosk and a paper or electronic coupon may be activated for the player (FIG. 12). The bonusing message may indicate, for instance, that the player may be eligible to receive a prize (e.g., to be revealed online). The player may then proceed to an operator's website either on-site or off-site from the casino. When the player logs in, the coupon is activated to reveal the number of game credits a player has received.

Using the awarded game credits, the player may then proceed to play the game. As the player plays the game(s), the player reveals a prize (e.g., one or more non-cashable credits, complimentary offer(s), and/or promotional prize(s)) won by the player. When revealed, the prizes may be printed onto a coupon. In another embodiment, the prize may also have an expiration date, before which the prize may need to be redeemed (e.g., at a land-based or other type of casino or gambling location). In this manner, the player is incentivized to return to the gambling location to redeem the award or prize.

In one embodiment, the prize may be predetermined. For instance, the amount of non-cashable credits may be a predetermined number stored in a database. In another example, the prize may be limited within a predetermined range (e.g., number of credits, monetary value, etc.), and the actual awarded prize may be randomly selected from within the range. In this way, the award may appear to the player to be randomly determined.

In the case where the prize includes non-cashable credits, the player may then proceed to the land-based casino or other gambling location and use the non-cashable credits in any manner acceptable to the operator. An acceptable manner of use may include allowing the player to play standard casino games, slot machines, or any other type of game. Generally, non-cashable credits may be used for playing casino-based gaming machines.

In another embodiment of the invention, a player may receive an offer for game play or any other invitation by direct mail, e-mail, telephone, pager, fax or any other communication method (FIG. 11) rather than receiving a bonusing message by swiping a frequent player card. Such an offer for game play may, for example, direct the player to the operator's website and provide the appropriate information for logging into the website to play the game.

In yet another embodiment of the invention, a player may enter a sweepstake to win game play(s). The player may be informed whether they won or lost at the time of entry. Preferably, the player is entered into a sweepstake with a specified time of drawing. In another example, the player may be entered into only the next sweepstake drawing, a specified number of sweepstakes drawings or all future sweepstakes drawings.

Figure 11:
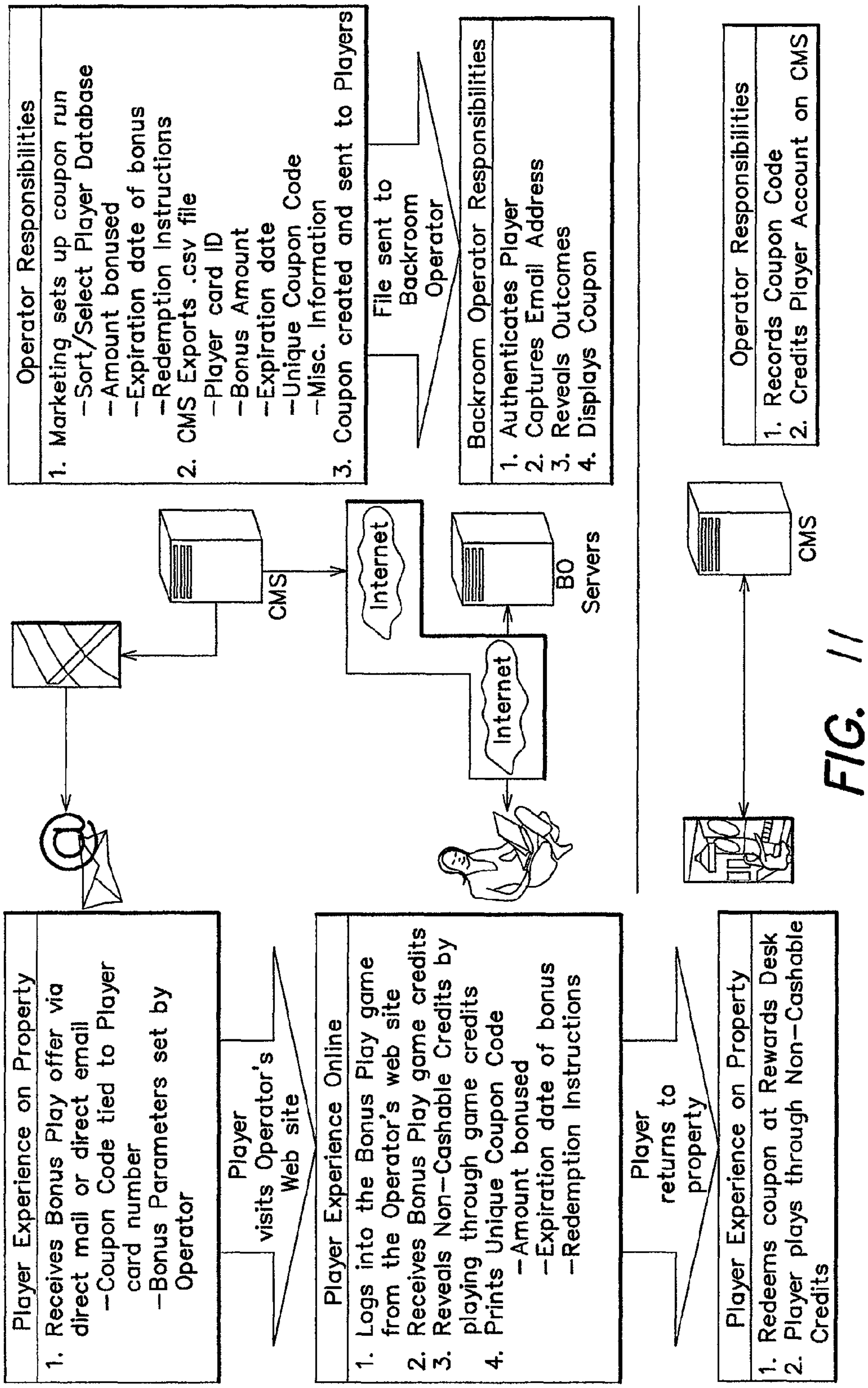
FIG. 11 is a block diagram showing an example of a system according to one embodiment of the present invention.

FIG. 11 shows one example of a method for providing incentives to a player. As shown in FIG. 11, the player may receive an offer or invitation via direct mail or direct email. In one embodiment, the player is provided a code (e.g., a coupon code) which permits the player to play an online game. The bonus or other award may be determined by the operator based on one or more parameters.

For instance, the operator may determine a number of players that are to receive a number of invitations to play the game. In one embodiment, players may be selected from a database (e.g., as identified by a frequent player account) and may be invited to play an online game. As discussed above, the amount bonused or awarded to the player may be determined based on a player's historical performance, information specific to the player (e.g., income, residence address, position, etc.). Further, to encourage the player to return to the gambling location or gambling property, an expiration date of the offer may be determined by an operator which encourages return to the property within a specific timeframe. Further, redemption instructions may be determined based on the bonus or invitation provided to the player.

According to one embodiment, various aspects of the invention are implemented on a casino management system or other type of gaming management system. According to one embodiment, the casino management system associates the invitation or bonus with an identifier of the player, such as for example, a frequent player program identifier. The casino management system or CMS may store a number of elements related to the invitation such as, for example, a player card ID, bonus amount, expiration date, a unique code associated with the offer (e.g., a coupon code), or other miscellaneous information related to the invitation extended to the player.

The CMS or other type of gambling management system may be coupled to other types of servers that are used to conduct the online gaming experience (e.g., server 903 as discussed above with reference to FIG. 9). According to one embodiment, such servers may be operated by another entity referred to herein as the backroom operator or the backoffice operator. The backoffice operator may be, for example, a service provider to the casino or other gambling establishment that conducts the online game experience. In one embodiment, the CMS communicates a set of information to the backoffice operator such that the online gaming experience may be conducted. The backoffice operator may have a number of systems (e.g., backoffice operator (BO) servers) that perform a number of functions associated with the online gaming experience. In one embodiment, the backoffice operator and its systems receive information relating to the bonus offer or invitation that is sent to one or more players. Based on this information, the BO system may tailor the online gaming experience accordingly. The BO system may perform functions associated with authenticating particular players, obtaining additional information from the player such as, for example email address, revealing outcomes of the offer or any other game outcomes, and displaying and/or printing any coupons or other item that can be redeemed by the player upon return to the gambling property.

A player receiving the offer visits the operator's website or other facility for presenting the game to the player. In one embodiment, the player logs into the bonus play game from the operator's website. Thereafter, the player plays an online game. In one particular embodiment, the player may receive bonus play game credits that may be used to play one or more online games. As discussed above, the games presented during the online game experience may be any type of game, including but not limited to games of skill, games of skill and chance, or pure games of chance. In one embodiment, the games provided online similar to those offered on the casino property. In one particular case, the offer extended to the player is based at least in part on the play of the player of the online game. At some point during the online gaming experience, the player is provided a unique code (e.g., a unique coupon code) indicating the award provided to the player. Such an award may indicate, for example, the amount bonused to the player, the expiration date of the bonus, and any redemption instructions that are associated with the offer.

The player is incentivized by receipt of the offer to return to the gambling location (e.g., a casino property) so that the player can redeem the award. For instance, the player may redeem the award at a rewards desk located in the casino, or may be provided some other method for redeeming the award. For instance, the award may be a complimentary offer which can be redeemed at a hotel located on the casino property, the award may be non-cashable credits which can be associated with a frequent player account which are then redeemed at a gambling device, or any other appropriate method for redeeming the award at the gambling location. The operator may perform one or more actions associated with the redemption offer such as recording the redemption of the particular offer (e.g., recording the provided coupon code), voiding the coupon code for further redemption, crediting a player account on a casino management system, or any other function.

As discussed above, the invitation to play an online game may be provided in any manner and in any location. For instance, as shown in FIG. 12, the player, during a first visit of a gambling location receives an offer to play an online game. For instance, the player may take one or more actions at the gambling location (e.g., swiping a frequent player card at a kiosk) that initiates the presentation of an invitation to play the online game. For instance, a bonusing message may be displayed to the player, and the player may be provided a coupon which is associated with the frequent player identifier of the player. According to one embodiment, the bonus coupon is activated by the act of the player swiping his/her frequent player card at the property. Additionally, the player may play one or more games at the gambling location.

After the player leaves the gambling environment (e.g., the player returns home, leaves the gambling property, etc.) the player may be permitted to play the online game. Further, as discussed above, the player may be presented a bonus or other award that incentivizes the player to return to the gambling location. For instance, as shown in FIG. 12, the player during a second visit to the gambling location may be awarded credits to be used at the casino property during the second visit.

Figure 13:
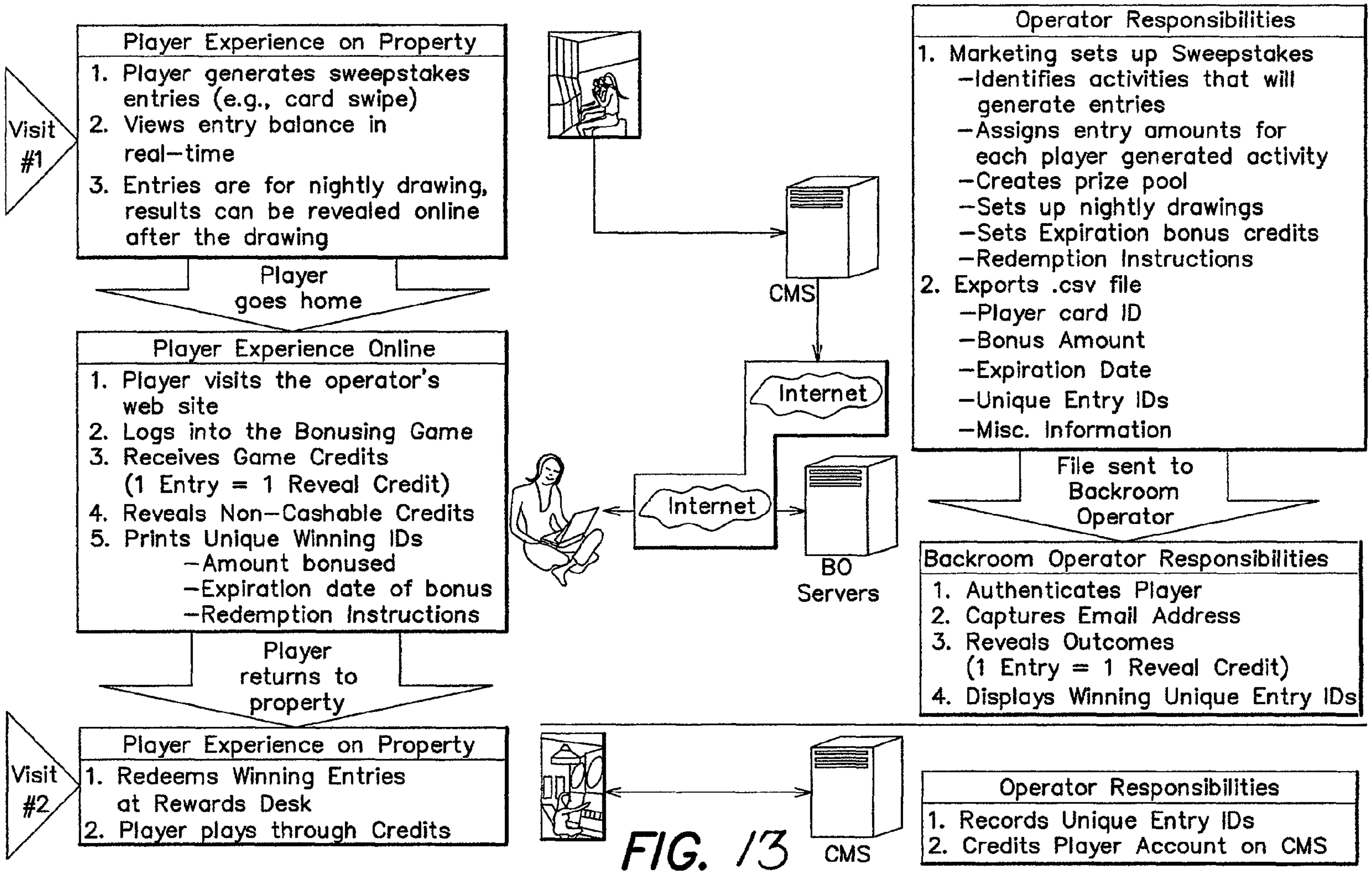
FIG. 13 is a block diagram showing an example of a system according to another embodiment of the present invention.

In yet another embodiment of the invention as shown in FIG. 13, the player may receive an entry into a sweepstakes during a first visit to the gambling location. The sweepstakes entries may be initiated upon one or more actions during the first visit of the player. Such actions may include, for example, a swipe of a frequent player card, one or more gambling activities performed by the player at the gambling location, or other player action. In one embodiment, the sweepstakes entries may be for a drawing that occurs at some later time. For instance, there may be drawings daily, nightly, etc. that may encourage the player to either remain on the gambling location property, or otherwise return to the gambling location after receiving the sweepstakes results.

In one embodiment, a computer system may be used to perform one or more remote operations. A computer system may be a single computer that may include a minicomputer, a mainframe, a personal computer, or combination thereof. The computer system may include any type of system capable of performing remote computing operations (e.g., cell phone, PDA, set-top box, or other system). A computer system used to run the operation may also include any combination of computer system types that cooperate to accomplish system-level tasks. Multiple computer systems may also be used to run the operation. The computer system also may include input or output devices, displays, or storage units. It should be appreciated that any computer system or systems may be used, and the invention is not limited to any number, type, or configuration of computer systems.

A computer system that executes operations according to various embodiments of the invention may include, for example, one or more system components. For instance, one system component may handle remote entry by frequent player program members. Another system component may handle the special incentives and a third system may handle payouts. Such a system may also be connected (e.g., by direct line or network) to other computer systems including systems for handling casino or hotel loyalty programs, reservations, in-room television viewing, gambling floor kiosks, or other systems. Connections to other computer systems may be performed using one or more of the system components described below.

A remote entry component may include one or more of a number of well-known systems. For example, a bettor may be able to enter remotely through an off-casino kiosk or other system that is connected to the remote entry computer system through an interface. In the computer, data may be stored in a database that is stored in the memory of a computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Examples of UIs that may be implemented with various aspects of the invention include a graphical user interface (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

Frequent player program member information may also be entered into a remote entry system component. Member information that may be input may include, for example, member name, address, telephone number and age, and payment information may include credit or debit card number or loyalty account information. Based upon the member information, the call center representative may verify that the member information is accurate.

Various remote entry systems and one or more user interfaces may be located on computer systems coupled by a network with the computer system(s) storing data having member, account and subscription information. As used herein, a "network" or a "communications network" is a group of two or more devices interconnected by one or more segments of transmission media or active communications equipment on which communications may be exchanged between the devices.

One aspect of the present invention relates to a method for providing additional incentives to a frequent player program member to encourage them to visit a land-based casino or other gambling location. One implementation combines the ease of using the Internet or other remote communication technologies with the advantages of a frequent player program. More particularly, a frequent player program member may be provided an incentive to return to the casino or other gambling location in a more convenient location to the member (e.g., at home, on a cell phone, PDA, etc.).

In another embodiment of the invention, extra prizes or rewards may be won through a sweepstake. In one example, the frequent player program member may be informed whether they won or lost at the time of entry. Preferably, the member is not informed of their winnings until he or she visits the gambling location to encourage more members (even losing ones) to visit the gambling location.

In one implementation, a computer system of a casino may automatically determine when a remote frequent player program member is a winner. Such a result may be automatically authenticated and verified by the computer system. In this instance, the computer system may then notify the member that he or she has won and what the winnings are. Notification of winning to a member may occur, for example, by mail, e-mail, Internet or other network, telephone, television, pager, fax, kiosk or any other method. In one implementation, the player may be advised of their winning during play of an online game. For instance, during play of an online game in which winnings are displayed to the player, the game program may be configured to reveal an indication of a win of an incentive. Displaying of the indication may occur, for example, within the game, or the display may occur within play of another game (e.g., a secondary game to the online game).

After a winner is authenticated and verified, the computer system may then notify other members of the win. Additionally, the computer system may display the member's identity and/or payout.

A member may be able to remotely swipe their frequent player program card (or otherwise enter his or her unique identifier and password) using an audio-enabled, video-enabled, or card reader-containing device. For instance, a kiosk, telephone having a display, television, computer or handheld device may be used. However, it should be appreciated that any other entry method may be used (e.g., by entering a member identifier manually into a computer system).

In one embodiment, a computer system may be used to operate most of this remote operation. A computer system may be a single computer that may be a supercomputer, a minicomputer, a mainframe, or a personal computer. A computer system used to run the operation may also include any combination of computer system types that cooperate to accomplish system-level tasks. Multiple computer systems may also be used to run the operation. The computer system also may include input or output devices, displays, or storage units. It should be appreciated that any computer system or systems may be used, and the invention is not limited to any number, type, or configuration of computer systems.

Figure 16:
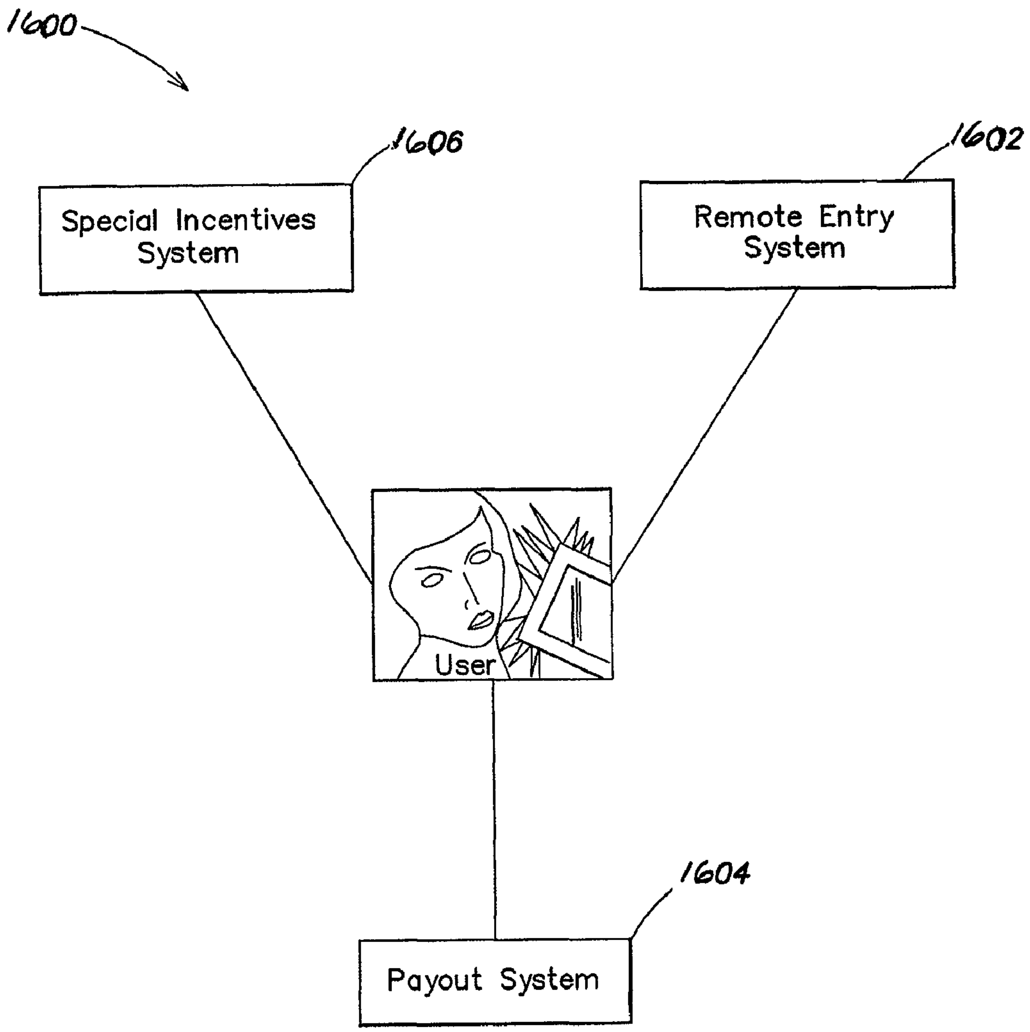
FIG. 16 is a diagram showing example components of a remote special incentives computer system according to one embodiment of the invention.

A computer system (e.g., system 1600) that executes game operations according to various embodiments of the invention may include, for example, one or more system components as shown in FIG. 16. One system component may handle remote entry by frequent player program members. Another system component may handle the special incentives and yet another system may handle payouts. Such a system may also be connected (e.g., by direct line or network) to other computer systems including systems for handling casino or hotel loyalty programs, reservations, in-room television viewing, gambling floor kiosks, or other systems. Connections to other computer systems may be performed using one or more of the system components described below.

Figure 17:
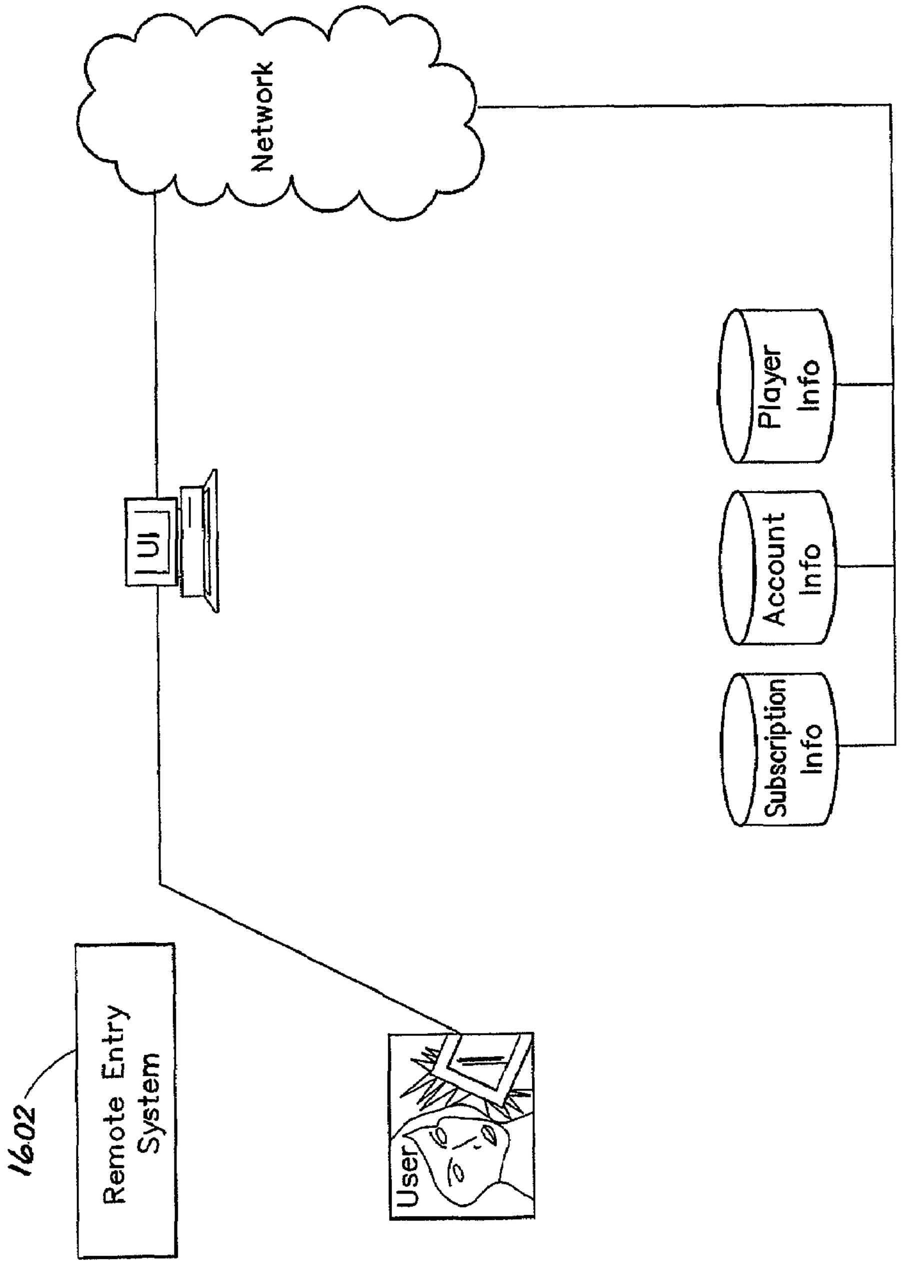
FIG. 17 is a diagram showing components of a remote entry subsystem according to one embodiment of the invention.
Figure 18:
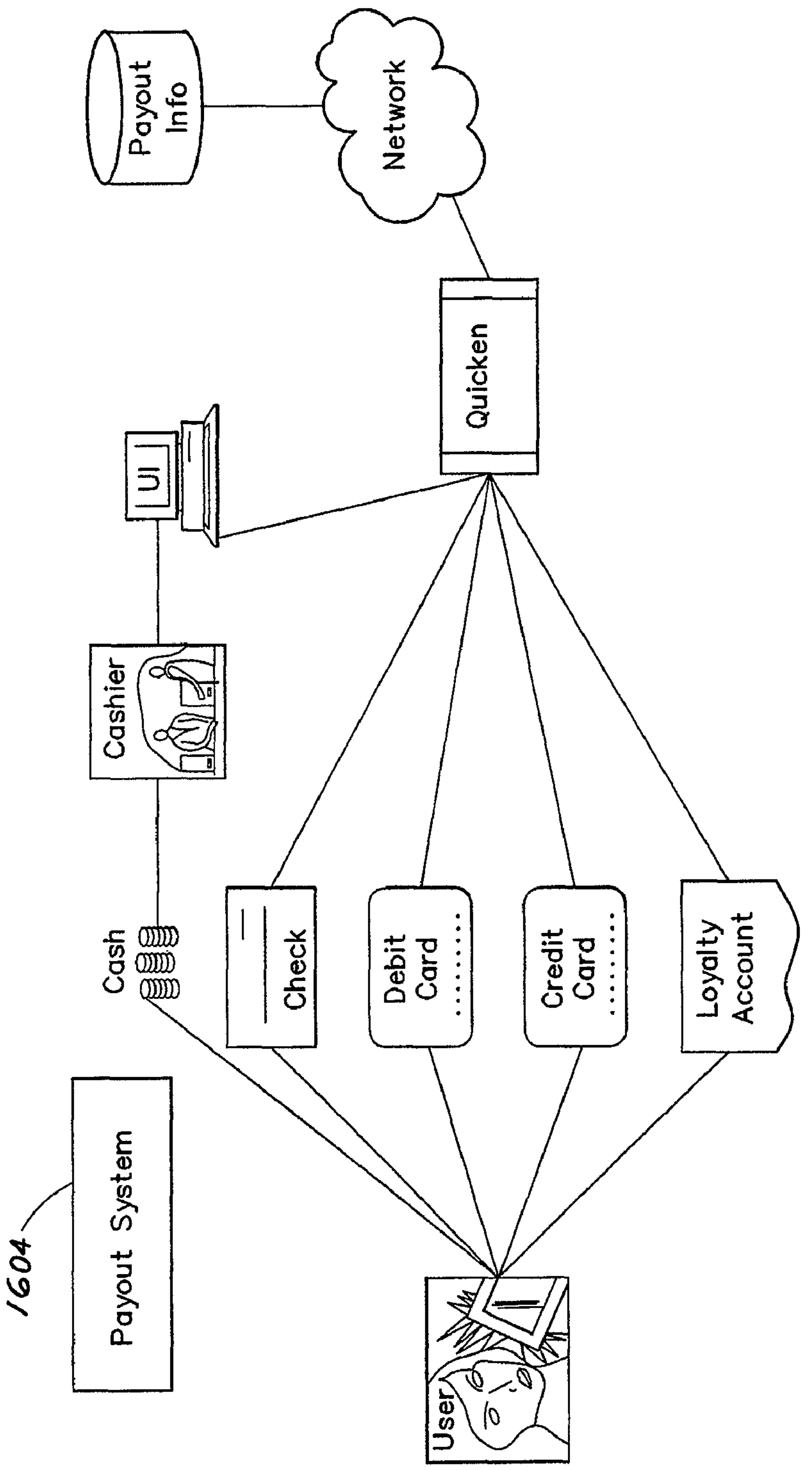
FIG. 18 is a diagram showing components of a payout subsystem according to one embodiment of the invention.

A remote entry component (e.g., system 1602) may include one or more of a number of well-known systems (e.g., as shown in FIG. 17). For example, a bettor may be able to enter remotely through an off-casino kiosk or other method (e.g., cell phone) is connected to the remote entry computer system through an interface. In the computer, data may be stored in a database that is stored in the memory of a computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Examples of UIs that may be implemented with various aspects of the invention include a graphical user interface (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

Frequent player program member information may also be entered into a remote entry system component (e.g., system 1602). Member information that may be input includes name, address, telephone number and age, and payment information may include a credit or debit card number or loyalty account information. Based upon the member information, the call center representative may verify that the member information is accurate.

Various remote entry systems and one or more user interfaces may be located on computer systems coupled by a network with the computer system(s) storing data having member, account, and subscription information. As used herein, a "network" or a "communications network" is a group of two or more devices interconnected by one or more segments of transmission media or active communications equipment on which communications may be exchanged between the devices. One example of a network includes the Internet, at least a portion of which may be used to remotely access incentive information.

The above examples are merely illustrative embodiments of a remote entry system component. It should be appreciated that an illustrative embodiment is not intended to limit the scope of the invention, as any of numerous other implementations of the remote entry system, for example, variations for remote entry method, are possible and are intended to fall within the scope of the invention. For example, the remote entry system may include using pay-per-view systems associated with interactive television in an off-site hotel or the remote entry engine may additionally deliver a receipt to the member by either e-mail or mail. None of the claims set forth below are intended to be limited to any particular implementation of a remote entry system unless such claim includes a limitation explicitly reciting a particular implementation.

Payout systems are also well-known. Any of a number of standard systems or payout engines for making payouts for winning may be used. For example, a standard application programming interface such as 'Quicken' (available commercially from Intuit Inc., Mountain View, Calif., USA) may be used to write and mail checks or credit a debit card, credit card (if legal in the jurisdiction of play) or loyalty account. 'Quicken' may obtain the payout information by accessing a payout data structure across a network. As used herein, an "application programming interface" or "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of a payout system. Such an illustrative embodiment is not intended to limit the scope of the invention, as any of numerous other implementations of the payout system, for example, variations of online payout, are possible and are intended to fall within the scope of the invention. Additionally, a cashier may also have access to payout information using a user interface to the payout data structure through a network; the cashier then makes a payment to the winning player based upon the accessed information. None of the claims set forth below are intended to be limited to any particular implementation of a pay system unless such claim includes a limitation explicitly reciting a particular implementation.

Special Incentives System

Figure 19:
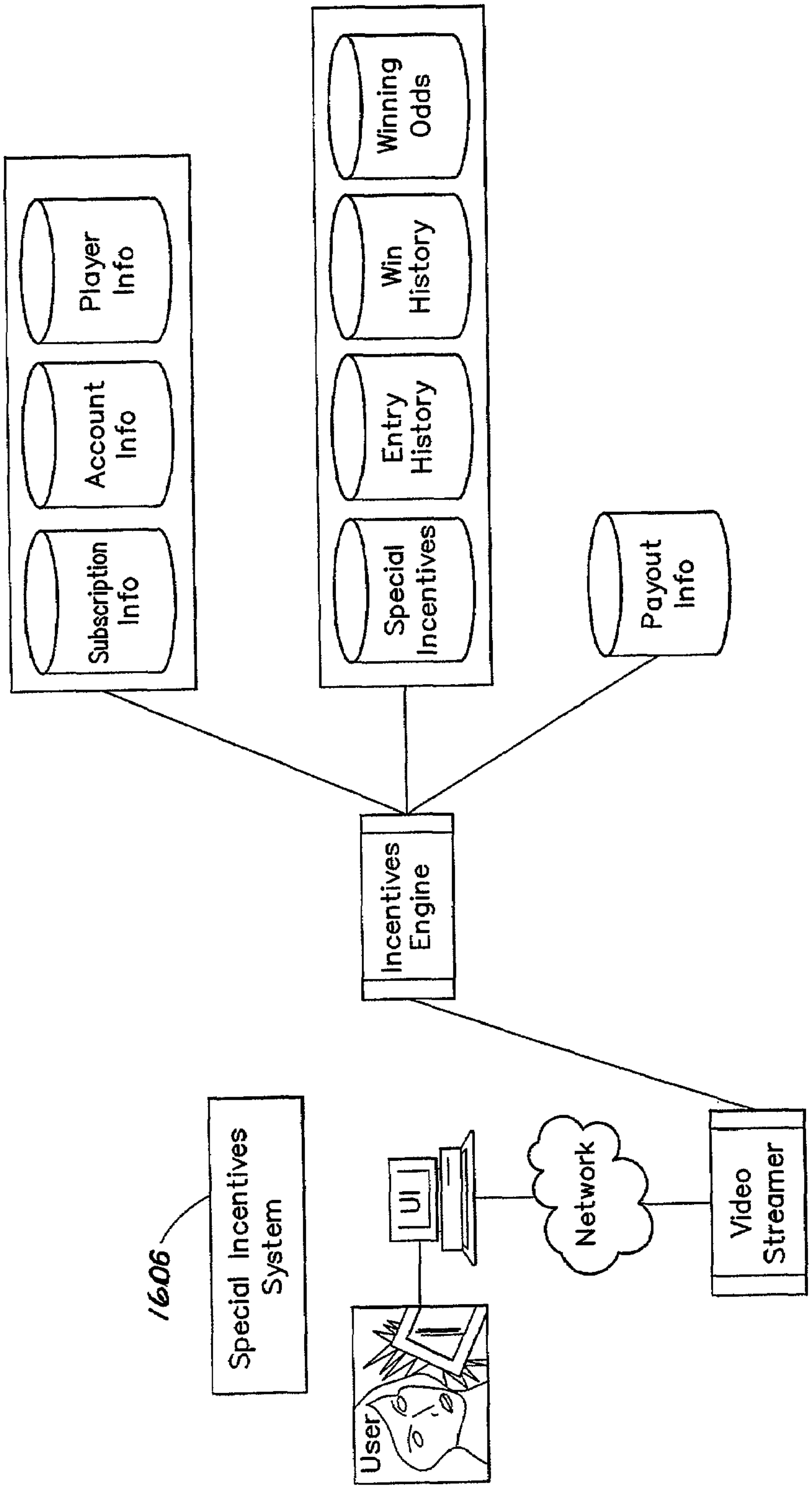
FIG. 19 is a diagram showing components of a special incentives subsystem according to one embodiment of the invention.

A special incentives system (e.g., system 1606) according to one embodiment of the invention may comprise of a number of components for performing specific functions as shown in FIG. 19. These components may include, for example, a storage component that stores data structures having information relating to special incentive programs and odds. For example, such information may include program dates, time, and location, member's betting and win history, and program odds. A remote incentives system may also include components to access remote entry and payout data structures.

A special incentives system, according to one embodiment, may also include an incentives engine. An incentives engine may perform, for example, any or all functions required to administer the special incentives program(s) for remote entry frequent player program members. The frequent player program member's winnings of the incentives may be stored and tracked by a computer system of the casino.

In one example, a management system (e.g., a casino management system) may generate incentives and assign them to players. Alternatively, the incentives engine may assign incentive and communicate those assignments to the management system. However, it should be appreciated that there may be many different systems that are capable of generating and/or assigning incentives to a player.

The player's winnings may be displayed on one or more interfaces of one or more systems, including, but not limited to, a game playing computer system on which the player is playing, a player tracking system or casino management system that tracks player wins/losses, or other system (e.g., a player kiosk) that allows different people (casino manager, player, teller, etc.) to view the status of the incentive awards. Such incentives may be tracked by the frequent player identifier or other unique identifier associated with the player.

The processes described above are merely illustrative embodiments of a method for providing special incentives to frequent player program members. Such an illustrative embodiment is not intended to limit the scope of the invention, as any of numerous other implementations for performing the invention. None of the claims set forth below are intended to be limited to any particular implementation of a method of providing special incentives, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIG. 14, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Another component of the special incentives system may include a software component (e.g., a driver) that streams video via a broadband, satellite or wireless medium to a user interface. If the remote access is completely automatic, the user interface may be merely a video terminal including television with no user input means. Viewing access may be controlled by standard methods for conditional access including using set top box addresses, telephone numbers or internet protocol (IP) addresses.

The above is merely an illustrative embodiment of a special incentives system. Such an illustrative embodiment is not intended to limit the scope of the invention, as any of numerous other implementations of a special incentives system, for example, variations of conditional access, are possible and are intended to fall within the scope of the invention. None of the claims set forth below are intended to be limited to any particular implementation of a special incentives system unless such claim includes a limitation explicitly reciting a particular implementation.

System 1600, and components thereof such as the payment, payout and betting engines, may be implemented using software (e.g., C, C#, C++, Java, or a combination thereof), hardware (e.g., one or more application-specific integrated circuits, processors or other hardware), firmware (e.g., electrically-programmed memory) or any combination thereof. One or more of the components of 1600 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of 1600, each of the components may reside in one or more locations on the system. For example, different portions of the components of 1600 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 1600 may be implemented on a computer system described below in relation to FIGS. 14 and 15.

System 1600 is merely an illustrative embodiment of the remote entry system. Such an illustrative embodiment is not intended to limit the scope of the invention, as any of numerous other implementations of the remote entry system, for example, variations of 1600, are possible and are intended to fall within the scope of the invention. For example, interactive television may also be used to view the available bets. None of the claims set forth below are intended to be limited to any particular implementation of the betting system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

Figure 14:
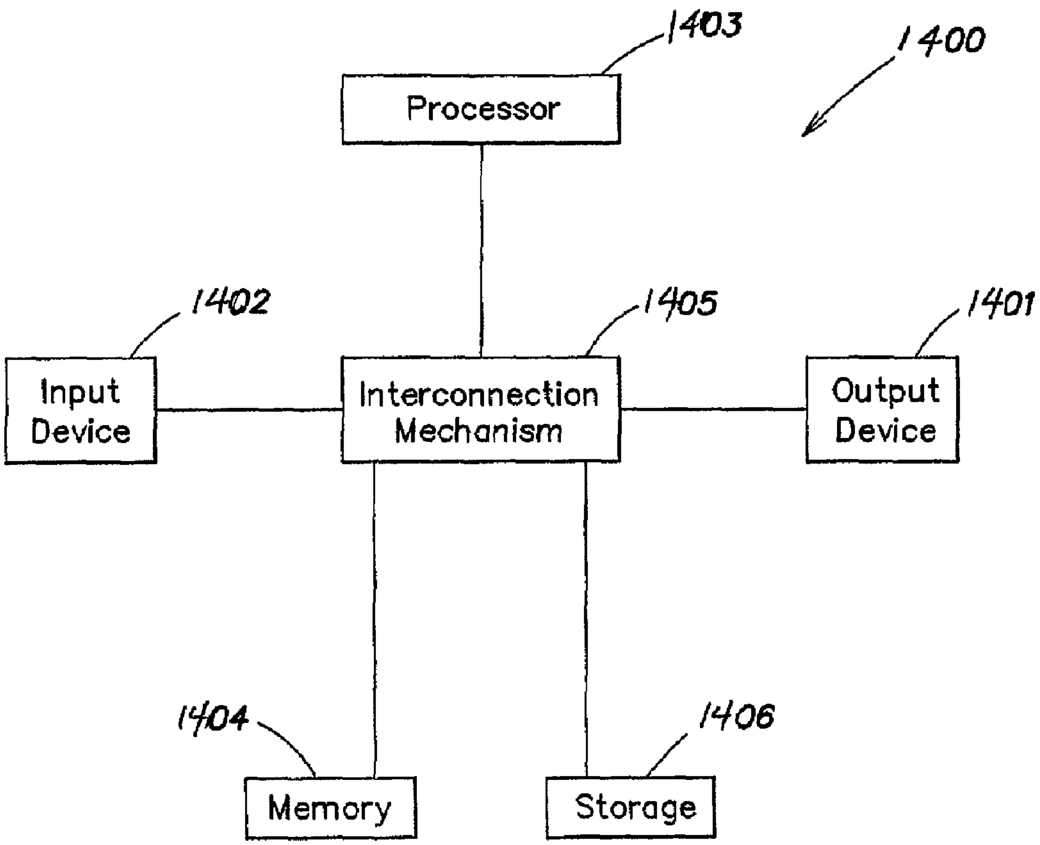
FIG. 14 is a block diagram of a general-purpose computer system upon which various embodiments of the invention may be implemented.

For example, various aspects of the invention may be implemented as specialized software executing in a general-purpose computer system 1400 such as that shown in FIG. 14. The computer system 1400 may include a processor 1403 connected to one or more memory devices 1404, such as a disk drive, memory, or other device for storing data. Memory 1404 is typically used for storing programs and data during operation of the computer system 1400. Components of computer system 1400 may be coupled by an interconnection mechanism 1405, which may include one or more busses (e.g., between components that are integrated within a same machine) and/or a network (e.g., between components that reside on separate discrete machines). The interconnection mechanism 1405 enables communications (e.g., data, instructions) to be exchanged between system components of system 1400. Computer system 1400 also includes one or more input devices 1402, for example, a keyboard, mouse, trackball, microphone, touch screen, and one or more output devices 1401, for example, a printing device, display screen, and/or speaker. In addition, computer system 1400 may contain one or more interfaces (not shown) that connect computer system 1400 to a communication network (in addition or as an alternative to the interconnection mechanism 1405.

Figure 15:
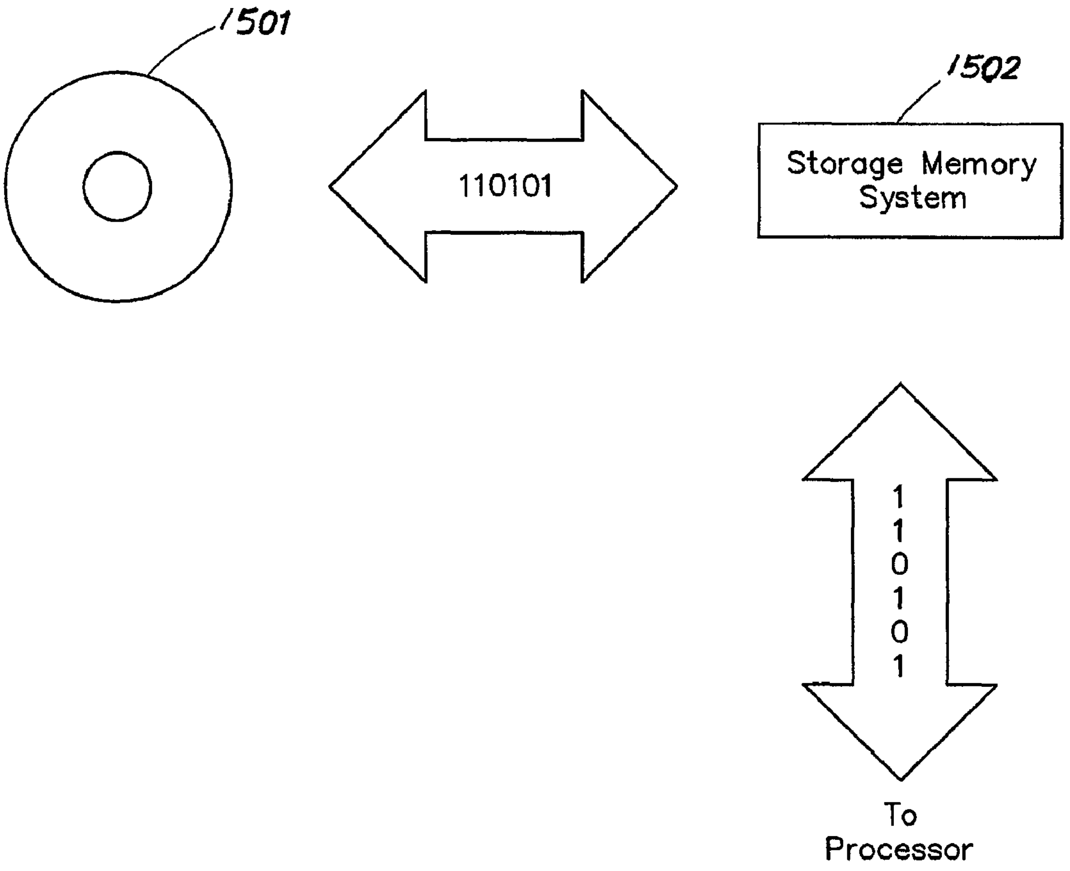
FIG. 15 is a block diagram of a computer data storage system with which various embodiments of the invention may be practiced.

The storage system 1406, shown in greater detail in FIG. 15, typically includes a computer readable and writeable nonvolatile recording medium 1501 in which signals are stored that define a program to be executed by the processor or information stored on or in the medium 1501 to be processed by the program. The medium may, for example, be a disk or flash memory. Typically, in operation, the processor causes data to be read from the nonvolatile recording medium 1501 into another memory 1502 that allows for faster access to the information by the processor than does the medium 1501. This memory 1502 is typically a volatile, random access memory such as a dynamic random access memory (DRAM) or static memory (SRAM). It may be located in storage system 1406, as shown, or in memory system 1404, not shown. The processor 1403 generally manipulates the data within the integrated circuit memory 1404, 1502 and then copies the data to the medium 1501 after processing is completed. A variety of mechanisms are known for managing data movement between the medium 1501 and the integrated circuit memory element 1404, 1502, and the invention is not limited thereto. The invention is not limited to a particular memory system 1404 or storage system 1406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1400 is shown by way of example as one type of computer system upon which various aspects of the invention may be practiced, it should be appreciated that aspects of the invention are not limited to being implemented on the computer system as shown in FIG. 14. Various aspects of the invention may be practiced on one or more computers having a different architecture or components that that shown in FIG. 14.

Computer system 1400 may be a general-purpose computer system that is programmable using a high-level computer programming language. Computer system 1400 may be also implemented using specially programmed, special purpose hardware. In computer system 1400, processor 1403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, or Windows Visa operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms “comprising”, “including”, “containing”, “characterized by” and the like are to be understood to be open-ended, i.e., to mean including but not limited to. Only the transitional phrases “consisting of” and “consisting essentially of”, respectively, shall be closed or semi-closed transitional phrases, as set forth, with respect to claims, in the United States Patent Office Manual of Patent Examining Procedures (Eighth Edition 2$^{nd}$ Revision, May 2004), Section 2111.03.

Use of ordinal terms such as “first”, “second”, “third”, “a”, “b” “c” etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A computer implemented method for conducting a computer-based game played by a player, the method comprising acts of:

notifying the player of an opportunity to win a prize;

permitting access to an operator’s website, after notification to the player, by the player through a user interface display on a host computer;

providing for the player to play a computer-based game on the operator’s website in the user interface display;

executing, by a game server, the computer-based game to be played by the player, the computer-based game configured to reveal the prize won by the player, wherein the prize won is independent of play of the computer-based game;

displaying a value of a potential value of the prize won by the player in response to the prize won by the player being revealed; and determining, prior to notifying the player, the potential value of the prize, wherein the act of determining includes an act of calculating a value of the player by a computer system, and wherein the value of the player is based, at least in part, upon an estimated gambling volume attributable to the player for, at least in part, prior gambling participation of the player, and wherein the potential value of the prize is based at least in part on the calculated value of the player, and wherein the potential value of the prize increases with respect to an increase in the calculated value of the player.

2. The method according to claim 1, further comprising an act of storing, on a server, the prize won by the player.

3. The method according to claim 1, wherein a coupon is provided with the notification of an opportunity to win the prize.

4. The method according to claim 3, wherein the coupon includes an access code, and the method comprises an act of permitting the player to enter the access code into a website of the operator to gain access.

5. The method according to claim 1, wherein the notification occurs in response to a player performing at least one of the group comprising entering frequent player information, and swiping a frequent player card at a kiosk.

6. The method according to claim 1, wherein the notification occurs by at least one of the group comprising mail, an e-mail, a telephone, and a fax.

7. The method according to claim 1, wherein the prize won by the player in each game is predetermined.

8. The method according to claim 7, wherein a sequence of reveals is predetermined.

9. The method according to claim 7, wherein the reveals are randomly determined by the client.

10. The method according to claim 7, wherein a sequence of reveals is stored in a database of a server.

11. The method according to claim 1, wherein the total prize won by the player in all games played with the game credits is predetermined.

12. The method according to claim 1, wherein game credits provided to the player are predetermined.

13. The method according to claim 1, further comprising an act of providing a player an opportunity to enter a sweepstake.

14. The method according to claim 13, further comprising an act of entering the sweepstake by the player.

15. The method according to claim 14, wherein the player is immediately notified of winning or losing the sweepstake.

16. The method according to claim 14, wherein the player is entered into at least one of a next drawing, one or more future drawings, and a limited number of future drawings.

17. The method according to claim 1, wherein the prize includes a non-cashable credit.

18. The method according to claim 17, wherein the non-cashable credit is used by the player at a gambling location of the operator.

19. The method according to claim 17, wherein the non-cashable credit is used to obtain a free play of a game located at a gambling location of the operator.

20. The method according to claim 19, wherein the non-cashable credit can be used only at the gambling location of the operator.

21. The method according to claim 1, wherein the prize includes a complimentary offer.

22. The method according to claim 21, wherein the complimentary offer is redeemed only at the gambling location of the operator.

23. The method according to claim 1, wherein the prize includes a promotional prize.

24. The method according to claim 23, wherein the promotional prize is redeemed only at the gambling location of the operator.

25. The method according to claim 1, wherein the act of notifying the player is performed using information associated with a frequent player membership.

26. The method according to claim 1, wherein an amount of the prize awarded to the player is limited by a predetermined range.

27. The method according to claim 26, wherein the amount of the prize is randomly selected by a computer system, the randomly selected amount being limited by the predetermined range.

28. The method according to claim 26, wherein the predetermined range is established based at least in part on a player based qualification.

29. The method according to claim 1, further comprising acts of determining, by the website, the prize won by the player, and notifying the operator of the determined prize.

30. The method according to claim 1, further comprising acts of determining, by the operator, the prize won by the player, and notifying the website of the determined prize.

31. The method according to claim 1, further comprising an act of providing to the player periodically a plurality of opportunities to win one or more prizes.

32. The method according to claim 1, further comprising an act of notifying the player of any prize won by the player.

33. The method according to claim 1, further comprising an act of identifying a new player, and wherein the act of notifying the player of an opportunity to win the prize is responsive to the act of identifying.

34. The method according to claim 1, further comprising an act of requiring the player to redeem the prize at a gambling location.

35. The method according to claim 1, further comprising estimating the gambling volume of the player by comparing attributes of the player with attributes of other players known to gamble at a particular volume.

36. The method according to claim 1, further comprising separating players into different categories based on their estimated gambling volume.

37. The method according to claim 36, further comprising offering at least one of different game outcomes, different outcome award structures, or different redemption opportunities in relation to the category into which the players are placed.

38. A system for conducting a game, the system comprising:

a notification component configured to notify a player of an opportunity to win a prize, wherein the notification is configured to provide a reference to a website to access;

a computer interface configured to permit the player to access an operator's website, after notification to the player, through a user interface display on a host computer, wherein the computer interface is further configured to provide a computer-based game to be played by the player;

a game engine configured to execute the computer-based game, the computer-based game configured to reveal the prize won by the player, wherein the prize won is independent of play of the computer-based game;

the computer interface further configured to display a value of a potential value of the prize won by the player in response to the prize won by the player being revealed; and a determination component configured to determine a value associated with the player by calculating the value associated with the player, wherein the value associated with the player is based, at least in part, upon an estimated gambling volume attributable to the player for, at least in part, prior gambling participation of the player, and wherein the determination component is further configured to establish the potential value of the prize based on the player valuation, and wherein the potential value of the prize increases with respect to an increase in the calculated value of the player.

39. The system according to claim 38, wherein the determination component is further configured to include at least one characteristic of the player in establishing the potential value of the prize.

40. The system according to claim 38, wherein the determination component is configured to establish the potential value of the prize within a range of values.

41. The system according to claim 38, further comprising a redemption component configured to require that an awarded prize be redeemed at a gambling location.

* * * * *